US006738358B2

(12) United States Patent
Bist et al.

(10) Patent No.: US 6,738,358 B2
(45) Date of Patent: May 18, 2004

(54) NETWORK ECHO CANCELLER FOR INTEGRATED TELECOMMUNICATIONS PROCESSING

(75) Inventors: Anurag Bist, Irvine, CA (US); Stan Hsieh, Diamond Bar, CA (US); Raghavendra S. Prabhu, San Diego, CA (US); Zhen Zhu, Irvine, CA (US); Adam Strauss, Brea, CA (US)

(73) Assignee: Intel Corporation, Santa Clara, CA (US)

( * ) Notice: Subject to any disclaimer, the term of this patent is extended or adjusted under 35 U.S.C. 154(b) by 122 days.

(21) Appl. No.: 09/948,501

(22) Filed: Sep. 6, 2001

(65) Prior Publication Data

US 2002/0064139 A1 May 30, 2002

Related U.S. Application Data

(60) Provisional application No. 60/231,521, filed on Sep. 9, 2000.

(51) Int. Cl.[7] .................................................. H04B 3/23
(52) U.S. Cl. .................. 370/289; 370/290; 379/406.05; 379/406.08
(58) Field of Search ................................. 370/286, 289, 370/290, 291; 379/406.01, 406.05, 406.06, 406.08

(56) References Cited

U.S. PATENT DOCUMENTS

| 5,084,865 A | * | 1/1992 | Koike ......................... 370/289 |
| 5,142,677 A | | 8/1992 | Ehlig et al. |
| 5,341,374 A | | 8/1994 | Lewen et al. |
| 5,559,793 A | | 9/1996 | Maitra et al. |
| 5,598,466 A | | 1/1997 | Graumann |
| 5,905,717 A | * | 5/1999 | Hasegawa ................... 370/289 |
| 5,937,009 A | * | 8/1999 | Wong et al. ................. 375/286 |
| 5,953,410 A | | 9/1999 | Pfeil et al. |
| 5,970,094 A | | 10/1999 | Lee |
| 5,983,253 A | | 11/1999 | Fisher et al. |
| 6,081,732 A | | 6/2000 | Suvanen et al. |
| 6,138,136 A | | 10/2000 | Bauer et al. |
| 6,330,660 B1 | | 12/2001 | Ganapathy et al. |
| 6,377,683 B1 | * | 4/2002 | Dobson et al. ........ 379/406.12 |
| 6,516,062 B1 | * | 2/2003 | Yang et al. ............ 379/406.08 |
| 6,570,986 B1 | * | 5/2003 | Wu et al. ............... 379/406.09 |

FOREIGN PATENT DOCUMENTS

| EP | 0 384 490 A2 | 8/1990 |
| EP | 0 734 012 A2 | 9/1996 |
| WO | WO 00/17856 | 3/2000 |

OTHER PUBLICATIONS

Mader et al., "Step–size control for acoustic echo cancellation filters—an overview," Signal Processing 80 (2000) 1697–1719.

(List continued on next page.)

Primary Examiner—Min Jung
(74) Attorney, Agent, or Firm—Blakely, Sokoloff, Taylor & Zafman LLP

(57) ABSTRACT

A network echo canceller for integrated telecommunications processing. The network echo canceller processes echoes in multiple communication channels over a packet network. The network echo canceller adapts a least means squared finite impulse response filter to each communication channel in order to estimate an echo therein. The echo estimation is subtracted from signals that are being sent over each communication channel. The echo canceller includes a residual error suppressor to suppress non-linear sources of echo when desired. The echo canceller includes a double talk detector to inhibit filter adaptation during double talk. The network echo canceller is programmable into a digital signal processor and can be flexibly controlled through messaging.

25 Claims, 52 Drawing Sheets

OTHER PUBLICATIONS

Sankaran et al., "Convergence Analysis Results for the Class of Affine Projection Algorithms," 1999 IEEE International Symposium on Circuits and Systems, Orlando, Florida, vol. III, pp. 251–254, May 1999.

Gay et al., "The Fast Affine Projection Algorithm," Accoustics Research Department AT&T Bell Laboratories, Murry Hill, NJ.

Breining et al., "Acoustic Echo Control, An Application of Very–High–Order Adaptive Filters," IEEE Signal Processing Magazine, 1053–5888/99/$10.00©1999IEEE.

Minoli & Minoli; Chapter 5, Technology and Standards for Low–Bit–Rate Vocoding Methods; Delivering Voice Over IP Networks; 1998; pp. 149–233; Robert Ipsen Pub.

Texas Instruments, SMJ320C80 Digital Signal Processor Data Sheet; document No. SGUS025; Aug. 1998; Texas Instruments.

S. Varada & R. Sankar, Hardware Strategies for End–Point Detection, Jul. 3, 1995, Dept. of Electrical Eng. University of South Florida, Tampa, FL 33620.

* cited by examiner

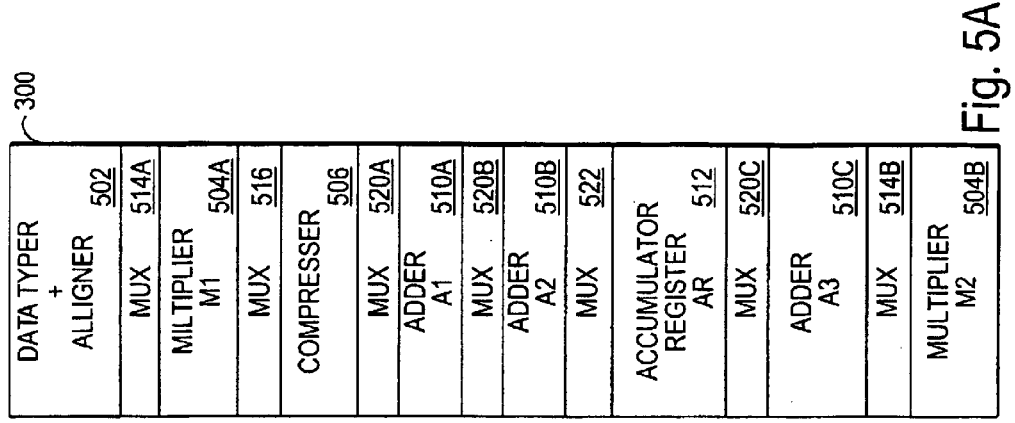
Fig. 5A
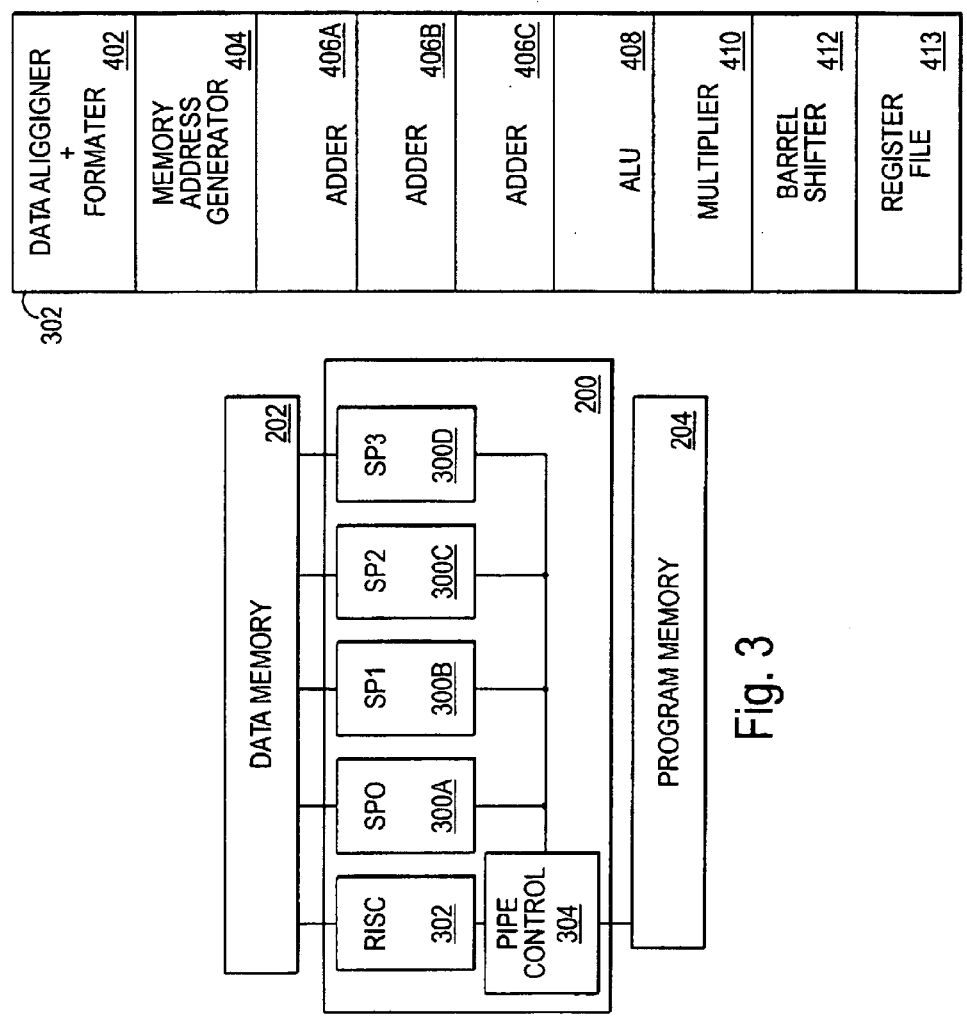
Fig. 4
Fig. 3

Fig. 6C

| 39 | 38 | 37 | 36 | 35 | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|---|---|---|---|---|---|---|
| 0 | 0 | PS | S* | SX | | | | | V/S | SA | DA | Sub-op | | | 1 | Pred | PL | Sxt | Syt | Rnd | S* | S* | S* | 0 | SA | DA | abs | 0 |

| SX | V/S SA DA | Sub-op | | | |
|---|---|---|---|---|---|
| $da = +/-sx*sy$ | Nop | 0 | 0 | 0 | |
| $da = +/-(sx*sy) + sa$ | Add | 0 | 0 | 1 | |
| $da = +/-(sx*sa) + sy$ | Add | 0 | 1 | 0 | |
| $da = +/-(sx*sy) - sa$ | Sub | 0 | 1 | 1 | |
| $da = +/-(sx*sa) - sy$ | Sub | 1 | 0 | 0 | |
| $da = min(+/-sx*sy,sa)$ | Min | 1 | 0 | 1 | |
| $da = min(+/-sx*sa,sy)$ | Min | 1 | 1 | 0 | |
| $da = max(+/-sx*sy,sa)$ | Max | 1 | 1 | 1 | |

| Li | Li | Li | Li | Gx | Gx | Gx |

Fig. 6D

| 39 | 38 | 37 | 36 | 35 | 34 | 33 | 32 | 31 | 30 | 29 | 28 | 27 | 26 | 25 | 24 | 23 | 22 | 21 | 20 |
|---|---|---|---|---|---|---|---|---|---|---|---|---|---|---|---|---|---|---|---|
| 1 | 0 | 0 | PS | S* | SX | | | | SY | | | | V/S | SA | DA | 0 | | | |

| V/S SA DA | | | |
|---|---|---|---|
| 0 | 0 | 0 | Add |
| 1 | 0 | 0 | Sub |
| 1 | 1 | 0 | Min |

$da = +/-(mx*sa) + my$ $da = +/-(mx*sa) - my$ $da = min(+/-mx*sa,my)$

20-bit ISA

| 39 | 19 | | |
|---|---|---|---|
| 0 | 0 | 20-bit parallel | Control ‖ Control |
| 0 | 1 | 20-bit serial | Control # Control |
| 1 | 0 | 40-bit extended | DSP extensions/Shadow |
| 1 | 1 | 20-bit serial | DSP # DSP |

DSP Instructions

| | 39 | 38 | 37 | 36 | 35 | 34 | 33 | 32 | 31 | 30 | 29 | 28 | 27 | 26 | 25 | 24 | 23 | 22 | 21 | 20 | |
|---|---|---|---|---|---|---|---|---|---|---|---|---|---|---|---|---|---|---|---|---|---|
| Multipy | 1 | 0 | 0 | PS | | S* | | SX | | | | SY | | | V/S | SA | DA | Sub-op | | | |
| | | | | | da = sx*sy | | | | | | | | | | | | | 0 | 0 | 0 | Nop |
| | | | | | da = (sx*sy) + sa | | | | | | | | | | | | | 0 | 0 | 1 | Add |
| | | | | | da = (sx*sa)+ sy | | | | | | | | | | | | | 0 | 1 | 0 | Add |
| | | | | | da = (sx*sy) - sa | | | | | | | | | | | | | 0 | 1 | 1 | Sub |
| | | | | | da = (sx*sa) - sy | | | | | | | | | | | | | 1 | 0 | 0 | Sub |
| | | | | | da = min(sx*sy,sa) | | | | | | | | | | | | | 1 | 0 | 1 | Min |
| | | | | | da = min(sx*sa,sy) | | | | | | | | | | | | | 1 | 1 | 0 | Min |
| | | | | | da = min(sx*sy,sa) | | | | | | | | | | | | | 1 | 1 | 1 | Max |
| Add | 1 | 0 | 1 | PS | | +/- | | SX | | | | SY | | | V/S | SA | DA | Sub-op | | | |
| | | | | | da = sx*sy | | | | | | | | | | | | | 0 | 0 | 0 | Nop |
| | | | | | da = sx+sy+sa | | | | | | | | | | | | | 0 | 0 | 1 | Add |
| | | | | | da = sx+sy;sa=sx-sy; | | | | | | | | | | | | | 0 | 1 | 0 | AddSub |
| | | | | | da = (sx+ sy)*sa | | | | | | | | | | | | | 0 | 1 | 1 | Mul |
| | | | | | da = (sx*sy)*sa | | | | | | | | | | | | | 1 | 0 | 0 | MulN |
| | | | | | da = min(sx+sy,sa) | | | | | | | | | | | | | 1 | 0 | 1 | Min |
| | | | | | da = max(sx+sy,sa) | | | | | | | | | | | | | 1 | 1 | 0 | Max |
| | | | | | da = ssum(sa)  (sx,sy unused) | | | | | | | | | | | | | 1 | 1 | 1 | CombAdd |
| Extremum | 1 | 1 | 0 | PS | | X/N | | SX | | | | SY | | | V/S | SA | DA | Sub-op | | | |
| | | | | | da = ext(sx,sy) | | | | | | | | | | | | | 0 | 0 | 0 | Nop |
| | | | | | da = ext(sx,sy,sa) | | | | | | | | | | | | | 0 | 0 | 1 | Ext |
| | | | | | da = ext(sx,sa) *sy | | | | | | | | | | | | | 0 | 1 | 0 | Mul |
| | | | | | da = -ext(sx,sa) *sy | | | | | | | | | | | | | 0 | 1 | 1 | MulN |
| | | | | | da = ext(sx,sa) + sy | | | | | | | | | | | | | 1 | 0 | 1 | Add |
| | | | | | da = ext(sx,sa) - ay | | | | | | | | | | | | | 1 | 1 | 0 | Sub |
| | | | | | ext(sa,da)?- = sx,lr = sy,lcs = lc | | | | | | | | | | | | | 1 | 1 | 0 | amax |
| type-match | 1 | 1 | 0 | PS | | 0 | | SX | | | | SY | | | x | x | x | 1 | 1 | 1 | |
| Permute | 1 | 1 | 0 | PS | | 1 | | SX | | | | Type | | | x | ereg | | 1 | 1 | 1 | Permute |
| Reserved | 1 | 1 | 1 | PS | | x | | SX | | | | SY | | | SA | DA | V/S | Sub-op | | | |

Fig. 6E(1)

Control and specifier Extensions

| 19 | 18 | 17 | 16 | 15 | 14 | 13 | 12 | 11 | 10 | 9 | 8 | 7 | 6 | 5 | 4 | 3 | 2 | 1 | 0 |
|----|----|----|----|----|----|----|----|----|----|---|---|---|---|---|---|---|---|---|---|

Mul

| 0 | Pred | PL | Sxt | Syt | Rnd | | S* | S* | S* | 0 | SA | DA | abs | 0 | 0 |
|---|------|----|----|-----|-----|--|----|----|----|---|----|----|-----|---|---|
|   |      |    |    |     |     |  | Lt |    |    |   |    |    |     |   |   |
|   |      |    |    |     |     |  | Gx |    |    |   |    |    |     |   |   |

Add/Sub min/max

Add

| 0 | Pred | PL | Sxt | Syt | Lt | Sub-ext | | | | 0 | SA | DA | abs | 0 | 0 |
|---|------|----|----|-----|-----|---------|--|--|--|---|----|----|-----|---|---|
|   |      |    |    |     |     | +/- | +/- | +/- | x | | | | | | |
|   |      |    |    |     |     | x | V/S | Rnd | Fp | | | | | | |
|   |      |    |    |     |     | tr-cll | Gx | Fp | | | | | | | |

Nop(uadd)
Mul/MulN
Min/Max

Ext

| 0 | Pred | PL | Sxt | Syt | tr-cll | Gx | Sub-ext | 0 | SA | DA | abs | 0 | 0 |
|---|------|----|----|-----|--------|----|---------|---|----|----|-----|---|---|
|   |      |    |    |     |        |    | Lt | Fp |   |    |    |     |   |
|   |      |    |    |     |        |    | Rnd | V/S |   |    |    |     |   |

Add/sub
Mul

| 0 | Pred | PL | Sxt | Pctl1 | | | 0 | ereg | Pct | 0 | 0 |
|---|------|----|----|-------|--|--|---|------|-----|---|---|

Type/offset/permute extensions

| 19 | 18 | 17 | 16 | 15 | 14 | 13 | 12 | 11 | 10 | 9 | 8 | 7 | 6 | 5 | 4 | 3 | 2 | 1 | 0 |
|----|----|----|----|----|----|----|----|----|----|---|---|---|---|---|---|---|---|---|---|

| 0 | Pred | PL | x | Type: SX | Type: SY | 0 | SA | DA | x | 0 | 1 |
|---|------|----|----|----------|----------|---|----|----|----|---|---|
| 0 | Pred | PL | Psn | Permute: SX | Permute: SY | 0 | SA | DA | Psy | 1 | 0 |
| 0 | Pred | I/R | I/R | prX | Offset: SX | Offset: SY | 0 | SA | DA | prY | 1 | 1 |

Type override
permute override
Offset override

Shadow DSP

| 19 | 18 | 17 | 16 | 15 | 14 | 13 | 12 | 11 | 10 | 9 | 8 | 7 | 6 | 5 | 4 | 3 | 2 | 1 | 0 |
|----|----|----|----|----|----|----|----|----|----|---|---|---|---|---|---|---|---|---|---|

| 0 | Op | PL | op | ereg | ereg | 1 | SA | DA | Sub-op |
|---|----|----|----|------|------|---|----|----|--------|

Fig. 6E(2)

Control Instructions

| Instruction | 19 | 18 | 17 | 16 | 15 | 14 | 13 | 12 | 11 | 10 | 9 | 8 | 7 | 6 | 5 | 4 | 3 | 2 | 1 | 0 | |
|---|---|---|---|---|---|---|---|---|---|---|---|---|---|---|---|---|---|---|---|---|---|
| add.sub | L | Pred | 0 | 0 | 0 | RX | | | RY | | | RZ | | | +/- | 0 | |
| max.min | L | Pred | 0 | 0 | 0 | RX | | | RY | | | RZ | | | X/N | 1 | |
| Shift | L | Pred | 0 | 0 | 1 | RX | | | UI4 | | | RZ | | | UI1 | R/L | <Bit1, Bits9-6> |
| Logic | L | Pred | 0 | 1 | 0 | RX | | | RY | | | RZ | | | &,I | &I | ==UI5 (Shift Amount) |
| Mux | L | Pred | 0 | 1 | 1 | RX | | | RY | | | RZ | | | Pd | 0 | |
| mov | L | Pred | 0 | 1 | 1 | Rx | | | DZ | | Rxt | Dzt | 0 | 0 | 0 | 1 | |
| addi | L | Pred | 0 | 1 | 1 | SI4 | | | DZ | | x | x | 1 | 0 | 0 | 1 | |
| mov2erg | L | Pred | 0 | 1 | 1 | RX | | | unit | ereg | gd | type | 1 | 0 | 1 | | |
| Ldm | L | Pred | 0 | 1 | 1 | RX | | | Dz1 | | | Dz2 | | | 1 | 1 | |
| Set4bits | L | Pred | 1 | 0 | 0 | UI4:POS | | | RZ | | Rzl | UI4 | | | | 0 | |
| Set2bits | L | Pred | 1 | 0 | 0 | UI4:POS | | | RZ | | Rzl | UI2 | | 0 | 0 | 1 | |
| Setbit | L | Pred | 0 | 0 | 0 | UI4:POS | | | RZ | | Rzl | UI1 | UI1 | 1 | 0 | 1 | <Bit3, Bits13-10> ==UI5: POS |
| Movl | L | Pred | 1 | 0 | 0 | SI8 | | | | | | RZ | | | 1 | 1 | |
| Jmp | L | Pred | 1 | 0 | 1 | SI9 | | | | | | 0 | Pred | | 0 | 0 | |
| Call | L | Pred | 1 | 0 | 1 | SI9 | | | | | | 1 | Pred | | 0 | 0 | |
| Loop | L | Pred | 1 | 0 | 1 | UI5: Lcount | | | UI5: Lsize | | | UI2:Lst | 0 | 1 | | | |
| Jmpi | L | Pred | 1 | 0 | 1 | RX | | | x | x | x | x | x | 0 | Pred | 1 | 0 | |
| Calli | L | Pred | 1 | 0 | 1 | RX | | | x | x | x | x | x | 1 | Pred | 1 | 0 | |
| Loopi | L | Pred | 1 | 0 | 1 | RX | | | x | UI5: Lsize | | | | UI2:Lst | 1 | 1 | | |
| Test | L | Pred | 1 | 1 | 0 | RX | | | RY | | | PZ | | | =,<,> | 0 | |
| Testbit | L | Pred | 1 | 1 | 0 | RX | | | UI5 | | | PZ | | B | 0 | 1 | |
| Andp.orp | L | Pred | 1 | 1 | 0 | Pa | | Pb | | Pc | | | PZ | | &I | 1 | 1 | |
| Load | L | Pred | 1 | 1 | 1 | MX | | | RZ | | | Ext | | 0 | 0 | 0 | |
| Store | L | Pred | 1 | 1 | 1 | MZ | | | RX | | | Ext | | 1 | 0 | 0 | |
| eLoad | L | Pred | 1 | 1 | 1 | MX | | | RZ | | 1 | 1 | 1 | 0 | 0 | 0 | |
| eStore | L | Pred | 1 | 1 | 1 | MZ | | | RX | | 1 | 1 | 1 | 1 | 0 | 0 | |
| Extended | L | Pred | 1 | 1 | 1 | Bits 27:16 | | | | | | | | | 1 | 0 | |
| Logic2 | L | Pred | 1 | 1 | 1 | RX | | | RY/RZ | | Rxt | Ryt | &,I,&,I | 0 | 1 | | | |
| mov-erg | L | Pred | 1 | 1 | 1 | unit | ereg | | RZ | | gd | Sft | | 0 | 1 | 1 | |
| Crb | L | Pred | 1 | 1 | 1 | RX | | | RZ | | s/m | 0 | 0 | 1 | 1 | 1 | |
| Parity | L | Pred | 1 | 1 | 1 | RX | | | PZ | | O/E | 0 | 1 | 0 | 1 | 1 | 1 |
| Strn | L | Pred | 1 | 1 | 1 | MZ | | | RX | | 1 | 1 | 0 | 1 | 1 | 1 | |
| Abs | L | Pred | 1 | 1 | 1 | RX | | | RZ | | 0 | 0 | 1 | 1 | 1 | 1 | |
| Neg | L | Pred | 1 | 1 | 1 | RX | | | RZ | | 0 | 1 | 1 | 1 | 1 | 1 | |
| Div-step | L | Pred | 1 | 1 | 1 | RX | | | RZ | | 1 | 0 | 1 | 1 | 1 | 1 | |
| Test & Set | L | Pred | 1 | 1 | 1 | RX | | | PZ | | 0 | 1 | 1 | 1 | 1 | 1 | 1 |
| Return | L | Pred | 1 | 1 | 1 | Pred | I-cll | | 0 | 1 | 0 | 1 | 1 | 1 | 1 | 1 | 1 |
| Zero-ac | L | Pred | 1 | 1 | 1 | ac# | | | 1 | 1 | 0 | 1 | 1 | 1 | 1 | 1 | 1 |
| eSync | L | Pred | 1 | 1 | 1 | RZ | | | 0 | 1 | 1 | 1 | 1 | 1 | 1 | 1 | 1 |
| Swi | L | Pred | 1 | 1 | 1 | UI3 | | 0 | 1 | 1 | 1 | 1 | 1 | 1 | 1 | 1 | 1 | |
| Nop | L | Pred | 1 | 1 | 1 | UI3 | | 1 | 1 | 1 | 1 | 1 | 1 | 1 | 1 | 1 | 1 | |

Fig. 6F

Extended Control

| | Bits 13:2 of upper half 39:20) | | | | | | | | | | | | |
|---|---|---|---|---|---|---|---|---|---|---|---|---|---|
| | 13 | 12 | 11 | 10 | 9 | 8 | 7 | 6 | 5 | 4 | 3 | 2 | 19 | 18 | 17 | 16 |

| | | | | | | | | | | | | |
|---|---|---|---|---|---|---|---|---|---|---|---|---|
| Insert/EXTRACT | RX | | RZ | | 0 | 0 | 0 | 0 | 0 | x | x | 0 |
| Inserti | UI4: length | | RZ | | 0 | 0 | 0 | 1 | 0 | x | x | 0 |
| Shift | RX | | RZ | | 0 | 0 | 0 | 0 | 0 | rxh | rxl | 0 |
| Rotate | RX | | RZ | | 0 | 0 | 0 | 0 | 0 | x | x | 0 |
| jmp, call | U17 | | | J/C | 0 | 0 | 1 | 0 | 0 | Pred | | 0 |
| dloop | U14: outer LC | | U14: outer LC | | 0 | 0 | 1 | 1 | 0 | x | exit | 0 |
| dloopi | RX | | RY | | 0 | 0 | 1 | 1 | 0 | x | exit | 0 |
| mult | RX | | RY | | 0 | 1 | 0 | 0 | 0 | x | x | 0 |
| add/sub | RX | | RY | | 0 | 1 | 0 | 0 | 0 | x | x | 0 |
| logicp | PX | D | PZ | | 0 | 1 | 0 | 0 | 0 | x | x | 0 |
| Testi | RX | D | PZ | | 0 | 1 | 0 | 1 | 0 | =,>,< | | 0 |
| Movi | H/L | Fill | RZ | | 0 | 1 | 1 | 0 | 0 | x | x | 0 |
| loadi | Type | | RZ | | 0 | 1 | 1 | 1 | 0 | x | x | 0 |
| storel | Type | | RZ | | 0 | 1 | 1 | 1 | 0 | x | x | 0 |
| loadt | RX | | RZ | | 0 | 1 | 1 | 1 | 0 | x | x | 0 |
| storet | MZ | | RX | | 0 | 1 | 1 | 1 | 0 | x | x | 0 |
| Add/subI | RX | | RZ | | 1 | 0 | +/- | 0 | 0 | LI | s/u | 0 |
| mini.maxi | RX | | RZ | | 1 | 0 | X/N | 1 | 0 | x | x | 0 |
| and,ori | RX | | RZ | | 1 | 1 | &I | H/L | 0 | x | x | 0 |

Fig. 6G(1)

| 15 | 14 | 13 | 12 | 11 | 10 | 9 | 8 | 7 | 6 | 5 | 4 | 3 | 2 | 1 | 0 | |
|---|---|---|---|---|---|---|---|---|---|---|---|---|---|---|---|---|
| Rxt | Rzt | I/E | R/I | R/I | \multicolumn{5}{c}{Offset: UI5} | | | | | Length: UI5 | | | 0 |
| | | | | | | x | | RY | | | RV | | | | x | |
| Rzt | UI5: Position | | | | | Imm10 | | | | | | | | | | |
| rzh | rzl | D | U/S | 1 | Shift: UI5 | | | | | A/L | Lt | R/L | 0 | Fill | 1 | Fill: Sign/Zero |
| | | | | | 0 | ryh | | RY | | | | | | | | |
| x | x | x | x | 1 | Shift: UI15 | | | | | 1 | 1 | R/L | 1 | x | 1 | |
| | | | | | 0 | ryh | | RY | | | | | | | | |
| x | UI15 | | | | | | | | | | | | | | | |
| UI1 | UI4: outer L size | | | | UI4: Inner L size | | | | UI2: 0-Ls | | | UI4 ; Inner L start | | | 0 | BIT 15 is Continuation of Inner LC |
| x | UI4: outer L size | | | | UI4: Inner L size | | | | UI2: 0-Ls | | | UI4 ; Inner L start | | | 1 | |
| 0 | rxh | md | ryh | +/− | =/+ | RZ | | | | LI | rzh | rzl | s/u | s/u | 0 | |
| 0 | rxh | nd | ryh | ryl | +/− | RZ | | | | LI | rzh | rzl | x | x | 1 | |

| 1 | T/F | T/F | T/F | &I | &I | PY | | | | PV | | | | x | 1 | andp, orp, andorp, orandp: pz = (px relop py) relop pv) |
|---|---|---|---|---|---|---|---|---|---|---|---|---|---|---|---|---|
| \multicolumn{16}{c}{Imm 16} | | | | | | | | | | | | | | | | |
| \multicolumn{16}{c}{Imm 16} | | | | | | | | | | | | | | | | |
| 0 | 0 | \multicolumn{14}{c}{Imm 14} | | | | | | | | | | | | | | |
| 0 | 1 | \multicolumn{14}{c}{Imm 14} | | | | | | | | | | | | | | |
| 1 | Rzt | 0 | Type | | | S10 | | | | | | | | | | |
| 1 | Rzt | 1 | Type | | | S10 | | | | | | | | | | |
| \multicolumn{16}{c}{Imm 16} | | | | | | | | | | | | | | | | |
| \multicolumn{16}{c}{Imm 16} | | | | | | | | | | | | | | | | |
| \multicolumn{16}{c}{Imm 16} | | | | | | | | | | | | | | | | |

Fig. 6G(2)

MAC:

| 39 | 38 | 37 | 36 | 35 | 34 | 33 | 32 | 31 | 30 | 29 | 28 | 27 | 26 | 25 | 24 | 23 | 22 | 21 | 20 | 19 | 18 | 17 | 16 | 15 |
|---|---|---|---|---|---|---|---|---|---|---|---|---|---|---|---|---|---|---|---|---|---|---|---|---|
| Group | | | Pred | | | opcode | | | | | | SX | | | | | | | SY | | | | | |
| 1-40-Drt | | | | | | | | | | | | | | | | | | | | | | | | |
| 2-20 ser | | | | | | | | | | | | | | | | | | | | | | | | |
| 2-20 par | | | | | | | | | | | | | | | | | | | | | | | | |
| res. | | | | | | | | | | | | | | | | | | | | | | | | |

ARITH:

| 39 | 38 | 37 | 36 | 35 | 34 | 33 | 32 | 31 | 30 | 29 | 28 | 27 | 26 | 25 | 24 | 23 | 22 | 21 | 20 | 19 | 18 | 17 | 16 | 15 |
|---|---|---|---|---|---|---|---|---|---|---|---|---|---|---|---|---|---|---|---|---|---|---|---|---|
| Group | | | Prod | | | opcode | | | | | | SX | | | | | | | SY | | | | | |

```
0 0  NOP
0 1  Acc
1 0  Ext
1 1  Mac
```

EXT:

| 39 | 38 | 37 | 36 | 35 | 34 | 33 | 32 | 31 | 30 | 29 | 28 | 27 | 26 | 25 | 24 | 23 | 22 | 21 | 20 | 19 | 18 | 17 | 16 | 15 |
|---|---|---|---|---|---|---|---|---|---|---|---|---|---|---|---|---|---|---|---|---|---|---|---|---|
| Group | | | Prod | | | opcode | | | | | | SX | | | | | | | SY | | | | | |

```
0 0  NOP
0 1  Acc
1 0  Ext
1 1  Mac
```

LOGIC:

| 39 | 38 | 37 | 36 | 35 | 34 | 33 | 32 | 31 | 30 | 29 | 28 | 27 | 26 | 25 | 24 | 23 | 22 | 21 | 20 | 19 | 18 | 17 | 16 | 15 |
|---|---|---|---|---|---|---|---|---|---|---|---|---|---|---|---|---|---|---|---|---|---|---|---|---|
| Group | | | Prod | | | opcode | | | | | | SX | | | | | | | SY | | | | | |
| Group | | | | | | | | | | | | | | | | | | | | | | | | |

| 14 | 13 | 12 | 11 | 10 | 9 | 8 | 7 | 6 | 5 | 4 | 3 | 2 | 1 | 0 |
|----|----|----|----|----|----|----|----|----|----|----|----|----|----|----|
| PL | | PS | | SuDoD | | | | | Control | | | | | |
| | | | | | | | Rnd | L1 | V/S | S* | S+ | DA | SA | =/+ |

| PL | | PS | | Rnd | S* | DA | V/S | L1 | | S* | S* | | | | MUL-NOP |
| PL | | PS | | Rnd | S* | DA | V/S | L1 | +/- | S* | | | eregs | | MUL-ADD |
| PL | PS | Gx | S+ | Rnd | SA | DA | V/S | L1 | =/+ | S* | | | N/X | ereg | MUL-EXT |
| PL | PS | | ereg | Rnd | SA | DA | V/S | L1 | =/+ | S* | S· | SA | =/+ | L1 | MUL-MUL |

| 14 | 13 | 12 | 11 | 10 | 9 | 8 | 7 | 6 | 5 | 4 | 3 | 2 | 1 | 0 |
|----|----|----|----|----|----|----|----|----|----|----|----|----|----|----|
| | | | DZ | | | | | | Control | | | | | |
| | | | | | | | Rnd | Abs | Lmt | V/S | +/- | +/- | +/- | |
| | | | | | | | +/- | Abs | Lmt | V/S | | | eregs | |
| | | | | | | | +/- | Abs | Lmt | V/S | N/X | Gx | ereg | |
| md | L1 | S* | S+ | DA | SA | =/+ | +/- | Abs | Lmt | V/S | | | eregs | |

| 14 | 13 | 12 | 11 | 10 | 9 | 8 | 7 | 6 | 5 | 4 | 3 | 2 | 1 | 0 |
|----|----|----|----|----|----|----|----|----|----|----|----|----|----|----|
| | | | DZ | | | | | | | | | | | |
| | | | | | | | | N/X | Abs | Gx | V/S | | | |
| | | | | | | | | N/X | Abs | Gx | V/S | +/- | Lmt | ereg |
| | | | | | | | | N/X | Abs | Gx | V/S | N/X | Gx | ereg |
| | | | | | | | | N/X | Abs | Gx | V/S | | eregs | |

| 14 | 13 | 12 | 11 | 10 | 9 | 8 | 7 | 6 | 5 | 4 | 3 | 2 | 1 | 0 |
|----|----|----|----|----|----|----|----|----|----|----|----|----|----|----|
| md | L1 | S* | S+ | DA | SA | =/+ | | | | | | | | |
| | | | DZ | | | | | | | | | | | |

SHIFT:

| 39 | 38 | 37 | 36 | 35 | 34 | 33 | 32 | 31 | 30 | 29 | 28 | 27 | 26 | 25 | 24 | 23 | 22 | 21 | 20 | 19 | 18 | 17 | 16 | 15 |
|----|----|----|----|----|----|----|----|----|----|----|----|----|----|----|----|----|----|----|----|----|----|----|----|----|
| Group | | | Prod | | | opcode | | | | | | | SX | | | | | | | DZ | | | | |
| Group | | | Prod | | | opcode | | | | | | | SX | | | | | | | DZ | | | | |
| Group | | | Prod | | | Imm2 | | opcode | | | | | DX | | | | | Imm14 | | | | | | |

Immediate:

| 39 | 38 | 37 | 36 | 35 | 34 | 33 | 32 | 31 | 30 | 29 | 28 | 27 | 26 | 25 | 24 | 23 | 22 | 21 | 20 | 19 | 18 | 17 | 16 | 15 |
|----|----|----|----|----|----|----|----|----|----|----|----|----|----|----|----|----|----|----|----|----|----|----|----|----|
| Group | | | DZ | | | op | opcode | | | | SX | | | | | | | | | | | | | |

Imm32

Subop: MOV, ADD, SUB, MIN, MAX, AND, OR

Test:

| 39 | 38 | 37 | 36 | 35 | 34 | 33 | 32 | 31 | 30 | 29 | 28 | 27 | 26 | 25 | 24 | 23 | 22 | 21 | 20 | 19 | 18 | 17 | 16 | 15 |
|----|----|----|----|----|----|----|----|----|----|----|----|----|----|----|----|----|----|----|----|----|----|----|----|----|
| Group | | | Prod | | | opcode | | | | | | | SX | | | | | | | SY | | | | |

Branch:

| 39 | 38 | 37 | 36 | 35 | 34 | 33 | 32 | 31 | 30 | 29 | 28 | 27 | 26 | 25 | 24 | 23 | 22 | 21 | 20 | 19 | 18 | 17 | 16 | 15 |
|----|----|----|----|----|----|----|----|----|----|----|----|----|----|----|----|----|----|----|----|----|----|----|----|----|
| Group | | | Prod | | | opcode | | | | | | | | | | | | | | | | | | |

Misc:

7-bit specifier. Parallel Store. Parallel Load in DSP Instructions

| 6 | 5 | 4 | 3 | 2 | 1 | 0 | | |
|---|---|---|---|---|---|---|---|---|
| M/R | | | | | | | | |
| 0 | 0 | 0 | | SPR: s0-s 15 | | | | |
| 0 | 0 | 1 | | reserved | | | | |
| 0 | 1 | 0 | | AC-names | | | | |
| 0 | 1 | 1 | | gpr:r0-r15 | | | Mem(ptr) ‖ ptr += ldr | Always postupdate |
| 0 | 1 | | ptr:(r0) to (r 15) | | | off | Mem(ptr + ldr)   ptr: p14, p15 | Always preupdate |
| 1 | | | onset: U14 | | | ptr | | |

6-bit specifier: DSP Instructions

| 5 | 4 | 3 | 2 | 1 | 0 | |
|---|---|---|---|---|---|---|
| M/R | | | | | | |
| 0 | 0 | | qc-names | | | |
| 0 | 1 | | qpr: r0-r15 | | | |
| 1 | | ptr :(r0) to ((r15) | | | off | Always postupdate |

5-bit specifier: RISC Instructions

| 4 | 3 | 2 | 1 | 0 |
|---|---|---|---|---|
| 0 | | spr: s0-s15 | | |
| 1 | | gpr: r0-r15 | | |

4-bit specifier:

| 3 | 2 | 1 | 0 | |
|---|---|---|---|---|
| | gpr: r0-r15 | | | RISC Instructions |
| ptr: (r0-r7) | | | off | 20-bit DSP Instructions |
| | ereg | | | 20-bit Shadow DSP Instructions |

AR:

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| type | | | | permute | | | | CB|dx1:U13(0-7] | | | | | | xhr0: S15 (-16 to 15)] | | | | | | | | ptr | | | | | | | | | |

AC-names:

| 3 | 2 | 1 | 0 |      |
|---|---|---|---|------|
| 0 | 0 | 0 | 0 | A0   (use type, SIMD) |
| 0 | 0 | 0 | 1 | AI   |
| 0 | 0 | 1 | 0 | T    |
| 0 | 0 | 1 | 1 | TR   |
| 0 | 1 | 0 | 0 | A00  (unit 0) |
| 0 | 1 | 0 | 1 | AI0  |
| 0 | 1 | 1 | 0 | T0   |
| 0 | 1 | 1 | 1 | TR0  |
| 1 | 0 | 0 | 0 | Sx1  |
| 1 | 0 | 0 | 1 | Sx1s |
| 1 | 0 | 1 | 0 | Sx2  |
| 1 | 0 | 1 | 1 | Sx2s |
| 1 | 1 | 0 | 0 | Sy1  |
| 1 | 1 | 0 | 1 | Sy1s |
| 1 | 1 | 1 | 0 | Sy2  |
| 1 | 1 | 1 | 1 | Sy2s |

SPR:

gpr-type
ereg-type
fu · ctl
pls- ctf
cb - ctl
loop - ctl
per
status oreg-names

| 3 | 2 | 1 | 0 |      |
|---|---|---|---|------|
| 0 | 0 | 0 | 0 | A0   |
| 0 | 0 | 0 | 1 | AI   |
| 0 | 0 | 1 | 0 | T    |
| 0 | 0 | 1 | 1 | TR   |
| 0 | 1 | 0 | 0 | PP0  |
| 0 | 1 | 0 | 1 | Aout |
| 0 | 1 | 1 | 0 | PP1  |
| 0 | 1 | 1 | 1 | Dout |
| 1 | 0 | 0 | 0 | Sx1  |
| 1 | 0 | 0 | 1 | Sx1s |
| 1 | 0 | 1 | 0 | Sx2  |
| 1 | 0 | 1 | 1 | Sx2s |
| 1 | 1 | 0 | 0 | Sy1  |
| 1 | 1 | 0 | 1 | Sy1s |
| 1 | 1 | 1 | 0 | Sy2  |
| 1 | 1 | 1 | 1 | Sy2s |

Fig. 6i(2)

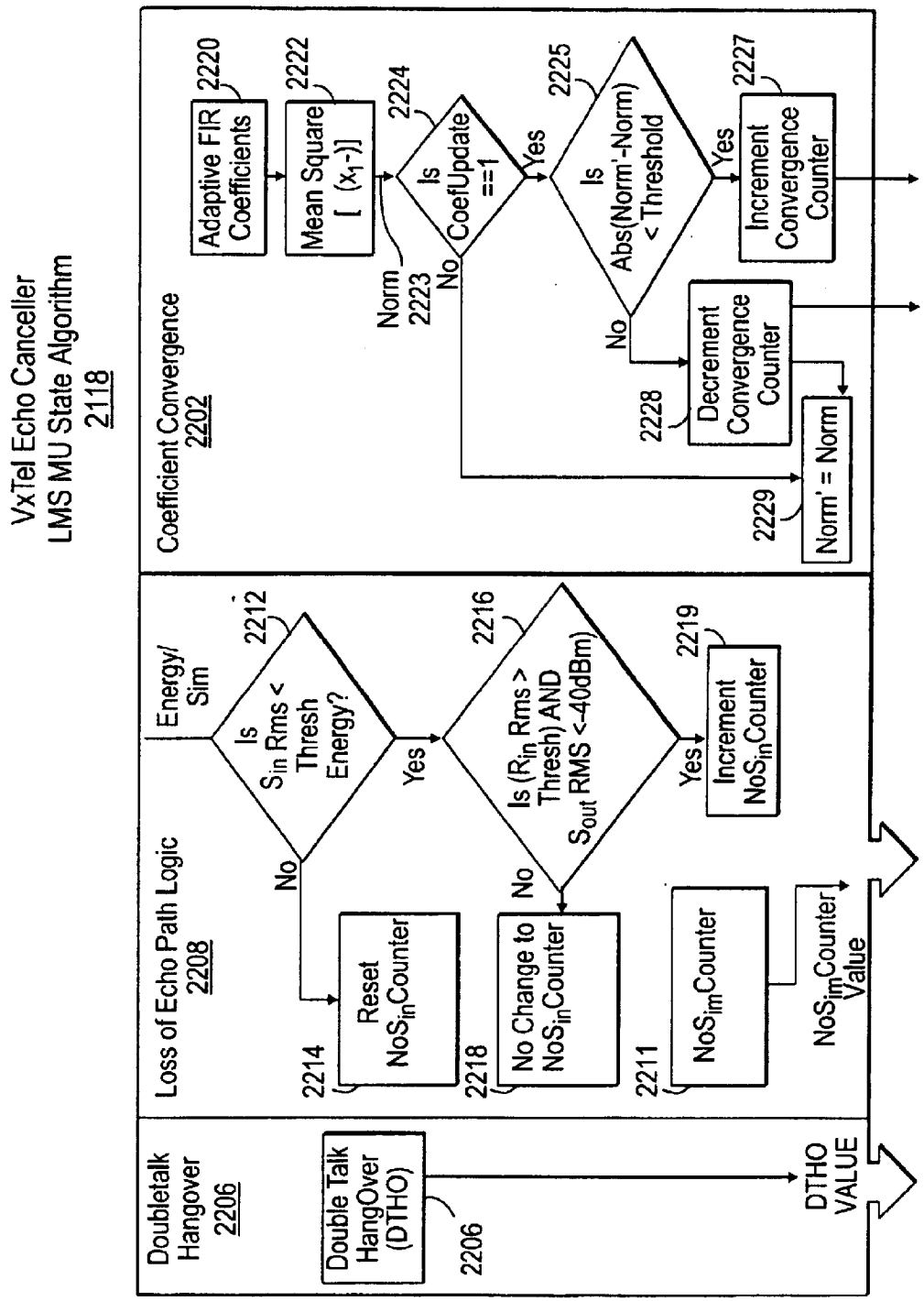
Fig. 22B(1)

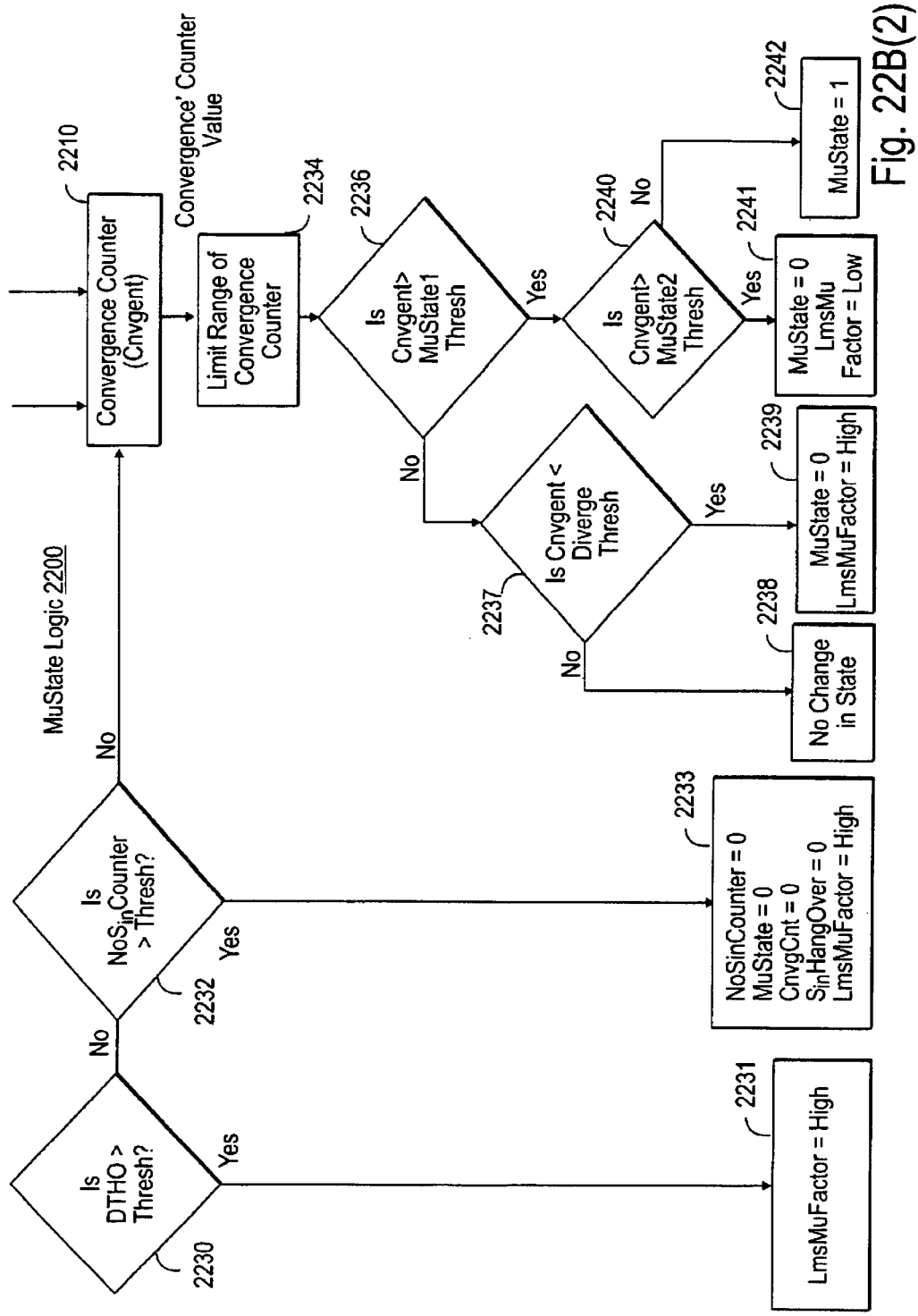
Fig. 22B(2)

Session Setup Message

| Title | Bit 7 | 6 | 5 | 4 | 3 | 2 | 1 | Bit 0 | Octet |
|---|---|---|---|---|---|---|---|---|---|
| Session ID 2702 | | | | SessionID Hi | | | | | 8 |
| | | | | SessionID Lo | | | | | 9 |
| Service Setup 2703 | | | | Coder Service | | | | | 10 |
| | | | | Decoder Service | | | | | 11 |
| Telephony 2704 | ECFS | | VAD | IBOB | 2710 | DTG | ECS | 2711 | 12 |
| | - | - | - | 2712 | TG | | TD | DTD | 13 |
| Near End Channels 2705 | | | | Near Recv Addr(11..8) | | | | | 14 |
| | | | | Near Recv Addr(7..0) | | | | | 15 |
| | | | | Near Xmt Addr(11..8) | | | | | 16 |
| | | | | Near Xmt Addr(7..0) | | | | | 17 |
| Far End Channels 2706 | | | | Far Recv Addr(11..8) | | | | | 18 |
| | | | | Far Recv Addr(7..0) | | | | | 19 |
| | | | | Far Xmt Addr(11..8) | | | | | 20 |
| | | | | Far Amt Addr(7..0) | | | | | 21 |
| | | | | reserved | | | | | 22 |
| | | | | reserved | | | | | 23 |

Fig. 27

Echo Cancellation Settings (ECS)

| (Value)(3-bit) | Echo Cancellation Setup |
|---|---|
| 0 | No Echo Cancellation Setup |
| 1 | 8ms EC tail length |
| 2 | 16 ms EC tail length |
| 3 | 32 ms EC tail length |
| 4 | 64 ms EC tail length |
| 5 | 128 ms EC tail length |
| 6-7 | Reserved |

Fig. 28

Echo Cancellation Frame Size Settings (ECFS)

| (Value)(4-bit) | Frame Size |
|---|---|
| 0 | 16 samples |
| 1 | 32 samples |
| 2 | 64 samples |
| 3 | 102 samples |
| 4 | 128 samples |
| 5 | 204 samples |
| 6 | 256 samples |
| 7 | 512 smples |
| 8 | 1024 samples |
| ... | |
| 9..15 | Reserved |

Fig. 29

| Title | Bit7 | Bit6 | Bit5 | Bit4 | Bit3 | Bit2 | Bit1 | Bit0 | Octet |
|---|---|---|---|---|---|---|---|---|---|
| Session ID | Session ID (High) ||||||||  8 |
|  | Session ID (Low) |||||||| 9 |
|  | Reserved |||||||| 10 |
|  | Reserved |||||||| 11 |

REQ_EC_PARMS Message Structure

Fig. 30

| Title | Bit7 | Bit6 | Bit5 | Bit4 | Bit3 | Bit2 | Bit1 | Bit0 | Octet |
|---|---|---|---|---|---|---|---|---|---|
| Status | Status MS byte |||||||| 8 |
|  |  |||||||| 9 |
|  |  |||||||| 10 |
|  | Status LS byte |||||||| 11 |
| Session ID | Session ID (High) |||||||| 12 |
|  | Session ID (Low) |||||||| 13 |
|  | - | Clear | Freeze | - | ADPT | CNG | NLP | EC | 14 |
|  | - | - | ERL |||| MuteR$_{in}$ | MuteS$_{out}$ | 15 |

REQ_EC_PARMS_RSP Message Structure

Fig. 31

| Title | Bit7 | Bit6 | Bit5 | Bit4 | Bit3 | Bit2 | Bit1 | Bit0 | Octet |
|---|---|---|---|---|---|---|---|---|---|
| Session ID | Session ID (High) |||||||| 8 |
|  | Session ID (Low) |||||||| 9 |
|  | Reserved |||||||| 10 |
|  | Reserved |||||||| 11 |

EC_STAT_REQ Message Structure

Fig. 32

| Parameter | Description |
|---|---|
| EC_OFF | Internal EC disable(1 = EC disabled for current frame) |
| LMS_Init | EC coefficient & history initialization(1 = coefficients/history cleared) |
| LMS_up | EC coefficient & history update(1 = coefficients/history updated) |
| R$_{in}$Det | R$_{in}$ Signal Detect Flag (1 = signal detected) |
| S$_{in}$Det | R$_{in}$ Signal Detect Flag (1 = signal detected) |
| DTDet | Double Talk Detect Flag (1 = Double Talk Detected) |

- ECHO Canceller Status Description

Fig. 33

| Parameter | Description |
|---|---|
| EC | Echo Canceller enable/disable (1 = enabled) |
| NLP | Non Linear Processor enable/disable (1 = enabled) |
| CNG | NLP comfort noise enable/disable (1 = enable) |
| ADPT | 2100 Hz EC disable tone enable/diasble (1 = enabled, 2100 Hz EC disable tone will disable the EC adaption) |
| Freeze | Ec coefficient and history update enable/disable (1 = update disabled) |
| Clear | Clear EC coefficient and filter history (1 = clear the coefficients and history) |
| MuteS$_{out}$ | S$_{out}$ Mute enable/disable (1 = enable Sout mute) |
| MuteR$_{in}$ | R$_{in}$ Mute enable/disable (1 = enable Rin mute) |
| ERL | Echo return loss: 0 = 0dB<br>1 = -3dB<br>2 = -6db<br>3..15 : reserved |

EC_Parameter Description  Fig. 34

| Title | Bit7 | Bit6 | Bit5 | Bit4 | Bit3 | Bit2 | Bit1 | Bit0 | Octet |
|---|---|---|---|---|---|---|---|---|---|
| Session ID | Session ID (High) | | | | | | | | 8 |
| | Session ID (Low) | | | | | | | | 9 |
| EC Param | - | Clear | Freeze | - | ADPT | CNG | NLP | EC | 10 |
| | - | - | ERL | | | | MuteR$_{in}$ | MuteS$_{out}$ | 11 |

SET_EC_PARMS Message Structure  Fig. 35

| Title | Bit7 | Bit6 | Bit5 | Bit4 | Bit3 | Bit2 | Bit1 | Bit0 | Octet |
|---|---|---|---|---|---|---|---|---|---|
| Status | Status MS byte | | | | | | | | 8 |
| | | | | | | | | | 9 |
| | | | | | | | | | 10 |
| | Status LS byte | | | | | | | | 11 |
| Session ID | Session ID (High) | | | | | | | | 12 |
| | Session ID (Low) | | | | | | | | 13 |
| - | Reserved | | | | | | | | 14 |
| - | Reserved | | | | | | | | 15 |

SET_EC_PARMS_RSP Message Structure  Fig. 36

| Title | Bit7 | Bit6 | Bit5 | Bit4 | Bit3 | Bit2 | Bit1 | Bit0 | Octet |
|---|---|---|---|---|---|---|---|---|---|
| Status | \multicolumn{8}{l|}{Status MS byte} | 8 |
| | | | | | | | | | 9 |
| | | | | | | | | | 10 |
| | \multicolumn{8}{l|}{Status LS byte} | 11 |
| Session ID | \multicolumn{8}{l|}{Session ID (High)} | 12 |
| | \multicolumn{8}{l|}{Session ID (Low)} | 13 |
| Frame-State | - | - | DTDet | SinDet | RinDet | LMS_Up | LMS_IniT | EC_OFF | 14 |
| | \multicolumn{8}{l|}{Reserved} | 15 |
| $R_{in}$ Status | \multicolumn{8}{l|}{$R_{in}$ Ave Max Energy (High)} | 16 |
| | \multicolumn{8}{l|}{$R_{in}$ Ave Max Energy (Low)} | 17 |
| | \multicolumn{8}{l|}{$R_{in}$ Ave Energy (High)} | 18 |
| | \multicolumn{8}{l|}{$R_{in}$ Ave Energy (Low)} | 19 |
| | \multicolumn{8}{l|}{$R_{in}$ Energy Peak Decay (High)} | 20 |
| | \multicolumn{8}{l|}{$R_{in}$ Energy Peak Decay (Low)} | 21 |
| | \multicolumn{8}{l|}{$R_{in}$ Hang Over (High)} | 22 |
| | \multicolumn{8}{l|}{$R_{in}$ Hang Over (Low)} | 23 |
| $S_{in}$ Status | \multicolumn{8}{l|}{$S_{in}$ Ave Max Energy (High)} | 24 |
| | \multicolumn{8}{l|}{$S_{in}$ Ave Max Energy (Low)} | 25 |
| | \multicolumn{8}{l|}{$S_{in}$ Ave Energy (High)} | 26 |
| | \multicolumn{8}{l|}{$S_{in}$ Ave Energy (Low)} | 27 |
| | \multicolumn{8}{l|}{$S_{in}$ Energy Peak Decay (High)} | 28 |
| | \multicolumn{8}{l|}{$S_{in}$ Energy Peak Decay (Low)} | 29 |
| | \multicolumn{8}{l|}{$S_{in}$ Hang Over (High)} | 30 |
| | \multicolumn{8}{l|}{$S_{in}$ Hang Over (Low)} | 31 |
| $S_{out}$ Status | \multicolumn{8}{l|}{$S_{out}$ Ave Max Energy (High)} | 32 |
| | \multicolumn{8}{l|}{$S_{out}$ Ave Max Energy (Low)} | 33 |
| Double Talk | \multicolumn{8}{l|}{Double Talk Hang Over (High)} | 34 |
| | \multicolumn{8}{l|}{Double Talk Hang Over (Low)} | 35 |

EC_STST_REQ_RSP_Message Structure

Fig. 37

*Echo Canceller Configuration Message*

| Title | Bit7 | Bit6 | Bit5 | Bit4 | Bit3 | Bit2 | Bit1 | Bit0 | Octet |
|---|---|---|---|---|---|---|---|---|---|
| | Session ID (High) | | | | | | | | 8 |
| | Session ID (Low) | | | | | | | | 9 |
| | - | AHD | NF | ONF | AFC | Adpt | Sin-Mute | Rin-Mute | 10 |
| | By-Pass | VNB | AGC | Vreset | CB | NLP | EBP | EC | 11 |
| | – | | | | | | | | 12 |
| | – | FRL (3..0) | | | | ECTL(2..0) | | | 13 |
| | – | | RL (8..3) | | | | | | 14 |
| | RL (2..0) | | | SL (4..0) | | | | | 15 |

Fig. 38

Description of EC_PARMS VSMP Message Parameters

| Parameter | Description |
|---|---|
| Session ID | Session Identification.<br>The Session ID is a unique handle that identifies the session on the VX-SP 1000. |
| AHD | Adaptive Howling Detector.<br>A special narrowband filter is used to detect "howling" tone signaling.<br>•0 = Howling detector is disabled<br>•1 = Howling detector is enabled |
| NF | Noise Filter.<br>With NF enabled, comfort noise controlled by near-end noise level is added at the $S_{out}$ port.<br>•0 = Noise filtering is disabled in the non-linear processor (NLP).<br>•1 = Noise filtering is enabled in the NLP. |
| ONF | Offset Nulling Filter.<br>This high-pass filter bit is used to remove DC offset in the $R_{in}$ to $R_{out}$ path.<br>•0 = The offset nulling filter in the $R_{in} / R_{out}$ path is not bypassed.<br>•1 = The offset nulling filter in the $R_{in} / R_{out}$ path is bypassed. |
| AFC | Adaptive Filter Coefficient.<br>Clearing the coefficients is used during debugging and testing.<br>•0 = Adaptive filter coefficients are not cleared.<br>•1 = Adaptive filter coefficient are cleared. |
| Adpt | Adapter.<br>The adapter bit is used to detect the 2100-Hz phase-reversing EC disable tone from the far end which disables echo cancelling cancellation.<br>•0 = The echo canceller adaptation is disabled.<br>•1 = The echo canceller adaptation is enabled. |

Fig. 39A(1)

| | |
|---|---|
| Sin Mute | Send In Mute<br>Muting of $S_{in}$ is during debugging and testing according to G.168.<br><br>•0 = The $S_{in}$ path is not muted to quiet mode.<br>•1 = The $S_{in}$ path is muted to quiet mode. |
| ECTL(2:0) | Echo Canceller Tail Length [2:0].<br>When these bits are:<br>• 0 = Echo canceller tail length is 16ms.<br>• 1 = Echo canceller tail length is 32ms.<br>• 2 = Echo canceller tail length is 48ms.<br>• 3 = Echo canceller tail length is 64ms.<br>• 5 = Echo canceller tail length is 128ms.<br>• 6,7,8 = Reserved |
| RL[8:] | Receive Out Limiter [8:0].<br>These bits program the output limiter threshold value in the $R_{out}$ path.<br>• Default value: (1F40)h, equal to 3.14 dBm0<br>• Maximum value: 15 dBm0<br>• Minimum value: -38 dBm0<br>Note: The term dBm0 is defined as the power in dBm referred to or measured at a zero-transmission level point [where 0 dBm transmission level point is a point in a communication system at which the reference level is 1 mW (that is, 0 dBm). The reference is for system design and test purposes. |
| SL[4:0] | Send Out Limiter [4:0]<br>These bits program the output limiter threshold value in the Ssub path.<br>• Default value: (1F40)h, equal to 3.14 dBm0<br>• Maxium value: (7F40)h<br>in the RL parameter description, see the Note describing the term dBm0. |

Fig. 39A(2)

Description of EC_PARMS_VSMP Message Parameters (Continued)

| Parameter | Description |
|---|---|
| $R_{in}$ Mute | Receive In Mute<br>Muting of $R_{in}$ is used during debugging and testing according to G. 168.<br>• 0 = The $R_{in}$ path is not muted to quiet mode.<br>• 1 = The $R_{in}$ path is muted to quiet mode. |
| Bypass | Bypass.<br>This bit is useful during debugging and testing..<br>• 0 = Send and receive paths are not bypassed.<br>• 1 = Send and receive paths are transparently bypassed. |
| VNB | Very Narrow Band.<br>Narrowband signal detectors are FIR filters programmed to detect specific band-limited tones (for<br>signalling, dialing, status indication, call progress, and so forth.)<br>• 0 = Narrowband signal detectors in $R_{in}$ and $S_{in}$ paths are enabled.<br>• 1 = Narrowband signal detectors in $R_{in}$ and $S_{in}$ paths are disabled. |
| AGC | Automatic Gain Control.<br>• 0 = Automatic gain control is disabled.<br>• 1 = Automatic gain control is enabled. |
| $V_{Reset}$ | Value Reset<br>• 0 = The VX-SP1000 reset to default values is complete.<br>• 1 = The VX-SP1000 is in the process of being reset to default values. |
| CB | Call Boundary (for Channel).<br>This bit is an external means to restart adaptive coefficient convergence.<br>For example, in a mobile wireless network, the network can sense a sudden change in the echo path.<br>• 0-to-1 transition = Call boundary. ???<br>• Otherwise = No call boundary. ??? |
| NLP | Non-Linear Processor<br>• 0 = The non-linear processor is disabled in the $R_{in}/R_{out}$ path.<br>• 1 = The non-linear processor is enabled in the $R_{in}/R_{out}$ path. |
| EBP | Enable Band Pass.<br>Per-channel 64 clear enable or disable. ?????????????<br>• 0 = Disable ?????<br>• 1 = Enable ????? |
| EC | Echo Canceller.<br>• 0 = Disable the echo canceller.<br>• 1 = Enable the echo canceller. |
| FRL[3:0] | Frame Length [3:0]<br>When the value of these bits are:<br>• 0 = Frame length is 16 samples.<br>• 1 = Frame length is 32 samples.<br>• 2 = Frame length is 64 samples.<br>• 3 = Frame length is 102 samples.<br>• 4 = Frame length is 128 samples.<br>• 5 = Frame length is 204 samples.<br>• 6 = Frame length is 256 samples.<br>• 7 = Frame length is 512 samples. |

Fig. 39B

Description of EC_PARMS_VSMP Message Parameters

| Parameter | Description |
|---|---|
| Session ID | Session Identification (Read Only). The Session identification is the unique handle that identifies the session on the VX-SP1000. |
| NLP | Non-Linear Processing (Read Only). <br> • 0 = Non-linear processing is not activated. <br> • 1 = Non-linear processing is activated. |
| DTALK | Double-Talk (Read Only). <br> • 0 = Double-talk is not detected. <br> • 1 = Double-talk is detected. |
| NB | Narrowband (Read Only). <br> • 0 = A narrowband signal is not detected in the Receive($R_{in}$) path. <br> • 1 = A narrowband signal is detected in the Receive($R_{in}$) path. |
| $R_{in}$ | Receive in (Read Only). Monitors the $R_{in}$ signal RMS peak level at reference point. |
| $R_{out}$ | Receive Out (Read Only). Monitors the $R_{out}$ signal RMS peak level at reference point. |
| $S_{in}$ | Send in (Read Only). Monitors the $R_{in}$ signal RMS peak level at reference point. |
| ERE | Error Residual Echo (Read Only). Monitors the Error signal (the residual echo) peak level at reference point. |
| $S_{out}$ | Send Out (Read Only) Monitors the $R_{out}$ signal RMS peak level at reference point. |

Fig. 40

NETWORK ECHO CANCELLER FOR INTEGRATED TELECOMMUNICATIONS PROCESSING

CROSS REFERENCE TO RELATED APPLICATIONS

This application claims the benefit of U.S. Provisional Patent Application No. 60/231,521 entitled "NETWORK ECHO CANCELLER FOR INTEGRATED TELECOMMUNICATIONS PROCESSING", filed Sep. 9, 2000 by Bist et al. and is related to U.S. patent application Ser. No. 09/654,333 entitled "INTEGRATED TELECOMMUNICATIONS PROCESSOR FOR PACKET NETWORKS', filed Sep. 1, 2000 by Bist et al, all of which are to be assigned to Intel Corporation.

FIELD OF THE INVENTION

This invention relates generally to signal processors and echo cancellers. More particularly, the invention relates to a network echo canceller for integrated telecommunications processing.

BACKGROUND OF THE INVENTION

Single chip digital signal processing devices (DSP) are relatively well known. DSPs generally are distinguished from general purpose microprocessors in that DSPs typically support accelerated arithmetic operations by including a dedicated multiplier and accumulator (MAC) for performing multiplication of digital numbers. The instruction set for a typical DSP device usually includes a MAC instruction for performing multiplication of new operands and addition with a prior accumulated value stored within an accumulator register. A MAC instruction is typically the only instruction provided in prior art digital signal processors where two DSP operations, multiply followed by add, are performed by the execution of one instruction. However, when performing signal processing functions on data it is often desirable to perform other DSP operations in varying combinations.

An area where DSPs may be utilized is in telecommunication systems. One use of DSPs in telecommunication systems is digital filtering. In this case a DSP is typically programmed with instructions to implement some filter function in the digital or time domain. The mathematical algorithm for a typical finite impulse response (FIR) filter may look like the equation $Y_n = h_0 X_0 + h_1 X_1 + h_2 X_2 + \ldots + h_N X_N$ where $h_n$ are fixed filter coefficients numbering from 1 to N and $X_n$ are the data samples. The equation $Y_n$ may be evaluated by using a software program. However in some applications, it is necessary that the equation be evaluated as fast as possible. One way to do this is to perform the computations using hardware components such as a DSP device programmed to compute the equation $Y_n$. In order to further speed the process, it is desirable to vectorize the equation and distribute the computation amongst multiple DSP arithmetic units such that the final result is obtained more quickly. The multiple DSP arithmetic units operate in parallel to speed the computation process. In this case, the multiplication of terms is spread across the multipliers of the DSPs equally for simultaneous computations of terms. The adding of terms is similarly spread equally across the adders of the DSPs for simultaneous computations. In vectorized processing, the order of processing terms is unimportant since the combination is associative. If the processing order of the terms is altered, it has no effect on the final result expected in a vectorized processing of a function.

One area where finite impulse response filters is applied is in echo cancellation for telephony processing. Echo cancellation is used to cancel echoes over full duplex telephone communication channels. The echo-cancellation process isolates and filters the unwanted signals caused by echoes from the main transmitted signal in a two-way transmission.

Echoes are part of everyday life. Whenever we speak, we hear our own voice transmitted through both the air and our bodies. These echoes have a short latency, arriving at our ears within a tenth of a millisecond. Our minds automatically filter short-latency echoes so we do not notice them. We are so used to hearing these echoes as sidebands that when they are removed artificially, we notice their absence. Therefore, a certain amount of short-latency echo is desirable. However, the long-latency echoes experienced in modern telephony networks are not desirable.

Echoes are common in telephony equipment. They are caused by electrical reflections from nearly any impedance mismatch as well as by acoustical coupling between loud speakers and microphones. These echoes do not cause auditory problems until their delay (or 'latency') increases to roughly 30 ms or more.

Typically, echoes are not a serious issue in local telephone connections. However, in long-distance telephone connections, echoes become increasingly serious as their latency increases. As a result, a significant amount of signal processing is needed in a telephony-processing subsystem to eliminate the effect of echoes.

With the exception of speaker telephones (which are prone to echoes), most acoustical echoes can be controlled by careful design of the telephone handset. In contrast, electrical echoes are far harder to prevent and are caused by virtually any impedance mismatch in the telephone communication circuit.

Referring now to FIG. 8, a typical prior art telephone communication system is illustrated. A telephone, fax, or data modem couples to a local subscriber loop 802 at one end and another local subscriber loop 802' at an opposite end. One source of impedance mismatch is from the cable impedance in the local subscriber loop 802. Local subscriber loops 802 vary in length from a few hundred feet to about 25,000 feet, so there is always some mismatch with the constant impedance terminations at a central office.

Each of the local subscriber loops 802 and 802' couple to 2-wire/4-wire hybrid circuits 804 and 804'. An even greater source of impedance mismatch is caused by 2-wire/4-wire hybrid circuits 804 and 804'. Hybrid circuits 804 and 804' are composed of resistor networks, capacitors, and ferrite-core transformers. Hybrids circuits 804 and 804' convert the 4-wire telephone trunk lines 806 (a pair in each direction) running between telephone exchanges of the PSTN 812 to each of the 2-wire local subscriber loops 802 and 802'. The hybrid circuit 804 is intended to direct all the energy from a talker on the 4-wire trunk 806 at a far-end to a listener on a 2-wire local subscriber loop 802 at a near end. Impedance mismatches in the hybrid circuit 804 results in some of the transmitted energy from the far-end being reflected back to the far-end from the near-end as a delayed version of the far-end talker's speech. As little as a 30 millisecond (msec) round-trip delay in the echo back to the far end is perceptible. Round-trip delays of 50 msec or more are objectionable and should be reduced or eliminated.

Echoes 810' are formed when a speech signal from a far end talker leaves a far end hybrid 804' on a pair of the four wires 806', and arrives at the near end after traversing the PSTN 812, and may be heard by the listener at the near side. A small portion of this signal is reflected by the hybrid 804 at the near end, and returns on a different pair of the four wires 806 to the far end and arrives at the hybrid 804' delayed by a period of time referred to as the "echo tail length". The talker at the far end hears this reflected and delayed small portion of his speech signal as an echo. Echoes can occur at each talking end as each person switches from being a talker to a listener. In traditional telephone networks, an echo canceller is placed at each end of the PSTN in order to reduce and attempt to eliminate this echo.

In general, several things contribute to an echo: (i) energy reflection due to impedance mismatches; (ii) a sufficiently large roundtrip delay between a talker's transmitted signal and its reflection; and (iii) poor echo attenuation occurring at the hybrid (i.e. low Echo Return Loss). There are two major causes for increased round-trip delay: (I) propagation delays and (II) digital signal processing algorithmic delays. Propagation delays are caused by the circuit length from talker to listener and transit time over satellite links. The digital signal processing (DSP) algorithmic delays are caused by one or more of the following: Conversion delays between analog to digital and digital to analog; signal processing ordinarily performed to enhance signal quality; signal transcoding such as that performed in digital wireless telephony equipment for Code-division multiple access (CDMA), Global system for mobile communications (GSM) and Personal Communications Services (PCS); and packet delays or latency.

With interest in providing telephony over packet networks such as the Internet, another factor is introduced to increase the roundtrip delay which is of great concern. The delays or latency caused by signal processing incurred in packet processing of packets and protocol stack execution. The delay/latency is not necessarily related to distance but due to processing delays. If enough delay/latency is introduced, echoes can be heard even on local telephone calls. The longer delay/latency further magnifies other echo-related communication problems such as double-talk where both far end and near end talk at the same time.

The delay/latency in a packet base network can be attributed to hybrid delay, coder or algorithmic delay, packetization/transmission delay, transit or network delay, surface land-line propagation delay and satellite-link propagation delay. The hybrid delay is the round trip delay between an echo canceller and network hybrids and is typically between 32 to 64 msec. The coder or algorithmic delay is the delay from a signal processing algorithm that uses a certain-size 'window' to force a delay while waiting for all necessary samples and is typically up to 40-ms long. For example, the G.723.1 coder has an algorithmic delay of approximately 37.5 ms. The packetization/transmission delay is associated with the creation of packets and transmitting the packet through the protocol stacks. The transit or network delay is caused by access line delay (approximately 10–40 msecs) and router/switch delay (approximately 5 mses per router/switch). The surface land-line propagation delay is a delay associated with cabling distances and can be up to approximately 20 msecs from coast to coast of the United States. The satellite link propagation delay is associated with the delay time in high earth-orbit satellites such as geostationary satellites which can add approximately 250 msecs and the delay time associated with low earth-orbit satellites which can add a few milli-seconds of delay each. The delay between when a packet is sent and when it is received has a fixed component which is technology limited (processing and transmission link delay) and a variable component due to queuing and processing of packets, route hops, speed of the backbone, congestion, and so forth. The ITU-T G. 114 committee recommends no more than a 400 ms one-way total delay for voice, and no more than 250 ms for real-time fax transmissions one-way.

Referring now to FIG. 9, a typical prior art digital echo canceller 900 is illustrated. The prior art digital echo canceller 900 couples between the hybrid circuit 804 and the public switched telephone network (PSTN) 902 on the telephone trunk lines. The governing specification for digital echo cancellers is the ITU-T recommendation G.168, Digital network echo cancellers. The following terms from ITU-T document G.168 are used herein and are illustrated in FIG. 9. The end or side of the connection towards the local handset is referred to as the near end, near side or send side 910. The end or side of the connection towards the distant handset is referred to as the far end, far side or receive side 920. The part of the circuit from the near end 910 to the far end 920 is the send path 930. The part of the circuit from the far end to the near end is the receive path 935. The part of the circuit (i.e. copper wire, hybrid) in the local loop 802, between the end system or telephone system 108 and the central-office termination of the hybrid 804 is the end path. Speech signals entering the echo canceller 900 from the near end 910 are the send input $S_{in}$. Speech signals entering the echo canceller from the far end 920 are the received input $R_{in}$. Speech signals output from the echo canceller 900 to the far end 920 are the send output $S_{out}$. Speech signals exiting the echo canceller to the near end 910 are the received output $R_{out}$.

If only the far end 920 is talking to generate speech signals, $R_{in}$ arrives and passes through the echo canceller 900 and forms $R_{out}$. $R_{out}$ enters the local loop 802 via the hybrid 804. Due to impedance mismatches, part of the $R_{out}$ energy is reflected by the hybrid 804 and becomes the $S_{in}$ component. Instead of being near side speech, $S_{in}$ in this case is an undesirable echo of the speech from the far end 920. $S_{in}$, being an echo, should be cancelled before being re-transmitted back to the far end 920. The delay in the hybrid between the $R_{out}$ signal and the respective $S_{in}$ echo signal is referred to as the echo tail length. All echo cancellation occurs in the send path 930 between $S_{in}$ and $S_{out}$. Signals $S_{in}$, $R_{in}$, $S_{out}$, and $R_{out}$ are all assumed to be 16$b$ linear values, not companded 8$b$ PCM, or encoded per an ITU-T G.7xx spec.

The typical prior art digital echo canceller 900 includes the basic components of an echo estimator 902, a digital subtractor 904, and a non-linear processor 906. Typically, the echo-cancellation process in the typical prior art digital echo canceller 900 begins by eliminating impedance mismatches. In order to do so, the typical digital echo canceller 900 taps the receive-side input signal ($R_{in}$). $R_{in}$ is processed in the echo estimator 902 to generate an estimate of the echo which is then subtracted from $S_{in}$. Rin is also passed through to the near end 910 without change as the $R_{out}$ signal. The echo estimator 902 is a linear finite impulse response (FIR) convolution filter implemented in a DSP. The estimator 902 accepts successive samples of voice on Rin (typically a 16 bit sample every 125 microseconds). The voice samples are multiplied with a set of filter coefficients approximating the impulse response of circuitry in the endpath to generate an echo estimation. Over time, the set of filter coefficients are changed (i.e. adapted) until they accurately represent the desired impulse response to form an accurate echo estimation. The echo estimation is coupled into the subtractor 904. If the echo estimation is accurate, it is substantially equivalent to the actual echo on $S_{in}$.

The subtractor 904 digitally subtracts the echo estimation from the $S_{in}$ signal. The subtractor 904 generates a difference which is an error between the actual echo value and the echo estimation value. Note that only the actual echo value is present in the $S_{in}$ signal when the near-end 910 is not generating speech signals (i.e. no one is talking) on $S_{in}$. A feedback mechanism between the digital subtractor 904 and the echo estimator 902 uses the error to update the filter coefficients in the echo estimator 902 to cause convergence between values of the echo estimation and the actual echo. Since voice levels can vary, the echo estimation must vary as well. Thus the filter of the echo estimator 902 uses the error feedback in a continuous adaptation process.

If a person at the near end 910 starts talking at the same time as a person at the far end 920 each generating speech signals, the Sin signal includes the actual echo signal and the speech signal of the talker at the near end 910. This condition is known as "double-talk" which can disrupt the adaptation process if measures are not taken. A detector is used to detect the "double-talk" condition and inhibits the adaptation process and retains its filter coefficients when both sides are talking at once. While adaptation is inhibited, echoes can still be cancelled using the retained filter coefficients. Once the near end person stops talking and generating speech signals on $S_{in}$, adaptation in the echo estimator 902 can continue. If the far end 920 person stops talking stopping the generation of speech signals on $R_{in}$, the filter coefficients are retained until the far end 920 person starts talking without the near end 910 and adaptation can continue.

If the signal at Rin was a very sharp, impulsive, explosive sound (mathematically consisting of a very wide frequency spectrum), the impulse response could be immediately known. However because the input is usually speech signals, it takes a period of time for the filter coefficients to adapt and converge to a close approximation of the required transfer function for generating an echo estimation. As a result, it is possible to predict the adaptation delay as well as an Echo Return Loss Enhancement (ERLE). The ERLE of the echo canceller 900 is the echo attenuation provided by it.

The output of the subtractor 904 is coupled into the $S_{out}$ port via the non-linear processor 906 and fed back to the FIR filter of the echo estimator 902. Control logic (not shown) in the echo canceller 900 receives the output from the subtractor 904 to implement a negative feedback mechanism. Large error signals on the output from the subtractor cause the negative feedback mechanism to make large changes in the filter coefficients to minimize the error signal on the output from the subtractor 904 between the actual echo and the echo estimation. The adaptation process of the filter coefficients to minimize the error signal should only take a few milliseconds. However, even a fully adapted set of filter coefficients represents a linear model of the system and does not correlate with non-linear effects. Non-linear echoes associated with non-linear effects can be significant and will not be cancelled by linear adaptations in filter coefficients. Non-linear echoes can be caused by non-linear effects such as clipped speech signals, speech compression, imperfect PCM conversions (quantization effects), as well as poorly designed speakerphones that allow acoustical echoes to occur on the near-side handset. The non-linear processor (NLP) 906 in the send path 930 is used to remove non-linear echoes in the output signal from the subtractor 904.

The non-linear processor 906 has a variable NLP suppression threshold which adapts to the signal levels on Rin and Sin because speech levels are dynamic. The non-linear processor 906 removes any signal in the output from the subtractor 904 that is below its varying NLP suppression threshold. The NLP suppression threshold is adapted to changing speech levels in order to prevent clipping of speech signals generated in $S_{in}$ at the near end 910 (its presence being signaled by a 'double-talk' detector). The adaptation rates of echo cancellers influence the dynamics of variations in the NLP suppression threshold. The adaptation rate controls whether or not the first syllable of speech at the near end 910 is clipped or not at the far end 920. Typically, the subtractor 904 can remove no more than 35 dB of echo. Therefore, the NLP is needed to reduce any residual echo including non-linear echoes to inaudible levels at the far end 920.

The typical prior art digital echo canceller has a number of disadvantages. One disadvantage is that it does not provide full telephony processing. Another disadvantage is that the prior art digital echo canceller has not yet been adapted for communicating data over a packet network. Another disadvantage is that it has yet to provide an integrated solution for multiple channels. Yet another disadvantage is that the mechanism of detecting double talk and controlling the adaptation process in response to a double talk condition is inefficient. Another disadvantage is that prior mechanisms for switching non-linear processing ON or OFF have been rather crude and unsophisticated. Yet another disadvantage is that prior adaptation methods and their respective adaptation rates are unrefined in prior echo cancellers.

BRIEF DESCRIPTIONS OF THE DRAWINGS

FIG. 3 is a block diagram of an instance of the core processors within the ASSP of the invention.

FIG. 4 is a block diagram of the RISC processing unit within the core processors of FIG. 3.

FIG. 5A is a block diagram of an instance of the signal processing units within the core processors of FIG. 3.

FIG. 6C is an exemplary bitmap for a control extended dyadic DSP instruction.

FIG. 6D is an exemplary bitmap for a non-extended dyadic DSP instruction.

FIG. 6E and 6F list the set of 20-bit instructions for the ISA of the invention.

FIG. 6G lists the set of extended control instructions for the ISA of the invention.

FIG. 6H lists the set of 40-bit DSP instructions for the ISA of the invention.

FIG. 6I lists the set of addressing instructions for the ISA of the invention.

Figure 7:
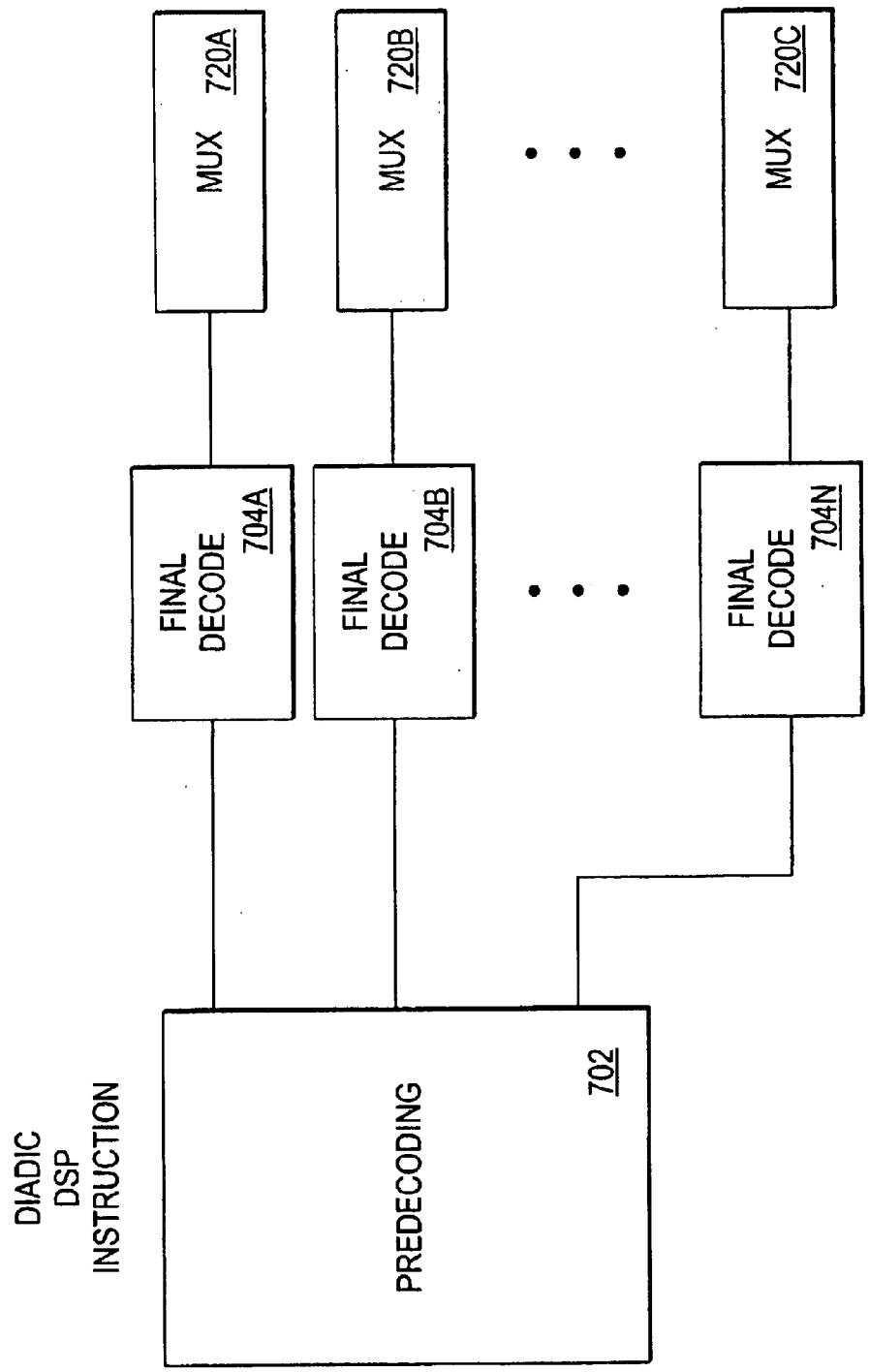

FIG. 7 is a block diagram illustrating the instruction decoding and configuration of the functional blocks of the signal processing units.

Figure 8:
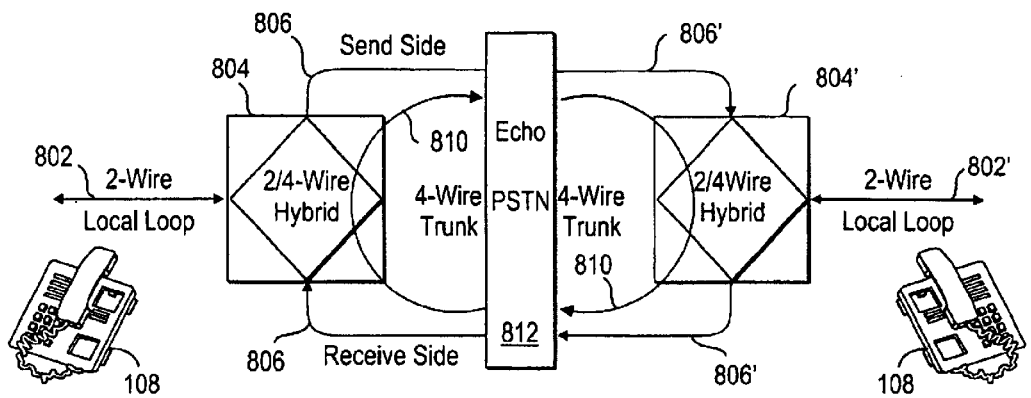

FIG. 8 is a prior art block diagram illustrating a PSTN telephone network and echoes therein.

Figure 9:
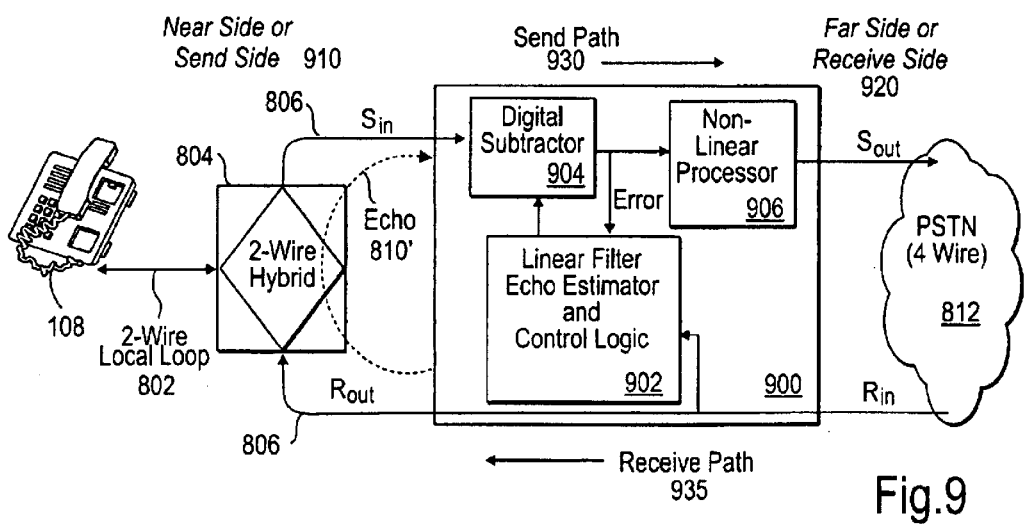

FIG. 9 is a prior art block diagram illustrating a typical prior art echo canceller for a PSTN telephone network.

Figure 10:
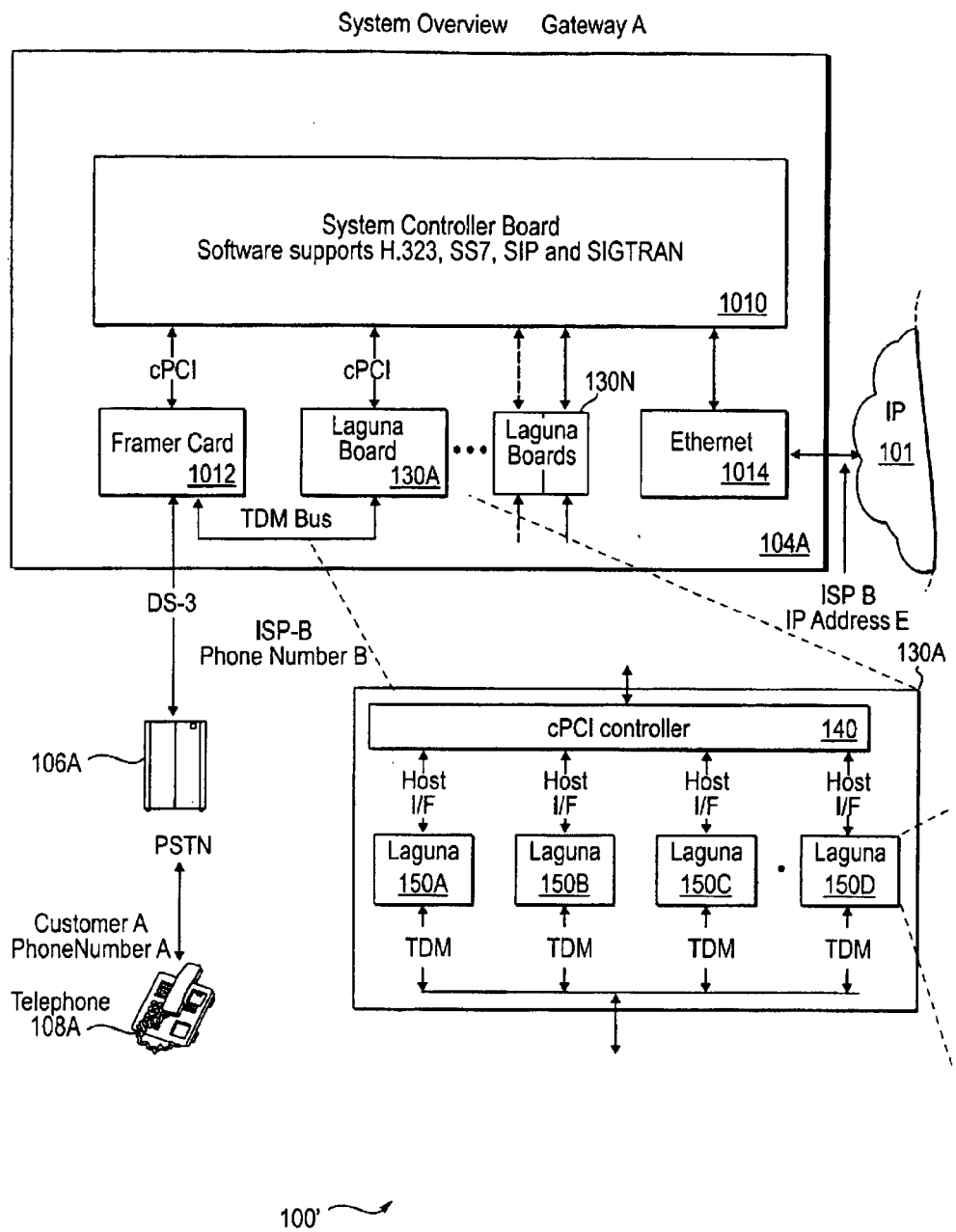
Figure 10:
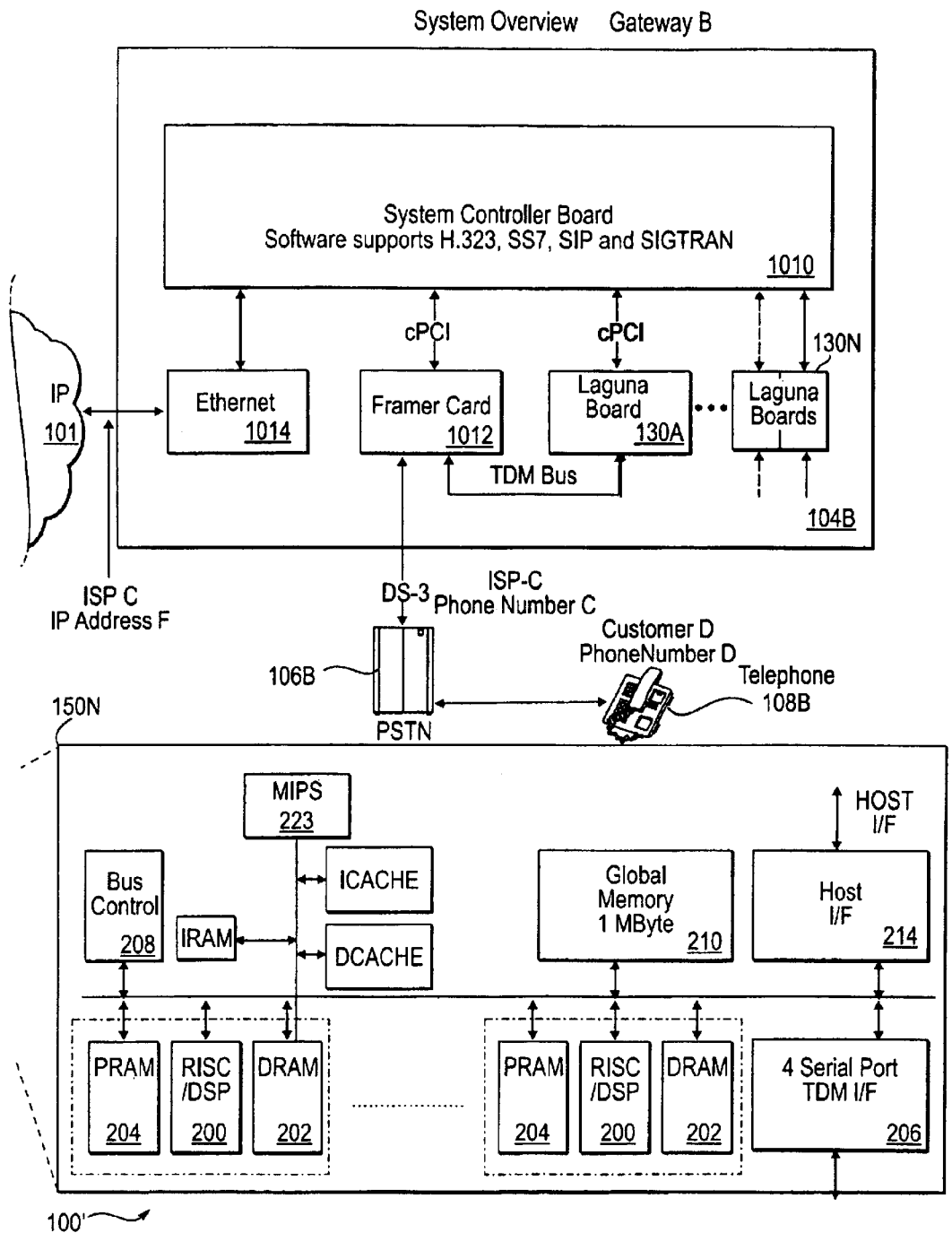

FIG. 10 is a block diagram of a packet network system incorporating the integrated telecommunications processor of the invention.

Figure 11:
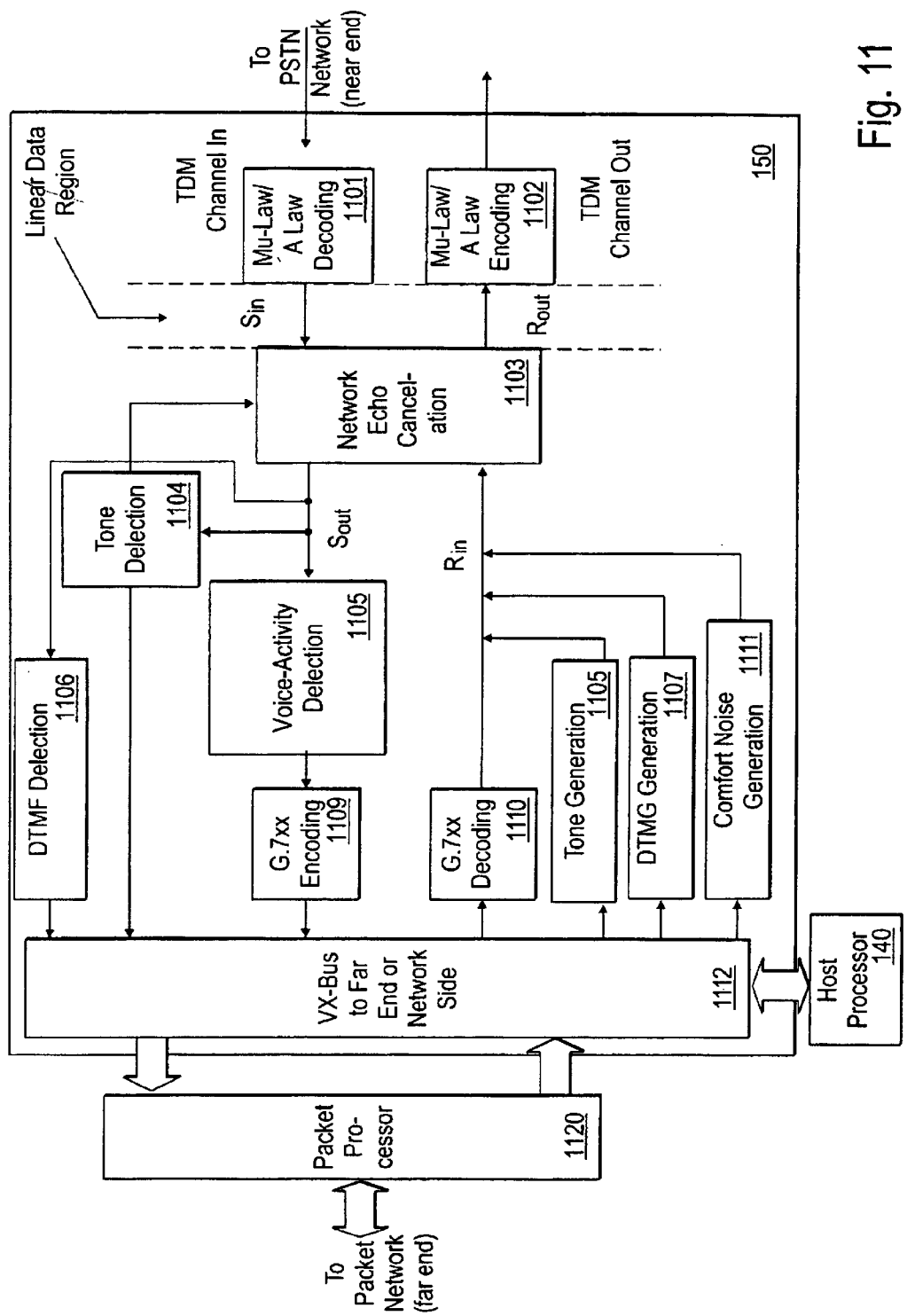

FIG. 11 is a block diagram of the firmware telecommunication processing modules of the integrated telecommunications processor for one of multiple full duplex channels.

Figure 12:
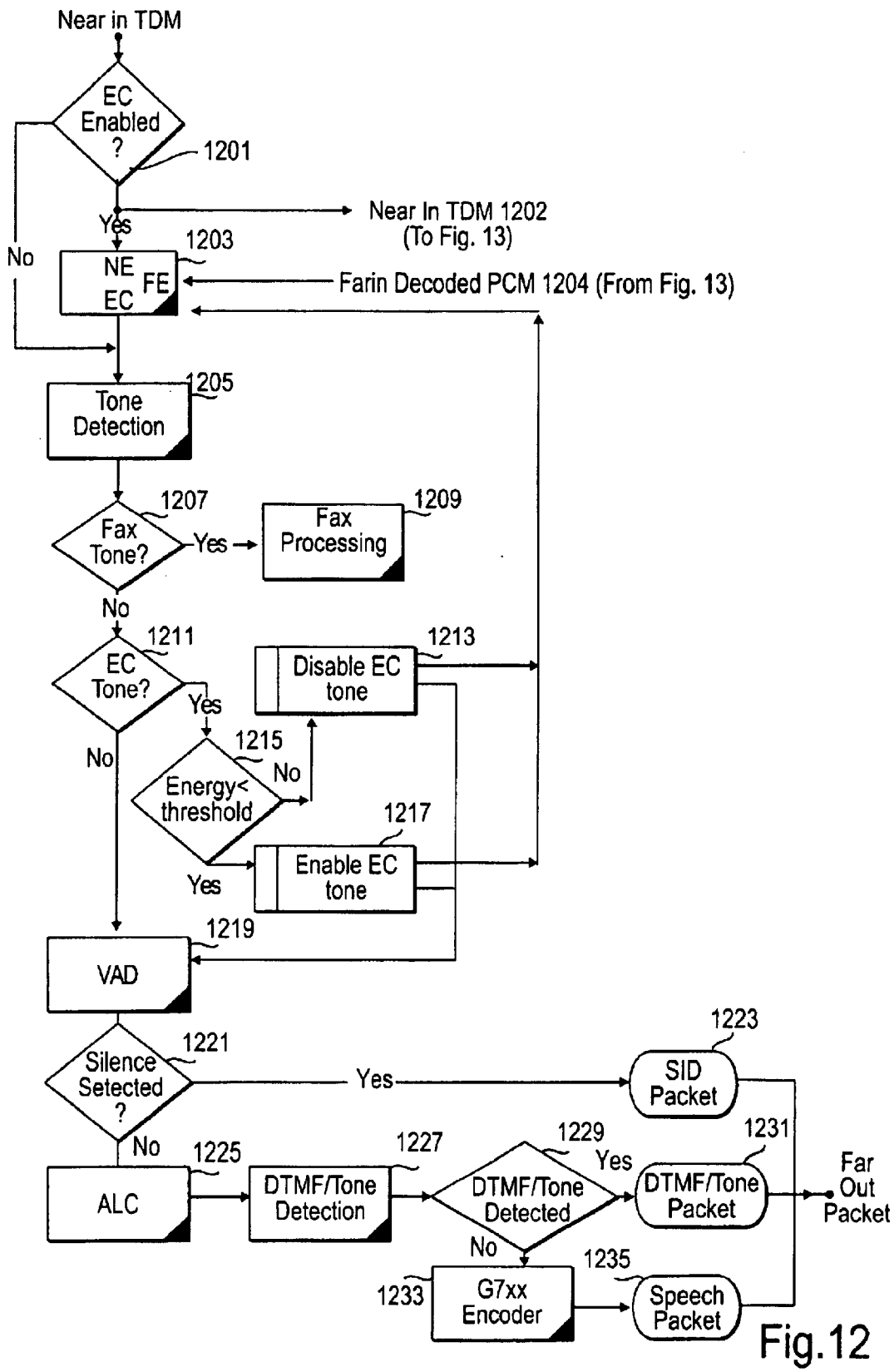

FIG. 12 is a flow chart of telecommunication processing from the near end to the packet network.

Figure 13:
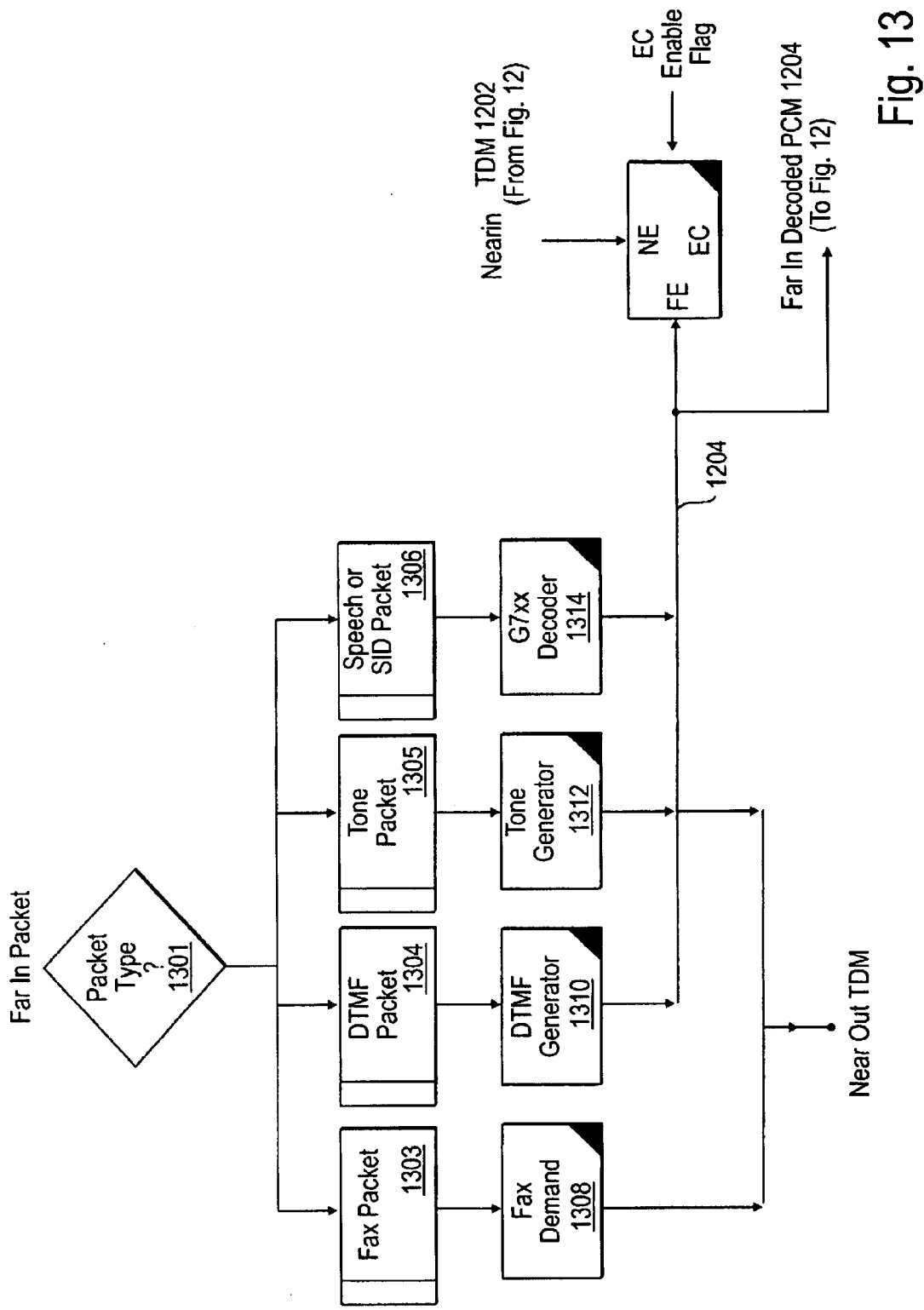

FIG. 13 is a flow chart of the telecommunication processing of a packet from the network into the integrated telecommunications processor into TDM signals at the near end.

Figure 14:
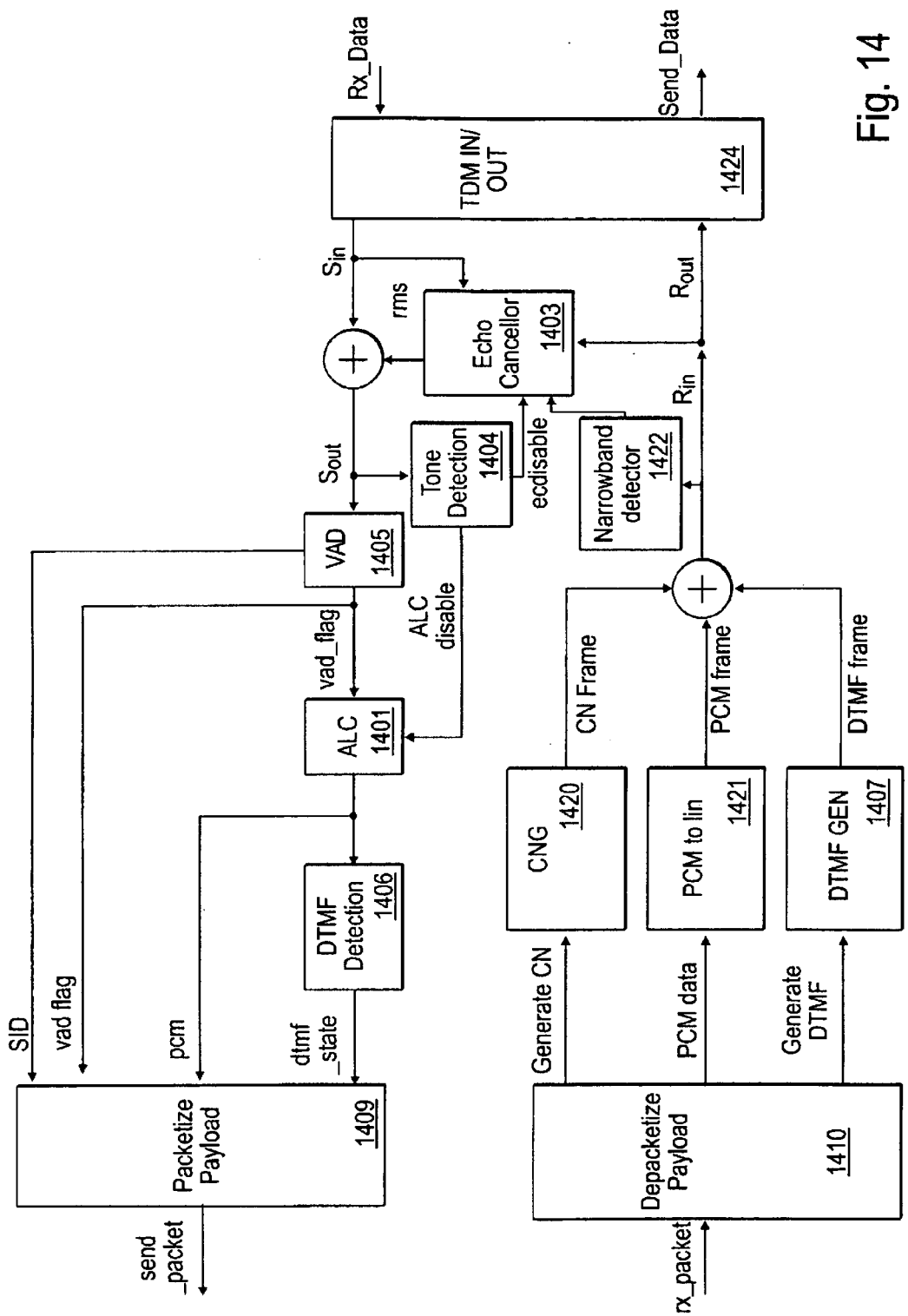

FIG. 14 is a block diagram of the data flows and interaction between exemplary functional blocks of the integrated telecommunications processor 150 for telephony processing.

Figure 15:
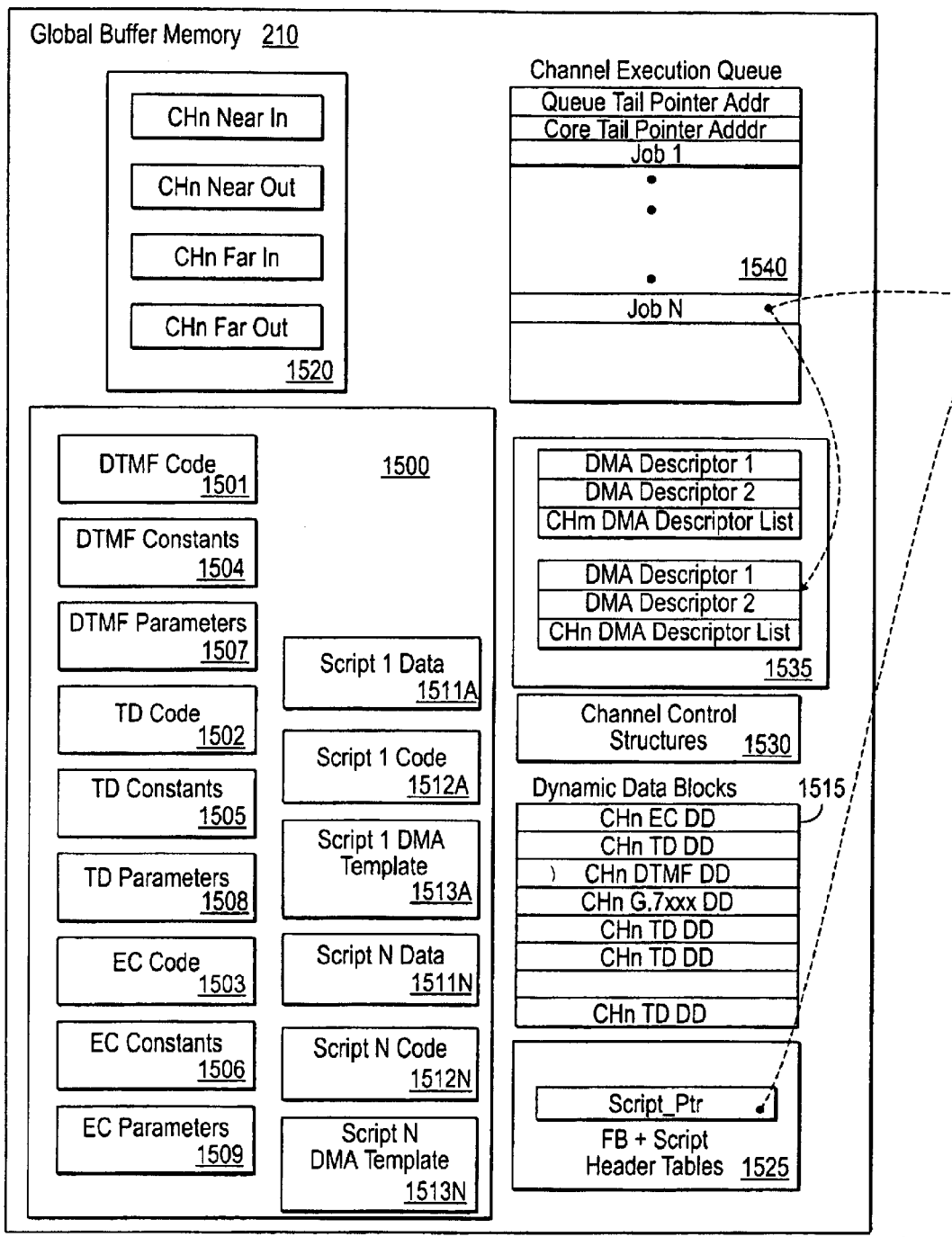
Figure 15:
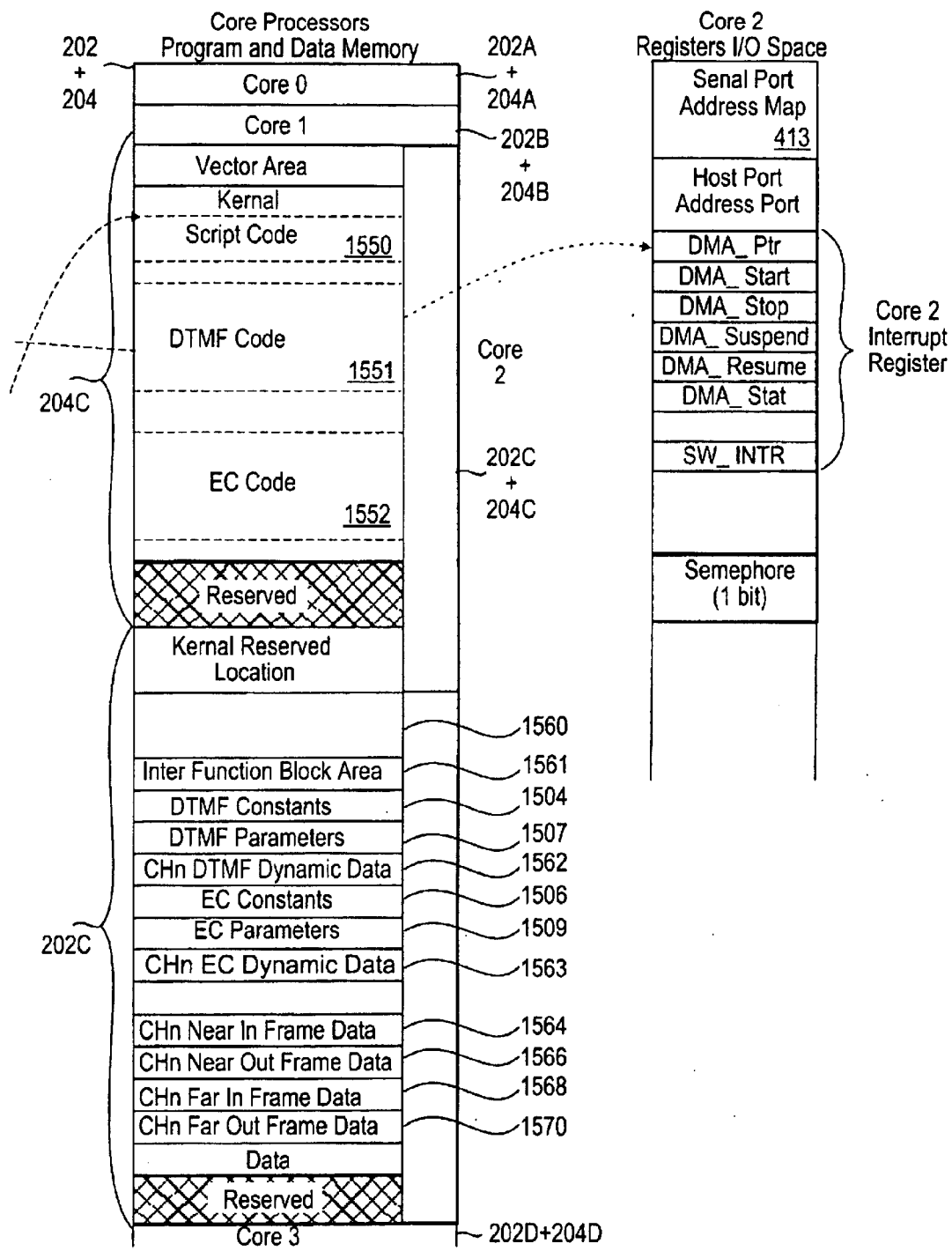

FIG. 15 is a block diagram of exemplary memory maps into the memories of the integrated telecommunications processor 150.

Figure 16:
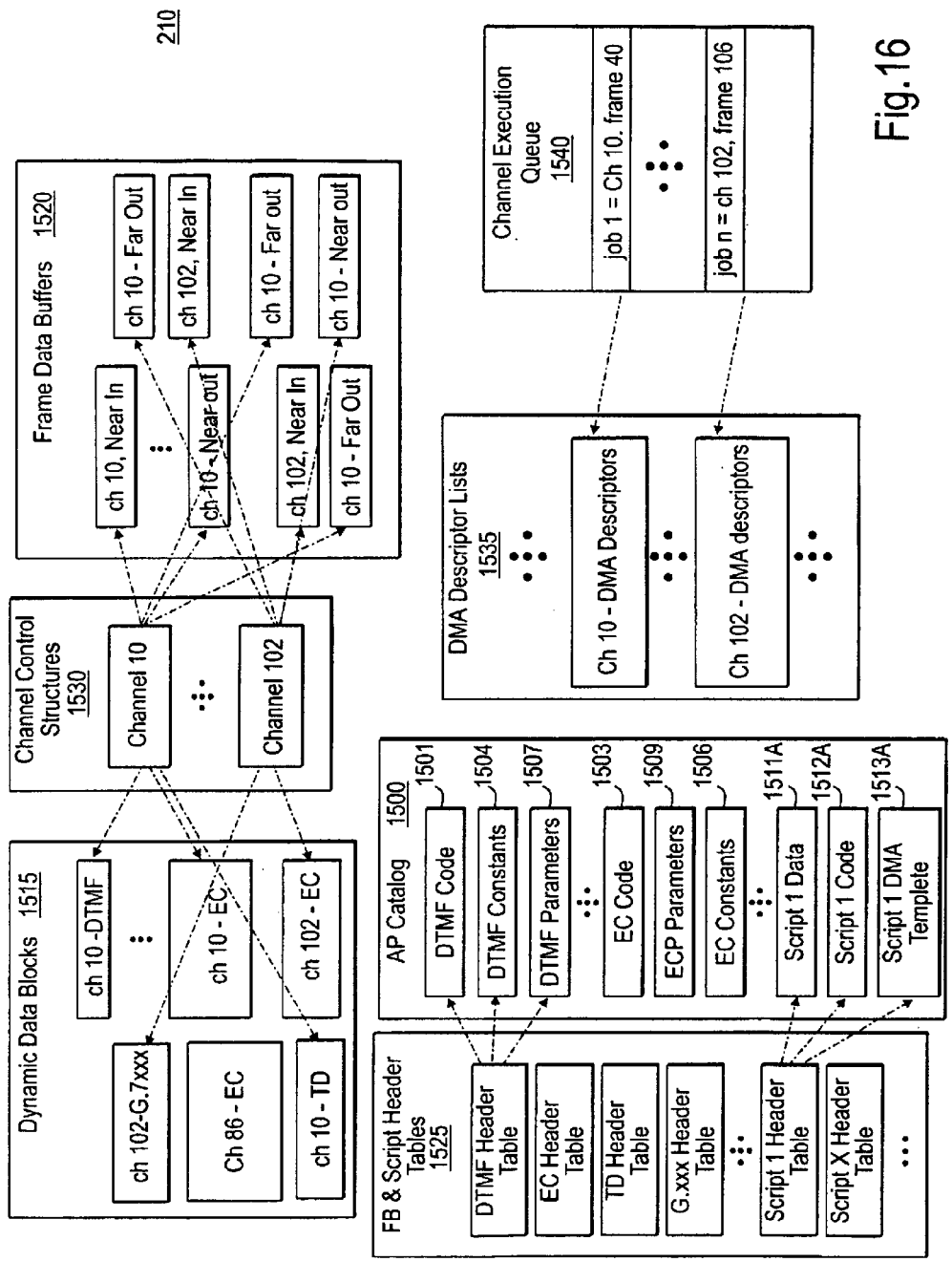

FIG. 16 is a block diagram of an exemplary memory map for the global buffer memory of the integrated telecommunications processor 150.

Figure 17:
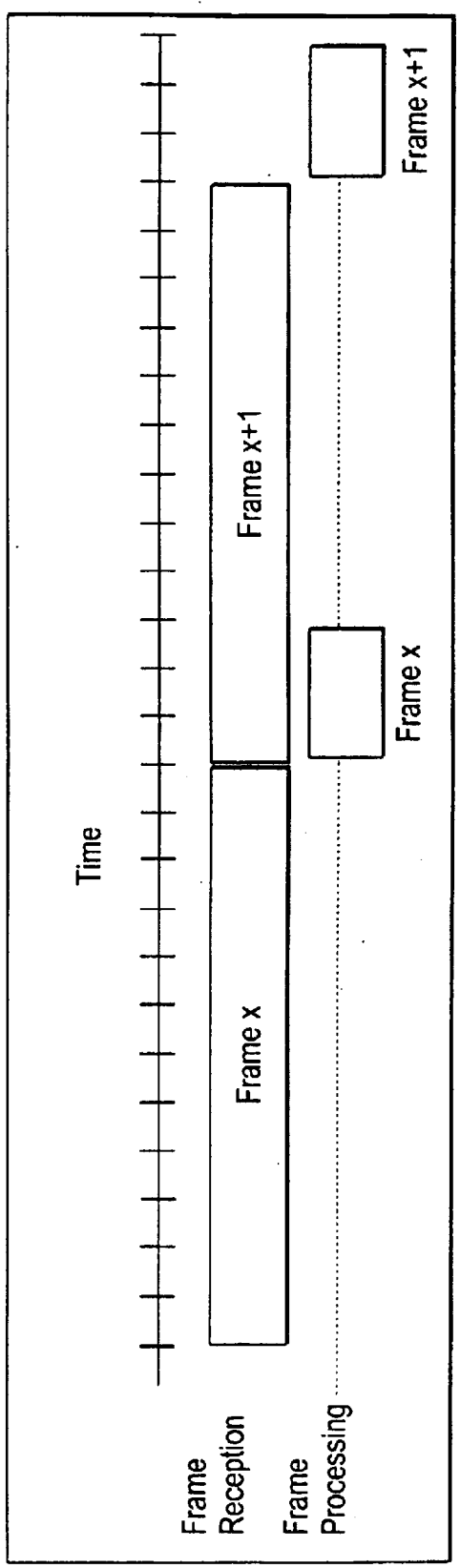

FIG. 17 is an exemplary time line diagram of reception and processing time for frames of data.

Figure 18:
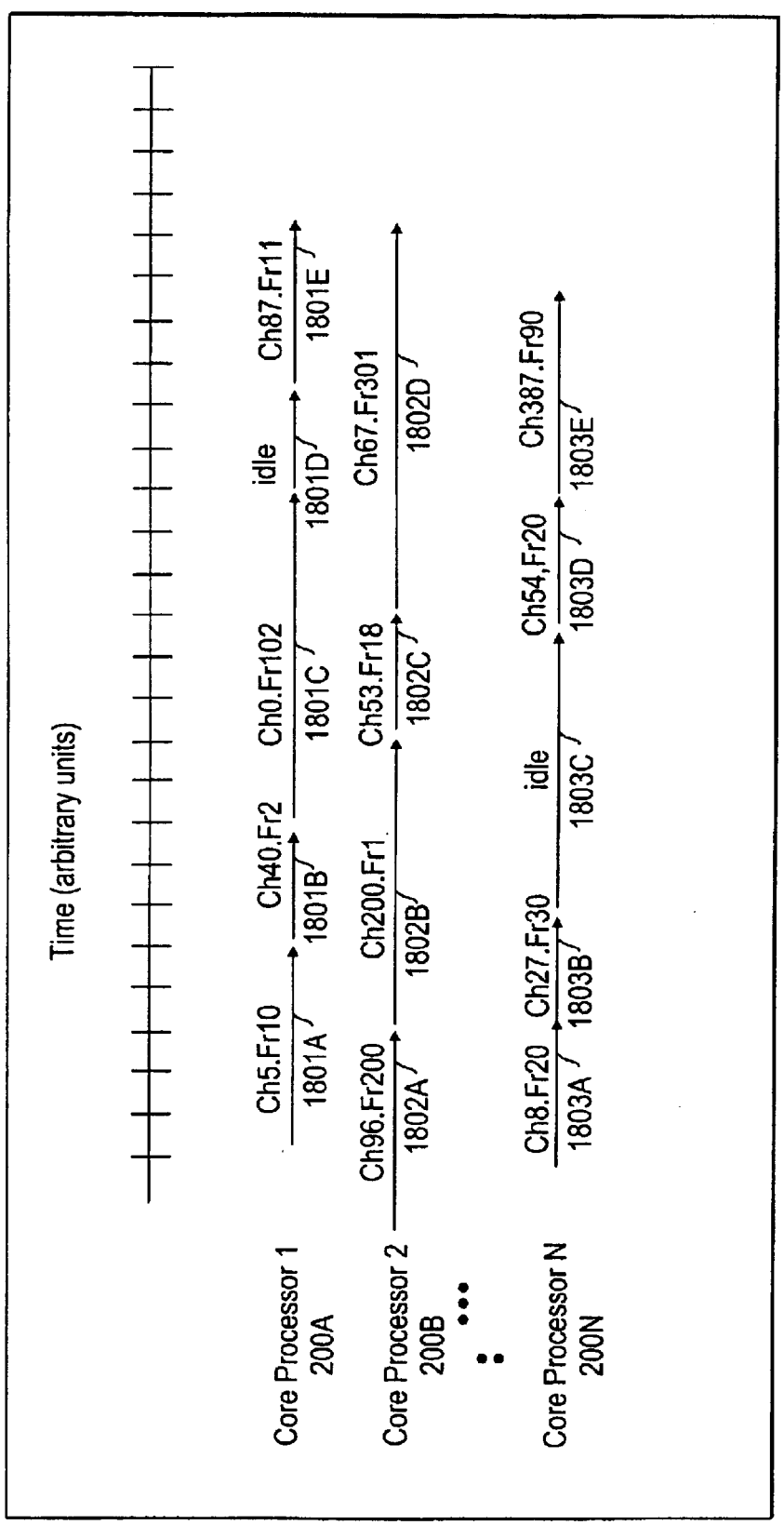

FIG. 18 is an exemplary time line diagram of how core processors of the integrated telecommunications processor 150 process frames of data for multiple communication channels.

Figure 19:
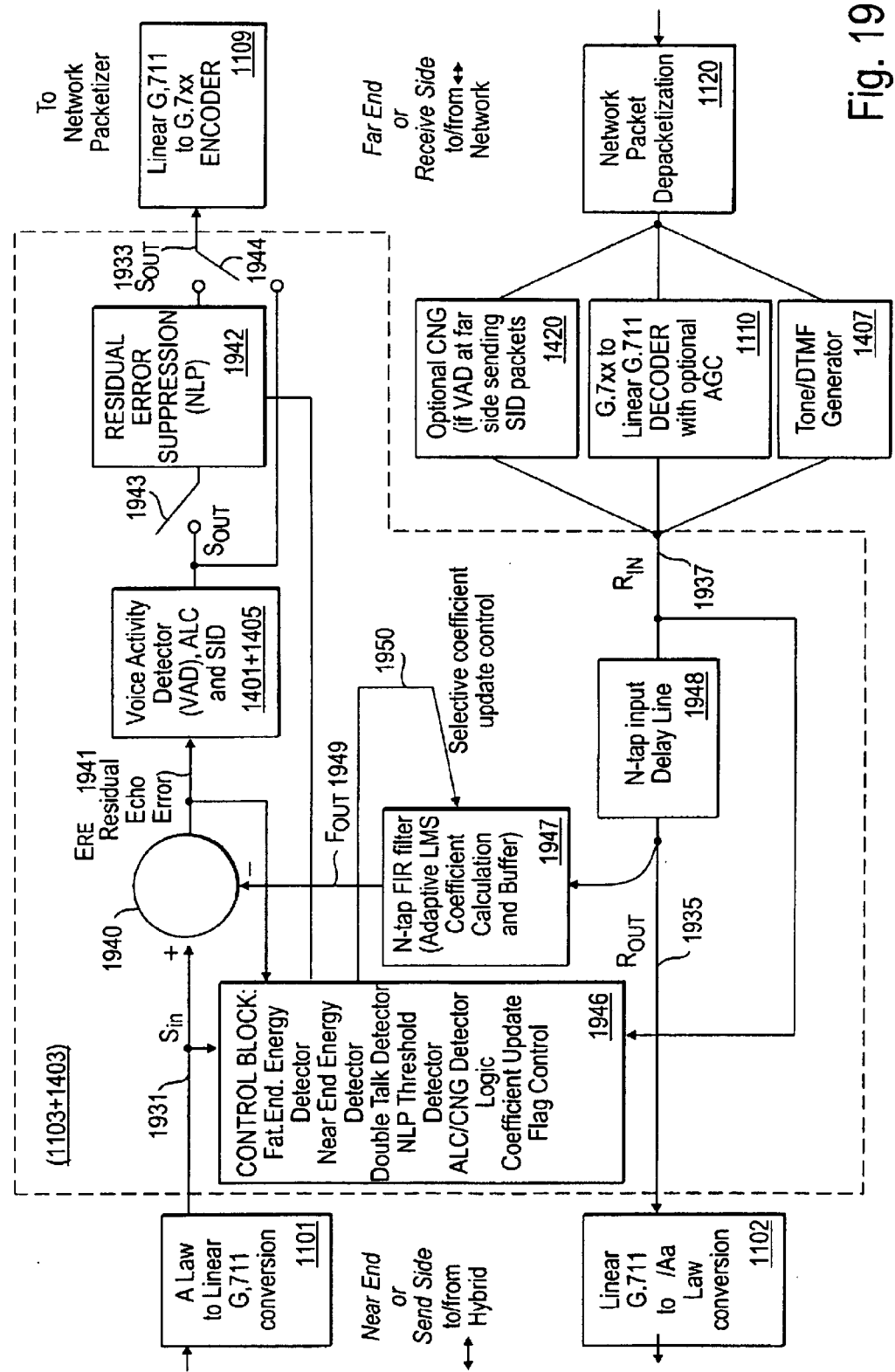

FIG. 19 is a detailed block diagram of an embodiment of an echo canceller of the invention.

Figure 20:
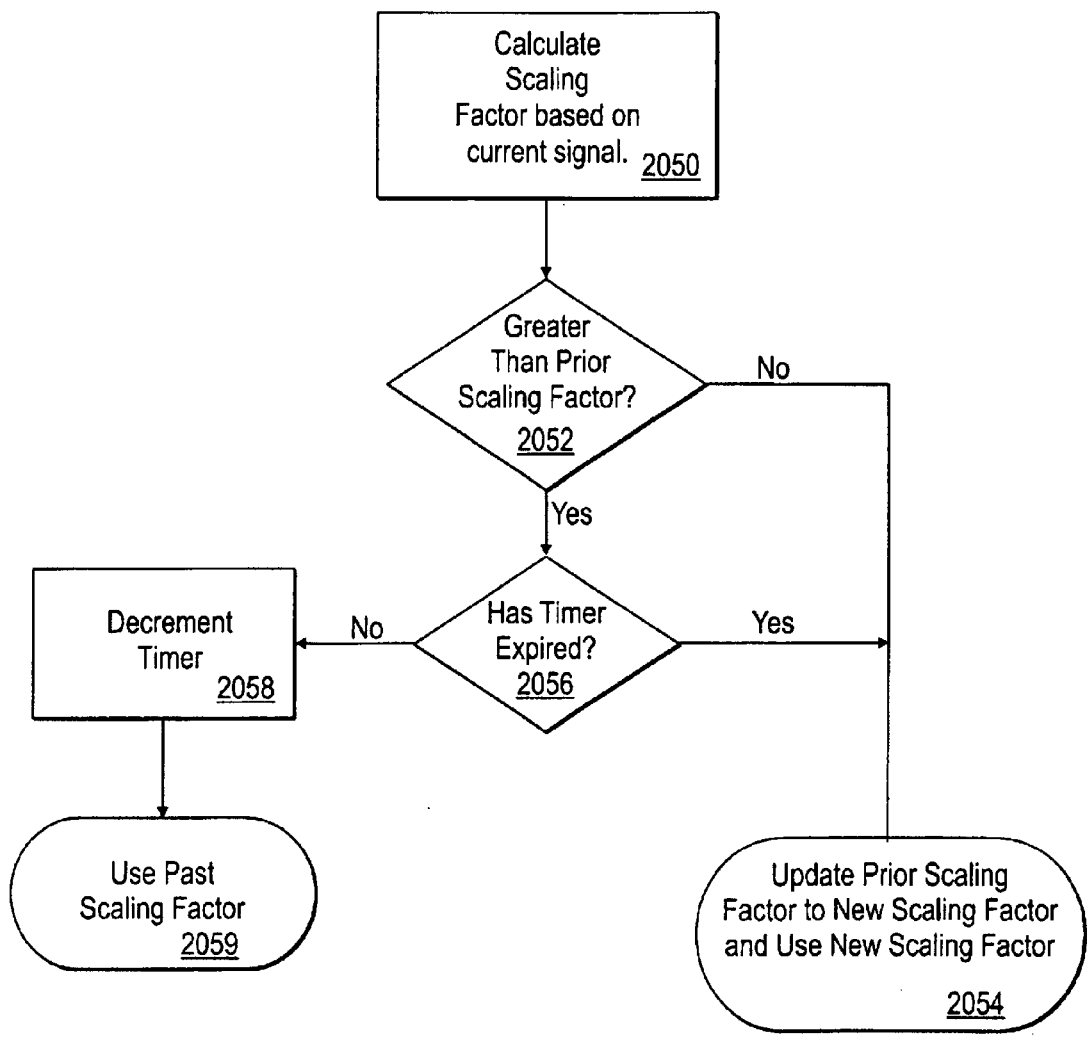

FIG. 20 is a flow chart diagram of update decision for the error scaling factor Mu or u.

Figure 21:
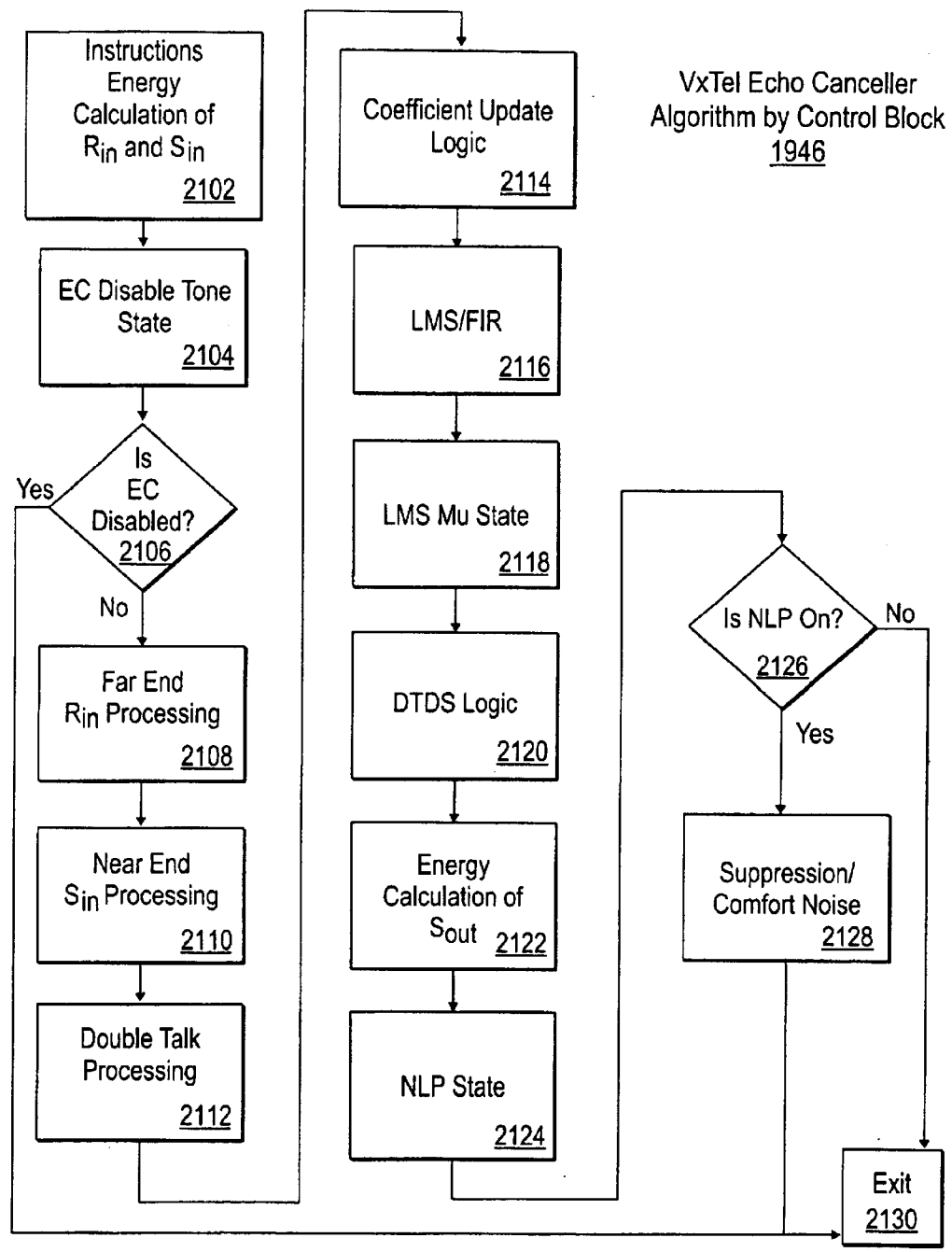

FIG. 21 is a flow chart diagram of the processing steps of algorithm for the echo canceller.

Figure 22A:
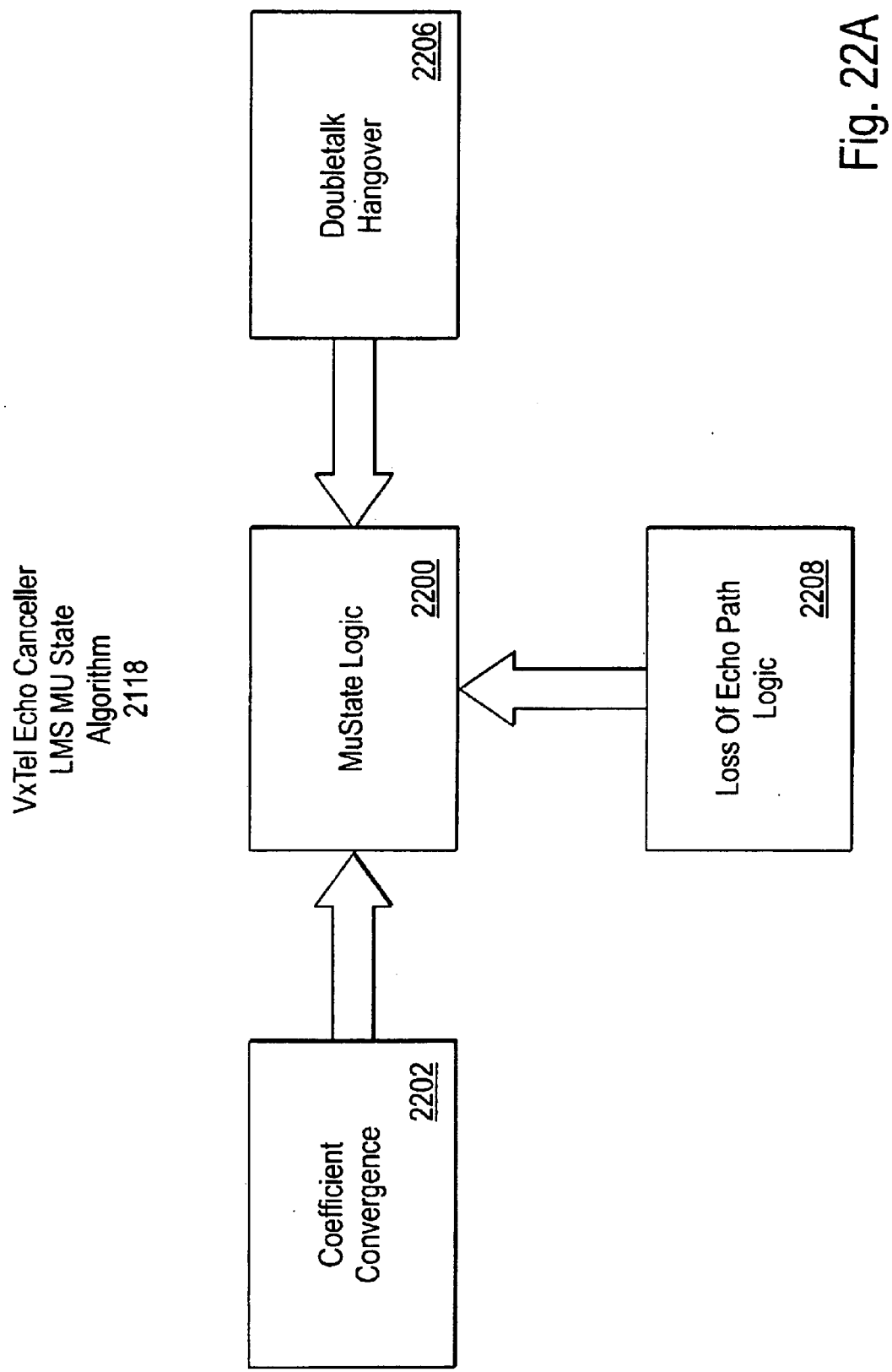

FIG. 22A is a brief flow chart diagram of LMS Mu or u State Algorithm.

FIG. 22B is a detailed flow chart diagram of LMS Mu or u State Algorithm.

Figure 23:
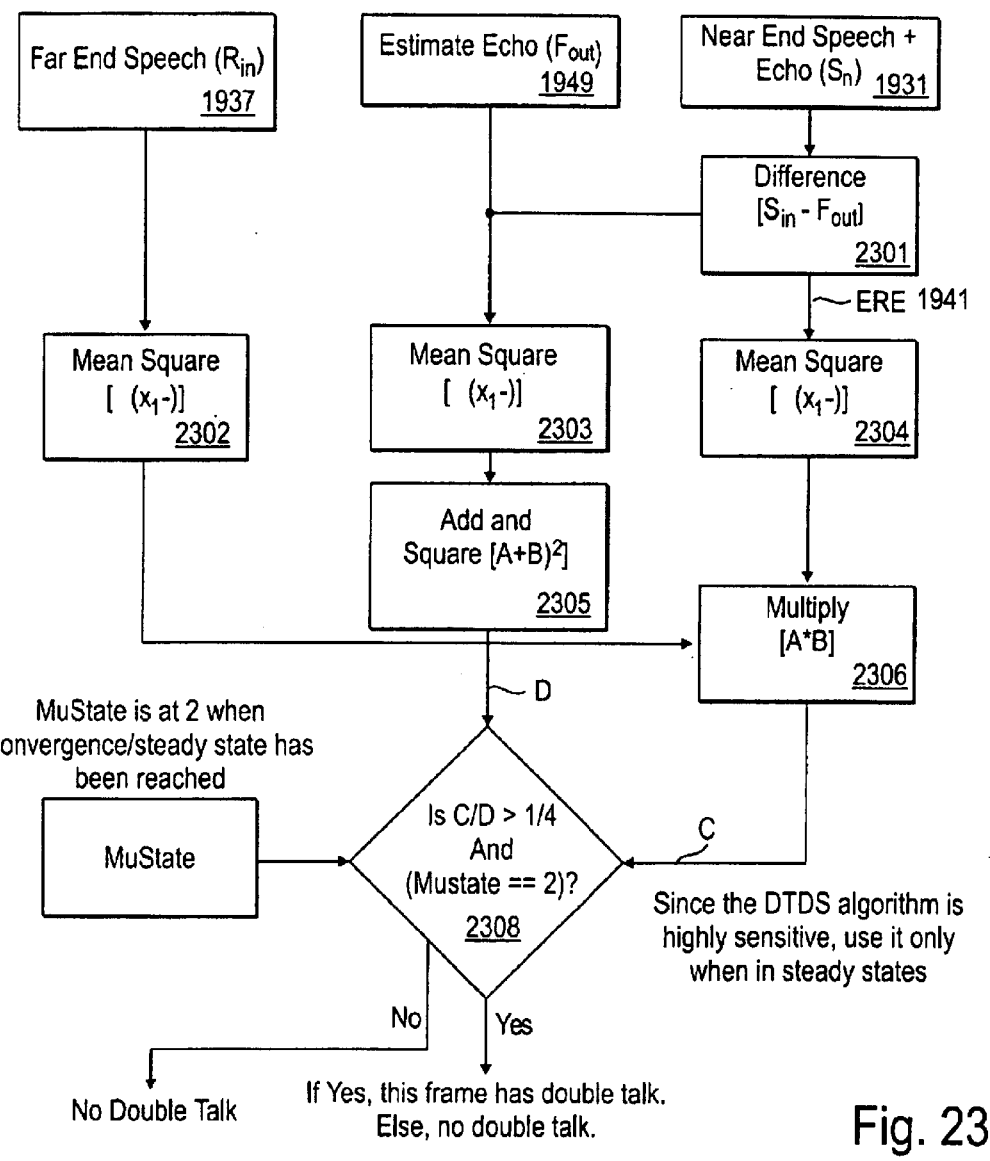

FIG. 23 is a flow chart diagram of double talk decision state algorithm.

Figure 24A:
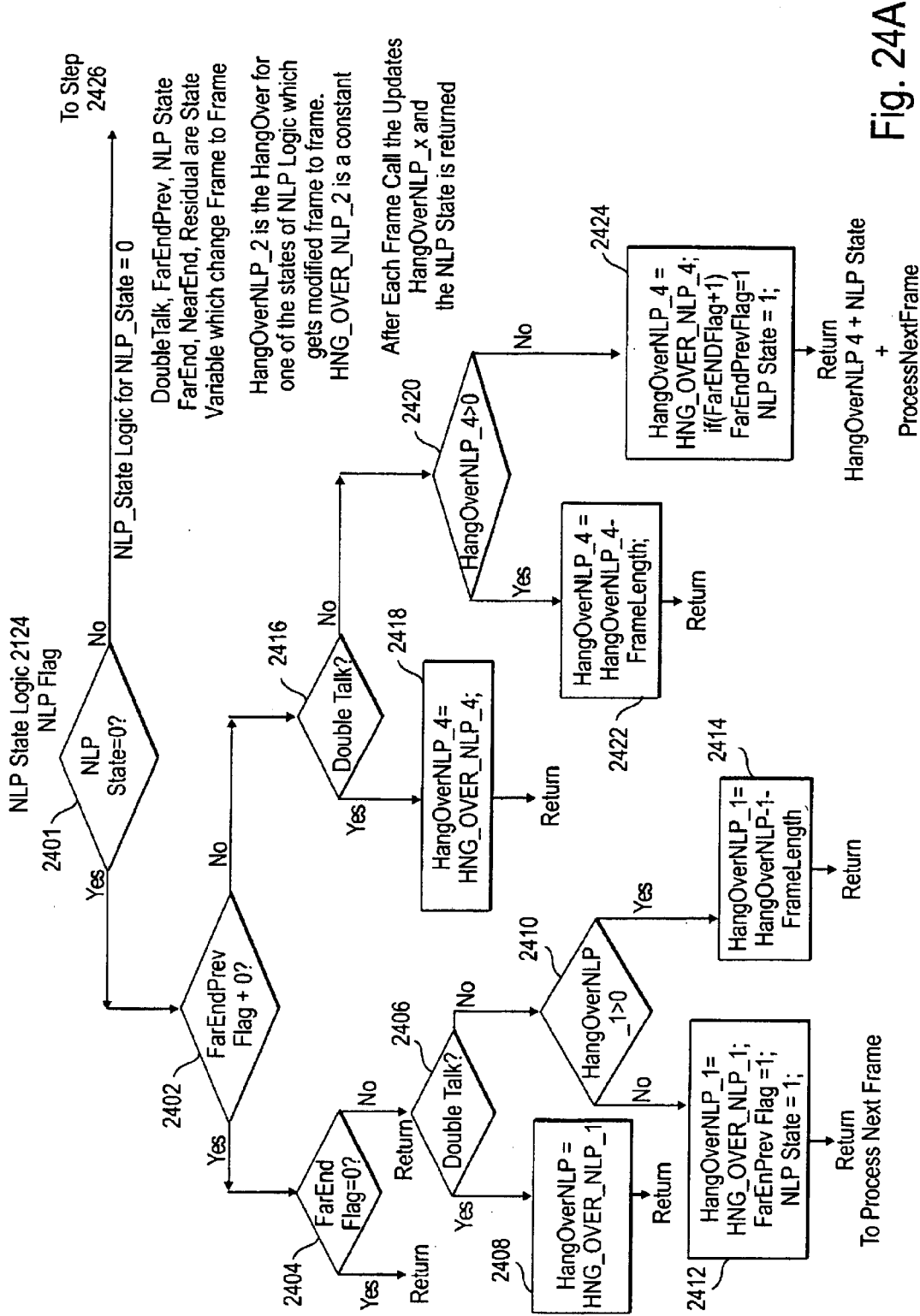
Figure 24B:
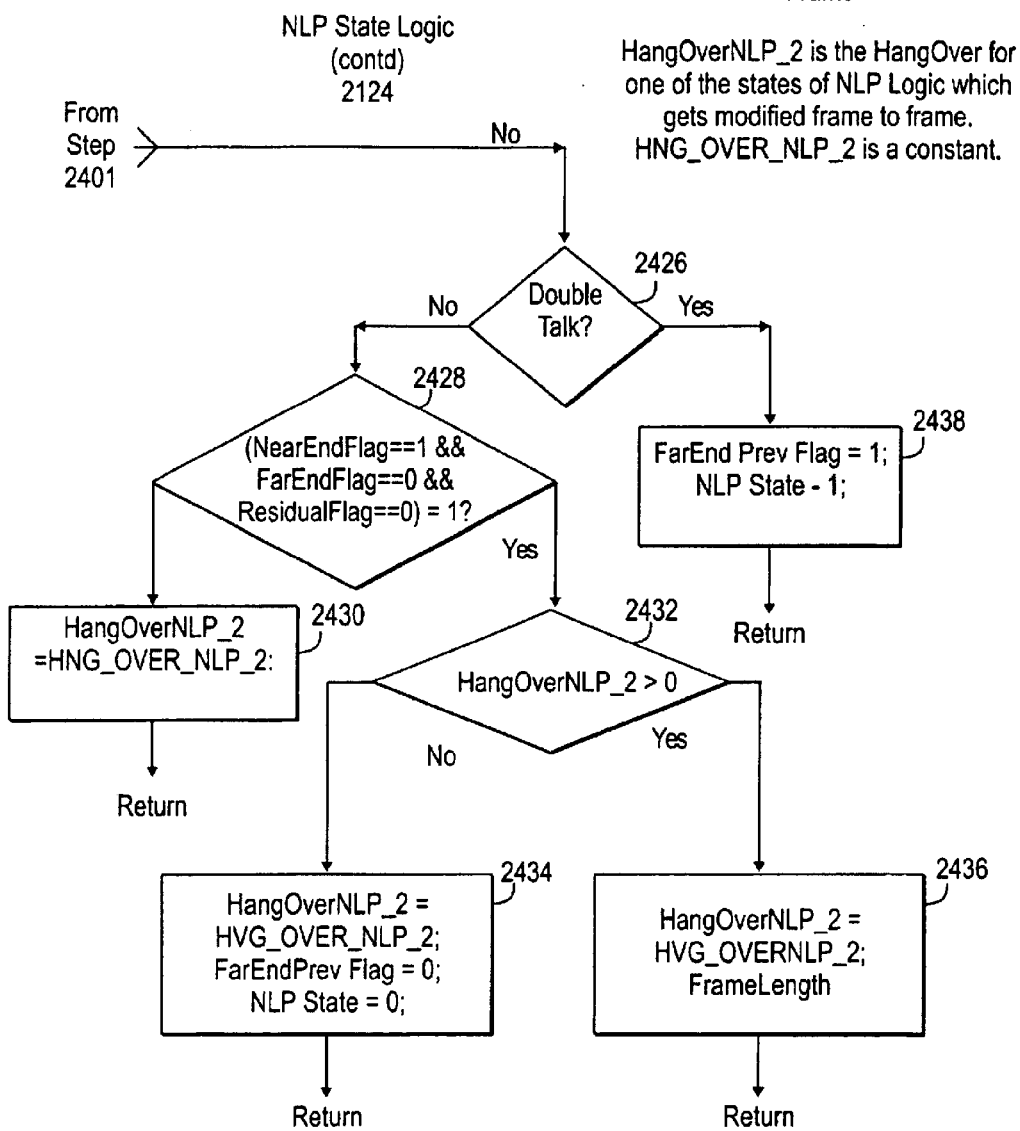

FIGS. 24A and 24B is a flow chart diagram of the NLP state logic.

Figure 25:
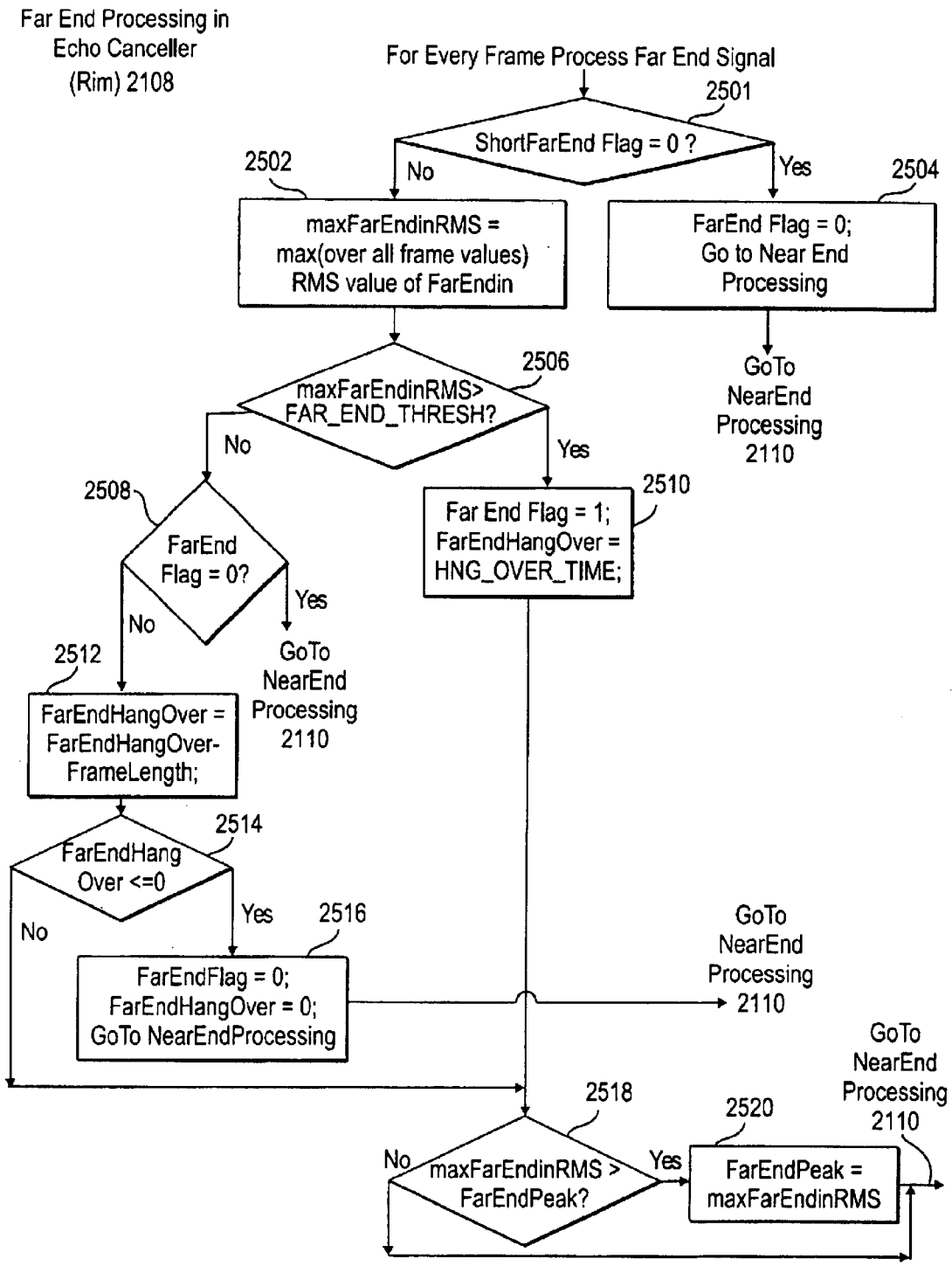

FIG. 25 is a flow chart diagram of far end processing (Rin).

Figure 26:
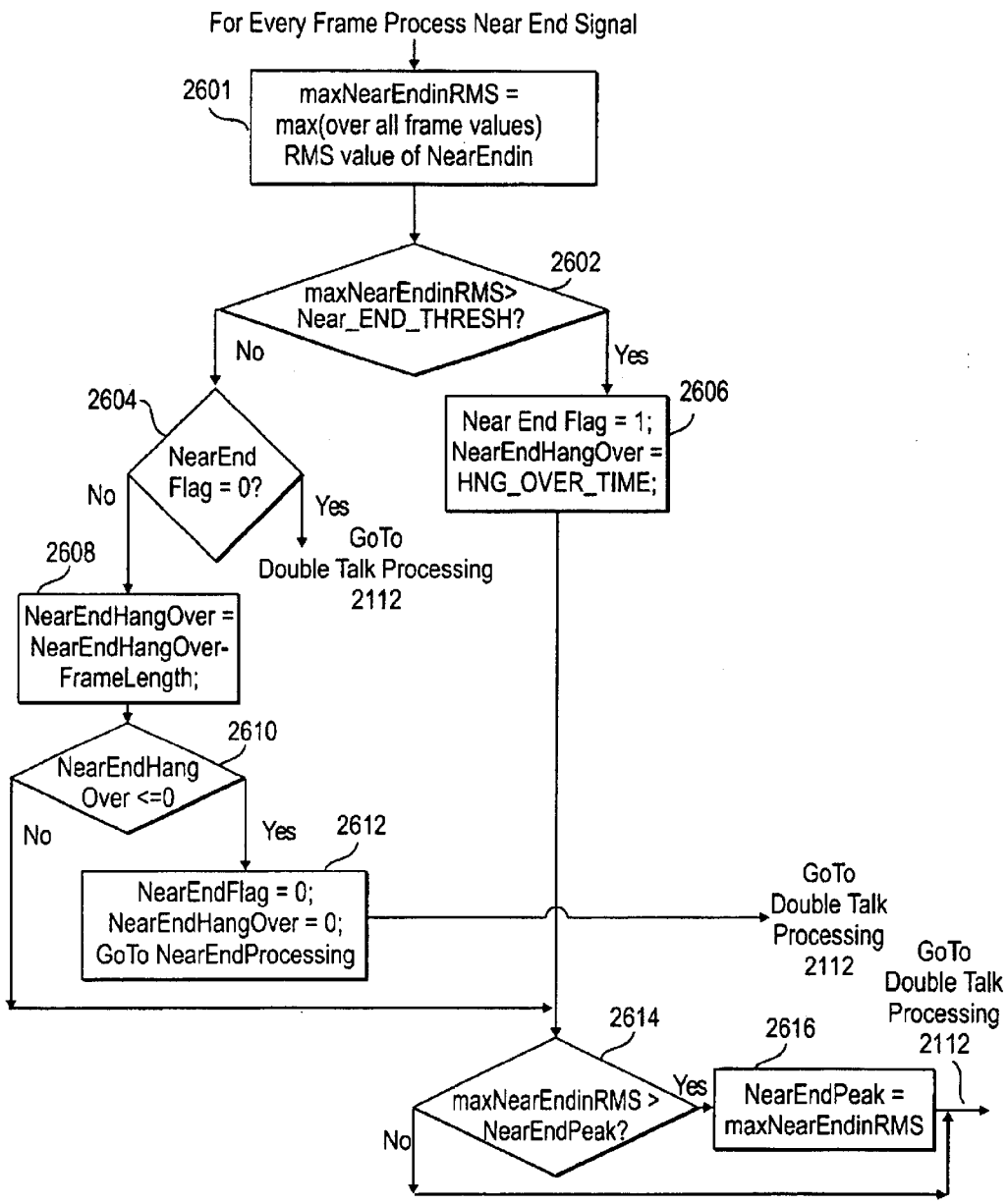

FIG. 26 is a flow chart diagram of near end processing (Sin).

FIG. 27 is a diagram of a session setup message.

FIG. 28 is a diagram of echo canceller (EC) settings.

FIG. 29 is a diagram of echo canceller (EC) frame size settings.

FIG. 30 is a diagram of an request for request for EC parameters message structure.

FIG. 31 is a diagram of an request for EC parameters response message structure.

FIG. 32 is a diagram of an EC status request message structure.

FIG. 33 is a diagram describing the EC parameters in status messages.

FIG. 34 is a diagram describing the EC parameters in the messages.

FIG. 35 is a diagram of an EC parameter message structure.

FIG. 36 is a diagram of an EC parameter response message structure.

FIG. 37 is a diagram of an EC status request response message structure.

FIG. 38 is an illustration of an echo canceller configuration message.

FIGS. 39A and 39B is a description of echo cancellation message parameters.

FIG. 40 lists and describes the parameters of the echo canceller status register message.

Like reference numbers and designations in the drawings indicate like elements providing similar functionality. A letter or prime after a reference designator number represents an instance of an element having the reference designator number.

DETAILED DESCRIPTION OF THE PREFERRED EMBODIMENT

In the following detailed description of the invention, numerous specific details are set forth in order to provide a thorough understanding of the invention. However, it will be obvious to one skilled in the art that the invention may be practiced without these specific details. In other instances well known methods, procedures, components, and circuits have not been described in detail so as not to unnecessarily obscure aspects of the invention. Furthermore, the invention will be described in particular embodiments but may be implemented in hardware, software, firmware or a combination thereof.

Multiple application specific signal processors (ASSPs) having the instruction set architecture of the invention, including dyadic DSP instructions, are provided within gateways in communication systems to provide improved voice and data communication over a packetized network. Each ASSP includes a serial interface, a host interface, a buffer memory and four core processors in order to simultaneously process multiple channels of voice or data. Each core processor preferably includes a reduced instruction set computer (RISC) processor and four signal processing units (SPs). Each SP includes multiple arithmetic blocks to simultaneously process multiple voice and data communication signal samples for communication over IP, ATM, Frame Relay, or other packetized network. The four signal processing units can execute digital signal processing algorithms in parallel. Each ASSP is flexible and can be programmed to perform many network functions or data/voice processing functions, including voice and data compression/decompression in telecommunication systems (such as CODECs), particularly packetized telecommunication networks, simply by altering the software program controlling the commands executed by the ASSP.

An instruction set architecture for the ASSP is tailored to digital signal processing applications including audio and speech processing such as compression/decompression and echo cancellation. The instruction set architecture implemented with the ASSP, is adapted to DSP algorithmic structures. This adaptation of the ISA of the invention to DSP algorithmic structures balances the ease of implementation, processing efficiency, and programmability of DSP algorithms. The instruction set architecture may be viewed as being two component parts, one (RISC ISA) corresponding to the RISC control unit and another (DSP ISA) to the DSP datapaths of the signal processing units 300. The RISC ISA is a register based architecture including 16-registers within the register file 413, while the DSP ISA is a memory based architecture with efficient digital signal processing instructions. The instruction word for the ASSP is typically 20 bits but can be expanded to 40-bits to control two instructions to the executed in series or parallel, such as two RISC control instruction and extended DSP instructions. The instruction set architecture of the ASSP has four distinct types of instructions to optimize the DSP operational mix. These are (1) a 20-bit DSP instruction that uses mode bits in control registers (i.e. mode registers), (2) a 40-bit DSP instruction having control extensions that can override mode registers, (3) a 20-bit dyadic DSP instruction, and (4) a 40 bit dyadic DSP instruction. These instructions are for accelerating calculations within the core processor of the type where D=[(A op1 B) op2 C] and each of "op1" and "op2" can be a multiply, add or extremum (min/max) class of operation on the three operands A, B, and C. The ISA of the ASSP which accelerates these calculations allows efficient chaining of different combinations of operations.

All DSP instructions of the instruction set architecture of the ASSP are dyadic DSP instructions to execute two operations in one instruction with one cycle throughput. A dyadic DSP instruction is a combination of two DSP instructions or operations in one instruction and includes a main DSP operation (MAIN OP) and a sub DSP operation (SUB OP). Generally, the instruction set architecture of the invention can be generalized to combining any pair of basic DSP operations to provide very powerful dyadic instruction combinations. The DSP arithmetic operations in the preferred embodiment include a multiply instruction (MULT), an addition instruction (ADD), a minimize/maximize instruction (MIN/MAX) also referred to as an extrema instruction, and a no operation instruction (NOP) each having an associated operation code ("opcode").

The invention efficiently executes these dyadic DSP instructions by means of the instruction set architecture and the hardware architecture of the application specific signal processor.

Figure 1A:
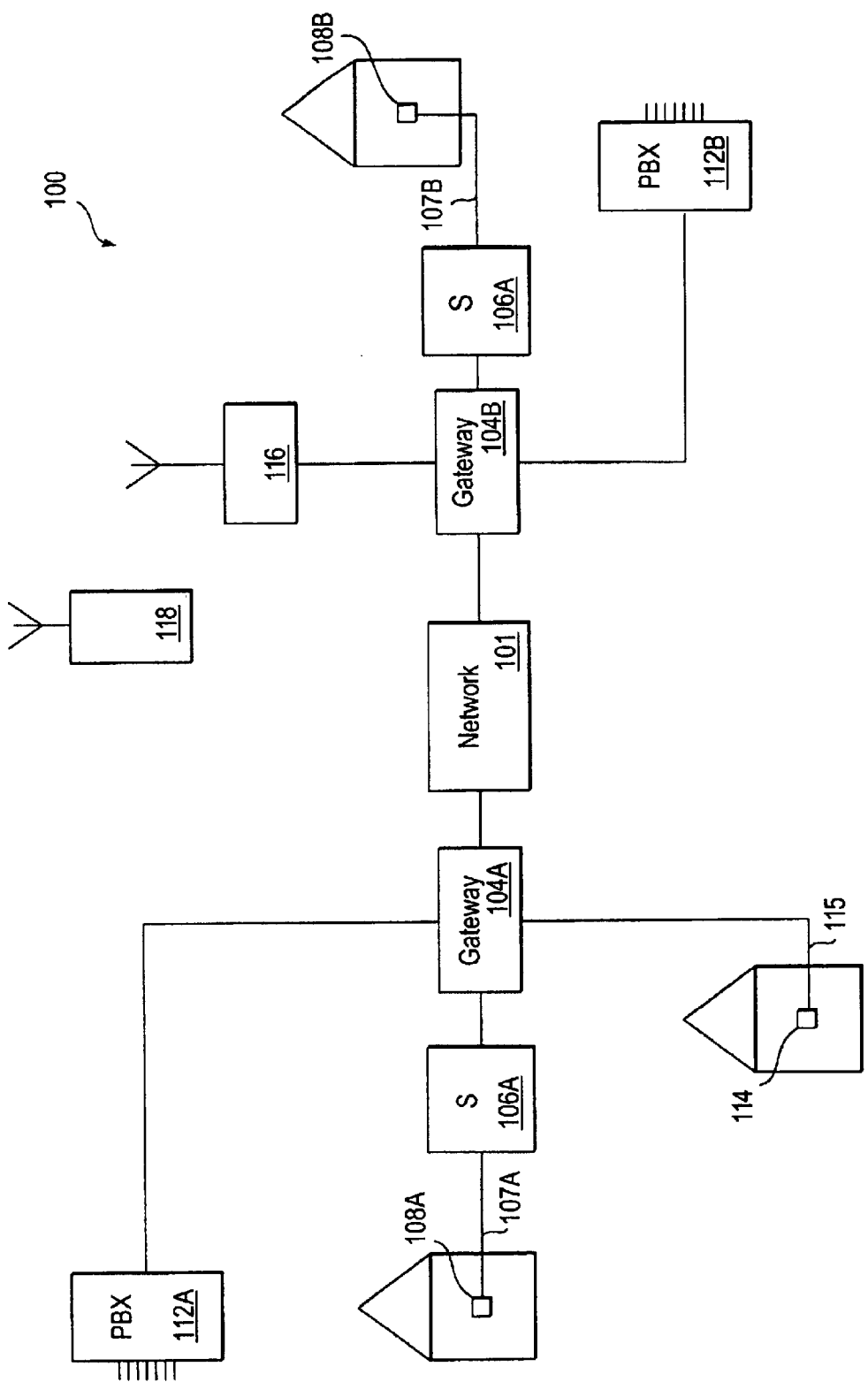
FIG. 1A is a block diagram of a system utilizing the invention.

Referring now to FIG. 1A, a voice and data communication system 100 is illustrated. The system 100 includes a network 101 which is a packetized or packet-switched network, such as IP, ATM, or frame relay. The network 101 allows the communication of voice/speech and data between endpoints in the system 100, using packets. Data may be of any type including audio, video, email, and other generic forms of data. At each end of the system 100, the voice or data requires packetization when transceived across the network 101. The system 100 includes gateways 104A and 104B in order to packetize the information received for transmission across the network 101. A gateway is a device for connecting multiple networks and devices that use different protocols. Voice and data information may be provided to a gateway 104 from a number of different sources in a variety of digital formats. In system 100, analog voice signals are transceived by a telephone 108. In system 100, digital voice signals are transceived at public branch exchanges (PBX) 112A and 112B which are coupled to multiple telephones, fax machines, or data modems. Digital voice signals are transceived between PBX 112A and PBX 112B with gateways 104A and 104B, respectively over the packet network 101. Digital data signals may also be transceived directly between a digital modem 114 and a gateway 104A. Digital modem 114 may be a Digital Subscriber Line (DSL) modem or a cable modem. Data signals may also be coupled into system 100 by a wireless communication system by means of a mobile unit 118 transceiving digital signals or analog signals wirelessly to a base station 116. Base station 116 converts analog signals into digital signals or directly passes the digital signals to gateway 104B. Data may be transceived by means of modem signals over the plain old telephone system (POTS) 107B using a modem 110. Modem signals communicated over POTS 107B are traditionally analog in nature and are coupled into a switch 106B of the public switched telephone network (PSTN). At the switch 106B, analog signals from the POTS 107B are digitized and transceived to the gateway 104B by time division multiplexing (TDM) with each time slot representing a channel and one DS0 input to gateway 104B. At each of the gateways 104A and 104B, incoming signals are packetized for transmission across the network 101. Signals received by the gateways 104A and 104B from the network 101 are depacketized and transcoded for distribution to the appropriate destination.

Figure 1B:
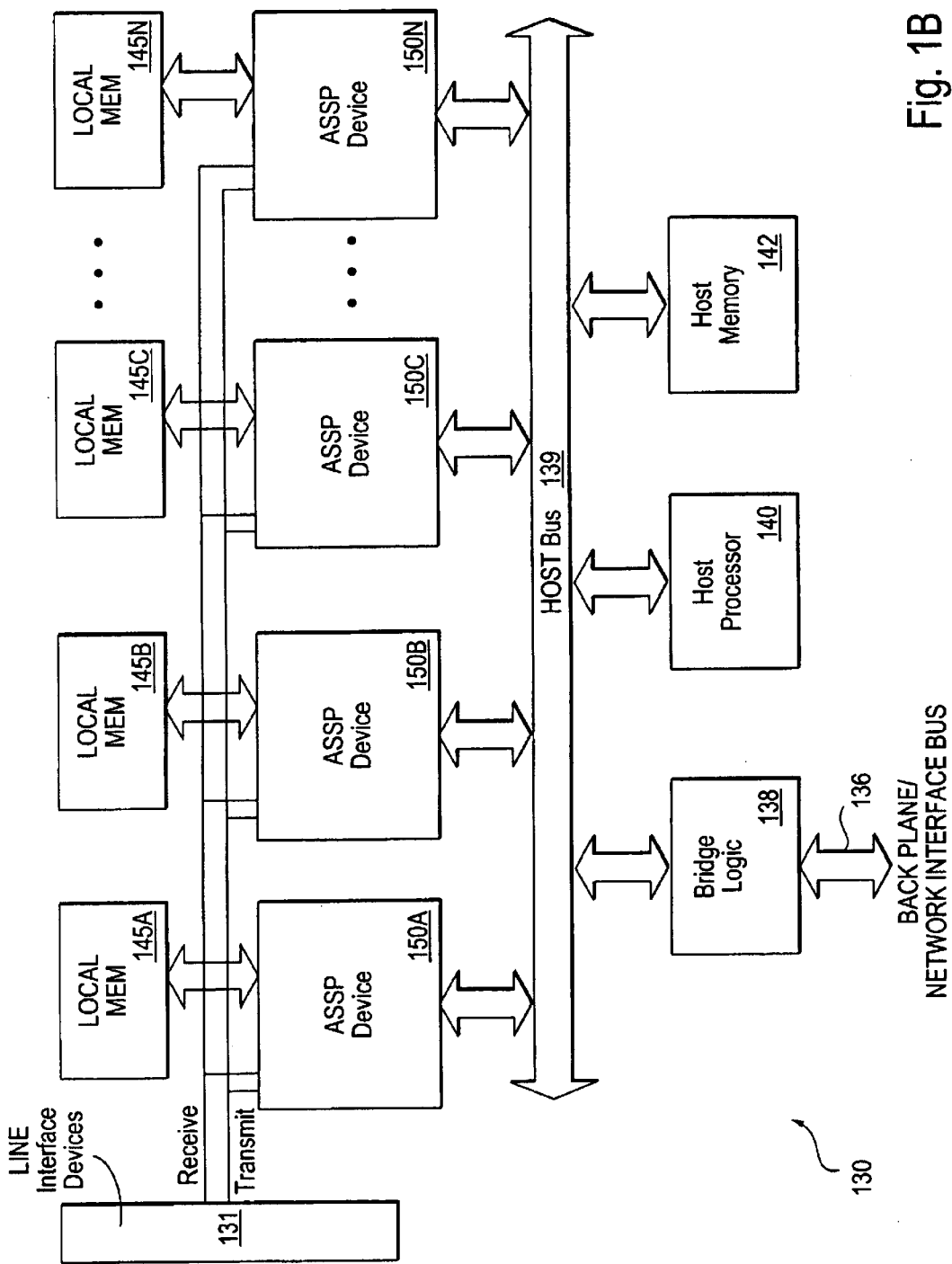
FIG. 1B is a block diagram of a printed circuit board utilizing the invention within the gateways of the system in FIG. 1A.

Referring now to FIG. 1B, a network interface card (NIC) 130 of a gateway 104 is illustrated. The NIC 130 includes one or more application-specific signal processors (ASSPs) 150A–150N. The number of ASSPs within a gateway is expandable to handle additional channels. Line interface devices 131 of NIC 130 provide interfaces to various devices connected to the gateway, including the network 101. In interfacing to the network 101, the line interface devices packetize data for transmission out on the network 101 and depacketize data which is to be received by the ASSP devices. Line interface devices 131 process information received by the gateway on the receive bus 134 and provides it to the ASSP devices. Information from the ASSP devices 150 is communicated on the transmit bus 132 for transmission out of the gateway. A traditional line interface device is a multi-channel serial interface or a UTOPIA device. The NIC 130 couples to a gateway backplane/network interface bus 136 within the gateway 104. Bridge logic 138 transceives information between bus 136 and NIC 130. Bridge logic 138 transceives signals between the NIC 130 and the backplane/network interface bus 136 onto the host bus 139 for communication to either one or more of the ASSP devices 150A–150N, a host processor 140, or a host memory 142. Optionally coupled to each of the one or more ASSP devices 150A through 150N (generally referred to as ASSP 150) are optional local memory 145A through 145N (generally referred to as optional local memory 145), respectively. Digital data on the receive bus 134 and transmit bus 132 is preferably communicated in bit wide fashion. While internal memory within each ASSP may be sufficiently large to be used as a scratchpad memory, optional local memory 145 may be used by each of the ASSPs 150 if additional memory space is necessary.

Each of the ASSPs 150 provide signal processing capability for the gateway. The type of signal processing provided is flexible because each ASSP may execute differing signal processing programs. Typical signal processing and related voice packetization functions for an ASSP include (a) echo cancellation; (b) video, audio, and voice/speech compression/decompression (voice/speech coding and decoding); (c) delay handling (packets, frames); (d) loss handling; (e) connectivity (LAN and WAN); (f) security (encryption/decryption); (g) telephone connectivity; (h) protocol processing (reservation and transport protocols, RSVP, TCP/IP, RTP, UDP for IP, and AAL2, AAL1, AAL5 for ATM); (i) filtering; (j) Silence suppression; (k) length handling (frames, packets); and other digital signal processing functions associated with the communication of voice and data over a communication system. Each ASSP 150 can perform other functions in order to transmit voice and data to the various endpoints of the system 100 within a packet data stream over a packetized network.

Figure 2:
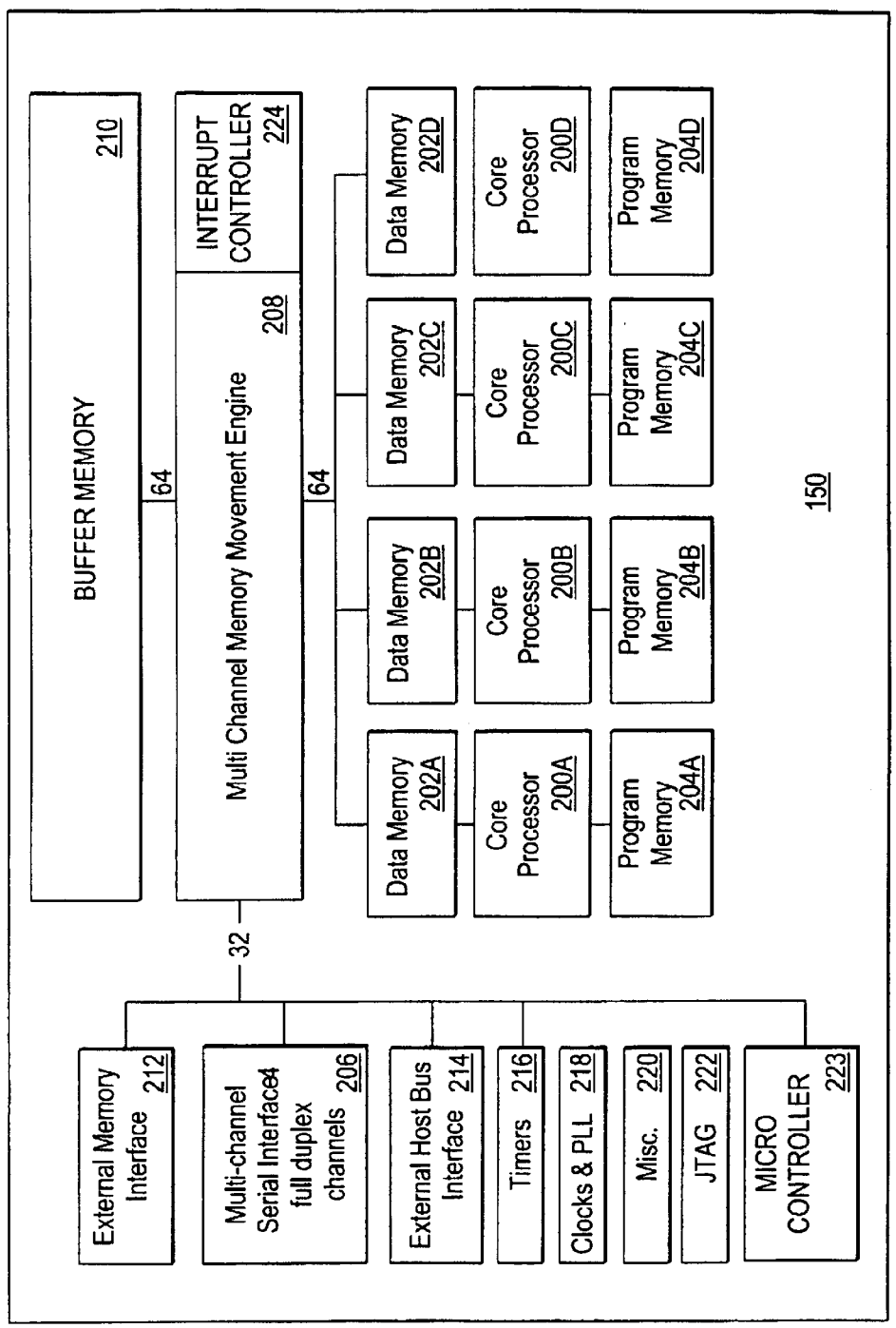
FIG. 2 is a block diagram of the Application Specific Signal Processor (ASSP) of the invention.

Referring now to FIG. 2, a block diagram of the ASSP 150 is illustrated. At the heart of the ASSP 150 are four core processors 200A–200D. Each of the core processors 200A–200D is respectively coupled to a data memory 202A–202D and a program memory 204A–204D. Each of the core processors 200A–200D communicates with outside channels through the multi-channel serial interface 206, the multi-channel memory movement engine 208, buffer memory 210, and data memory 202A–202D. The ASSP 150 further includes an external memory interface 212 to couple to the external optional local memory 145. The ASSP 150 includes an external host interface 214 for interfacing to the external host processor 140 of FIG. 1B.—Further included within the ASSP 150 are timers 216, clock generators and a phase-lock loop 218, miscellaneous control logic 220, and a Joint Test Action Group (JTAG) test access port 222 for boundary scan testing. The multi-channel serial interface 206 may be replaced with a UTOPIA parallel interface for some applications such as ATM. The ASSP 150 further includes a microcontroller 223 to perform process scheduling for the core processors 200A–200D and the coordination of the data movement within the ASSP as well as an interrupt controller 224 to assist in interrupt handling and the control of the ASSP 150.

Referring now to FIG. 3, a block diagram of the core processor 200 is illustrated coupled to its respective data memory 202 and program memory 204. Core processor 200 is the block diagram for each of the core processors 200A–200D. Data memory 202 and program memory 204 refers to a respective instance of data memory 202A–202D and program memory 204A–204D, respectively. The core processor 200 includes four signal processing units SP0 300A, SP1 300B, SP2 300C and SP3 300D. The core processor 200 further includes a reduced instruction set computer (RISC) control unit 302 and a pipeline control unit 304. The signal processing units 300A–300D perform the signal processing tasks on data while the RISC control unit 302 and the pipeline control unit 304 perform control tasks related to the signal processing function performed by the SPs 300A–300D. The control provided by the RISC control unit 302 is coupled with the SPs 300A–300D at the pipeline level to yield a tightly integrated core processor 200 that keeps the utilization of the signal processing units 300 at a very high level.

The signal processing tasks are performed on the datapaths within the signal processing units 300A–300D. The nature of the DSP algorithms are such that they are inherently vector operations on streams of data, that have minimal temporal locality (data reuse). Hence, a data cache with demand paging is not used because it would not function well and would degrade operational performance. Therefore, the signal processing units 300A–300D are allowed to access vector elements (the operands) directly from data memory 202 without the overhead of issuing a number of load and store instructions into memory resulting, in very efficient data processing. Thus, the instruction set architecture of the invention having a 20 bit instruction word which can be expanded to a 40 bit instruction word, achieves better efficiencies than VLIW architectures using 256-bits or higher instruction widths by adapting the ISA to DSP algorithmic structures. The adapted ISA leads to very compact and low-power hardware that can scale to higher computational requirements. The operands that the ASSP can accommodate are varied in data type and data size. The data type may be real or complex, an integer value or a fractional value, with vectors having multiple elements of different sizes. The data size in the preferred embodiment is 64 bits but larger data sizes can be accommodated with proper instruction coding.

Referring now to FIG. 4, a detailed block diagram of the RISC control unit 302 is illustrated. RISC control unit 302 includes a data aligner and formatter 402, a memory address generator 404, three adders 406A–406C, an arithmetic logic unit (ALU) 408, a multiplier 410, a barrel shifter 412, and a register file 413. The register file 413 points to a starting memory location from which memory address generator 404 can generate addresses into data memory 202. The RISC control unit 302 is responsible for supplying addresses to data memory so that the proper data stream is fed to the signal processing units 300A–300D. The RISC control unit 302 is a register to register organization with load and store instructions to move data to and from data memory 202. Data memory addressing is performed by RISC control unit using a 32-bit register as a pointer that specifies the address, post-modification offset, and type and permute fields. The type field allows a variety of natural DSP data to be supported as a "first class citizen" in the architecture. For instance, the complex type allows direct operations on complex data stored in memory removing a number of bookkeeping instructions. This is useful in supporting QAM demodulators in data modems very efficiently.

Referring now to FIG. 5A, a block diagram of a signal processing unit 300 is illustrated which represents an instance of the SPs 300A–300D. Each of the signal processing units 300 includes a data typer and aligner 502, a first multiplier M1 504A, a compressor 506, a first adder A1 510A, a second adder A2 510B, an accumulator register 512, a third adder A3 510C, and a second multiplier M2 504B. Adders 510A–510C are similar in structure and are generally referred to as adder 510. Multipliers 504A and 504B are similar in structure and generally referred to as multiplier 504. Each of the multipliers 504A and 504B have a multiplexer 514A and 514B respectively at its input stage to multiplex different inputs from different busses into the multipliers. Each of the adders 510A, 510B, 510C also have a multiplexer 520A, 520B, and 520C respectively at its input stage to multiplex different inputs from different busses into the adders. These multiplexers and other control logic allow the adders, multipliers and other components within the signal processing units 300A–300C to be flexibly interconnected by proper selection of multiplexers. In the preferred embodiment, multiplier M1 504A, compressor 506, adder A1 510A, adder A2 510B and accumulator 512 can receive inputs directly from external data buses through the data typer and aligner 502. In the preferred embodiment, adder 510C and multiplier M2 504B receive inputs from the accumulator 512 or the outputs from the execution units multiplier M1 504A, compressor 506, adder A1 510A, and adder A2 510B.

Program memory 204 couples to the pipe control 304 which includes an instruction buffer that acts as a local loop cache. The instruction buffer in the preferred embodiment has the capability of holding four instructions. The instruction buffer of the pipe control 304 reduces the power consumed in accessing the main memories to fetch instructions during the execution of program loops.

Figure 5B:
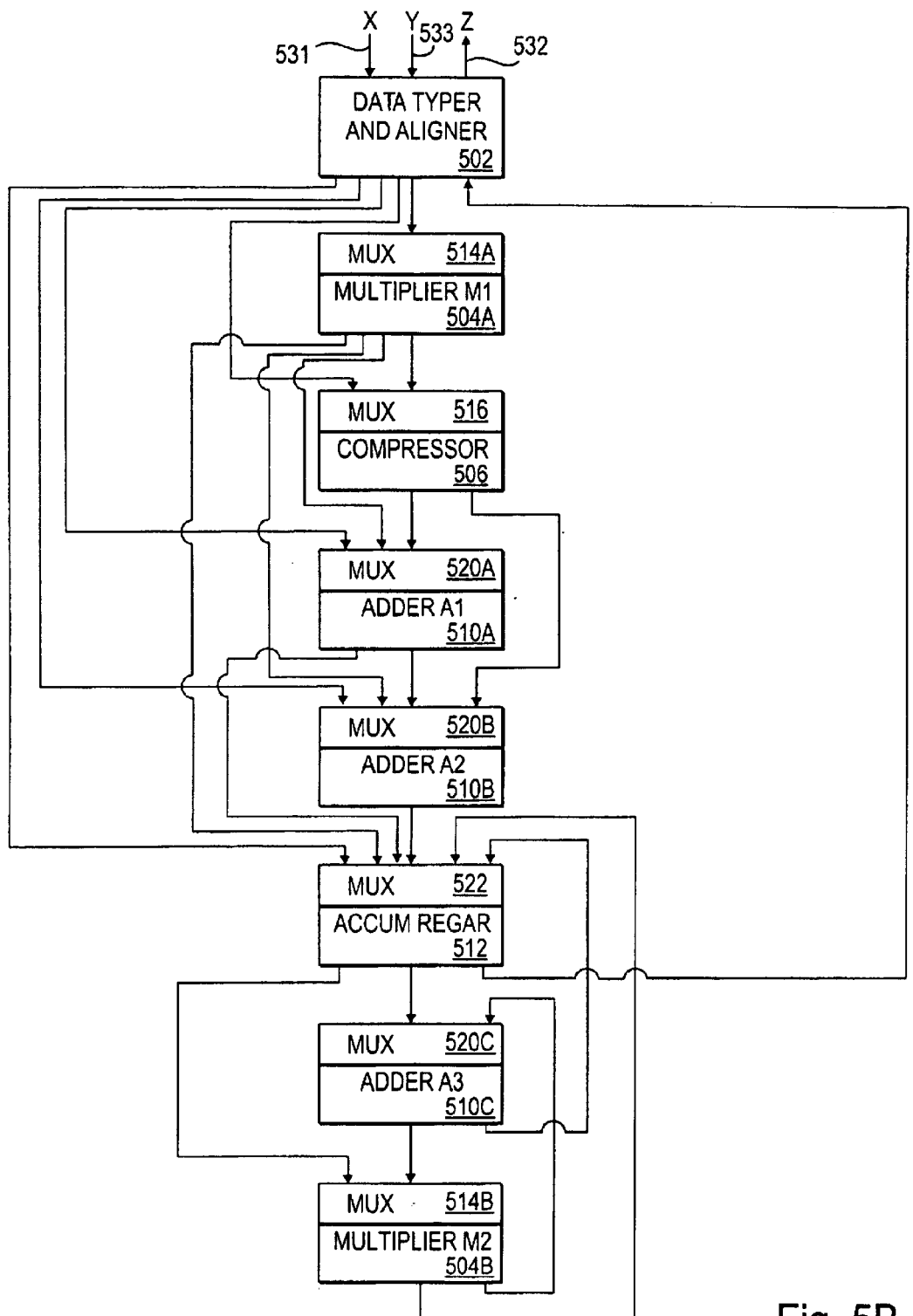
FIG. 5B is a more detailed block diagram of FIG. 5A illustrating the bus structure of the signal processing unit.

Referring now to FIG. 5B, a more detailed block diagram of the functional blocks and the bus structure of the signal processing unit is illustrated. Dyadic DSP instructions are possible because of the structure and functionality provided in each signal processing unit. Output signals are coupled out of the signal processor 300 on the Z output bus 532 through the data typer and aligner 502. Input signals are coupled into the signal processor 300 on the X input bus 531 and Y input bus 533 through the data typer and aligner 502. Internally, the data typer and aligner 502 has a different data bus to couple to each of multiplier M1 504A, compressor 506, adder A1 510A, adder A2 510B, and accumulator register AR 512. While the data typer and aligner 502 could have data busses coupling to the adder A3 510C and the multiplier M2 504B, in the preferred embodiment it does not in order to avoid extra data lines and conserve area usage of an integrated circuit. Output data is coupled from the accumulator register AR 512 into the data typer and aligner 502. Multiplier M1 504A has buses to couple its output into the inputs of the compressor 506, adder A1 510A, adder A2 510B, and the accumulator registers AR 512. Compressor 506 has buses to couple its output into the inputs of adder A1 510A and adder A2 510B. Adder A1 510A has a bus to couple its output into the accumulator registers 512. Adder A2 510B has buses to couple its output into the accumulator registers 512. Accumulator registers 512 has buses to couple its output into multiplier M2 504B, adder A3 510C, and data typer and aligner 502. Adder A3 510C has buses to couple its output into the multiplier M2 504B and the accumulator registers 512. Multiplier M2 504B has buses to couple its output into the inputs of the adder A3 510C and the accumulator registers AR 512.

Instruction Set Architecture

The instruction set architecture of the ASSP 150 is tailored to digital signal processing applications including audio and speech processing such as compression/decompression and echo cancellation. In essence, the instruction set architecture implemented with the ASSP 150, is adapted to DSP algorithmic structures. The adaptation of the ISA of the invention to DSP algorithmic structures is a balance between ease of implementation, processing efficiency, and programmability of DSP algorithms. The ISA of the invention provides for data movement operations, DSP/arithmetic/logical operations, program control operations (such as function calls/returns, unconditional/conditional jumps and branches), and system operations (such as privilege, interrupt/trap/hazard handling and memory management control).

Figure 6B:
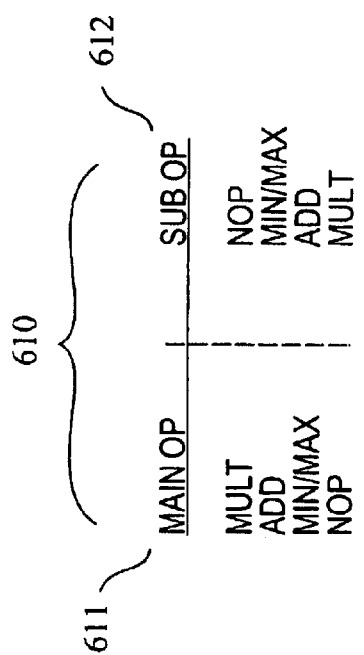
FIG. 6B is a chart illustrating the permutations of the dyadic DSP instructions.
Figure 6A:
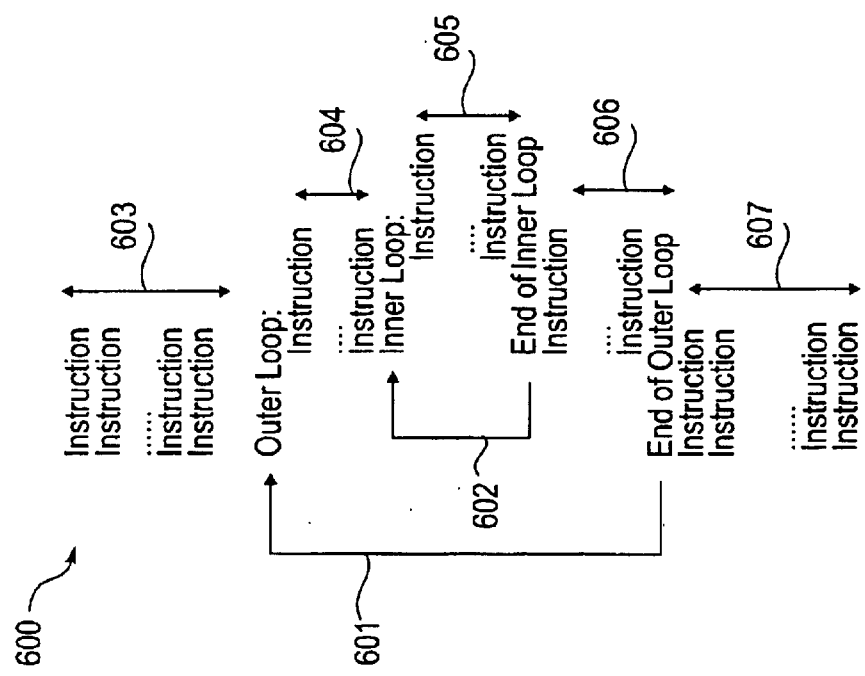
FIG. 6A is an exemplary instruction sequence illustrating a program model for DSP algorithms employing the instruction set architecture of the invention.
Figure 6H:
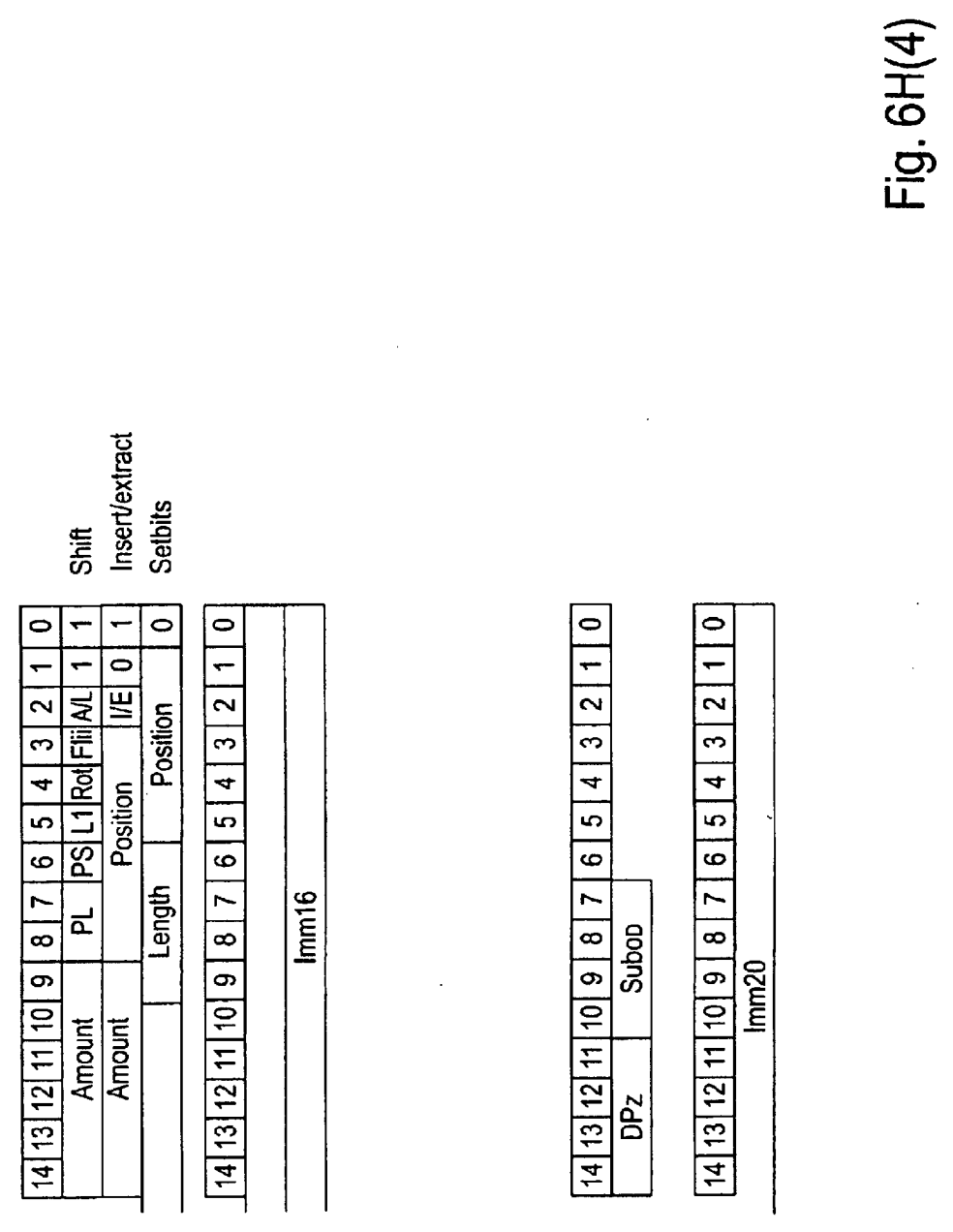

Referring now to FIG. 6A, an exemplary instruction sequence 600 is illustrated for a DSP algorithm program model employing the instruction set architecture of the invention. The instruction sequence 600 has an outer loop 601 and an inner loop 602. Because DSP algorithms tend to perform repetitive computations, instructions 605 within the inner loop 602 are executed more often than others. Instructions 603 are typically parameter setup code to set the memory pointers, provide for the setup of the outer loop 601, and other 2×20 control instructions. Instructions 607 are typically context save and function return instructions or other 2×20 control instructions. Instructions 603 and 607 are often considered overhead instructions which are typically infrequently executed. Instructions 604 are typically to provide the setup for the inner loop 602, other control through 2×20 control instructions, or offset extensions for pointer backup. Instructions 606 typically provide tear down of the inner loop 602, other control through 2×20 control instructions, and combining of datapath results within the signal processing units. Instructions 605 within the inner loop 602 typically provide inner loop execution of DSP operations, control of the four signal processing units 300 in a single instruction multiple data execution mode, memory access for operands, dyadic DSP operations, and other DSP functionality through the 20/40 bit DSP instructions of the ISA of the invention. Because instructions 605 are so often repeated, significant improvement in operational efficiency may be had by providing the DSP instructions, including general dyadic instructions and dyadic DSP instructions, within the ISA of the invention.

The instruction set architecture of the ASSP 150 can be viewed as being two component parts, one (RISC ISA) corresponding to the RISC control unit and another (DSP ISA) to the DSP datapaths of the signal processing units 300. The RISC ISA is a register based architecture including sixteen registers within the register file 413, while the DSP ISA is a memory based architecture with efficient digital signal processing instructions. The instruction word for the ASSP is typically 20 bits but can be expanded to 40-bits to control two RISC or DSP instructions to be executed in series or parallel, such as a RISC control instruction executed in parallel with a DSP instruction, or a 40 bit extended RISC or DSP instruction.

The instruction set architecture of the ASSP 150 has 4 distinct types of instructions to optimize the DSP operational mix. These are (1) a 20-bit DSP instruction that uses mode bits in control registers (i.e. mode registers), (2) a 40-bit DSP instruction having control extensions that can override mode registers, (3) a 20-bit dyadic DSP instruction, and (4) a 40 bit dyadic DSP instruction. These instructions are for accelerating calculations within the core processor 200 of the type where D=[(A op1 B) op2 C] and each of "op1" and "op2" can be a multiply, add or extremum (min/max) class of operation on the three operands A, B, and C. The ISA of the ASSP 150 which accelerates these calculations allows efficient chaining of different combinations of operations. Because these type of operations require three operands, they must be available to the processor. However, because the device size places limits on the bus structure, bandwidth is limited to two vector reads and one vector write each cycle into and out of data memory 202. Thus one of the operands, such as B or C, needs to come from another source within the core processor 200. The third operand can be placed into one of the registers of the accumulator 512 or the RISC register file 413. In order to accomplish this within the core processor 200 there are two subclasses of the 20-bit DSP instructions which are (1) A and B specified by a 4-bit specifier, and C and D by a 1-bit specifier and (2) A and C specified by a 4-bit specifier, and B and D by a 1 bit specifier.

Instructions for the ASSP are always fetched 40-bits at a time from program memory with bit 39 and 19 indicating the type of instruction. After fetching, the instruction is grouped into two sections of 20 bits each for execution of operations. In the case of 20-bit control instructions with parallel execution (bit 39=0, bit 19=0), the two 20-bit sections are control instructions that are executed simultaneously. In the case of 20-bit control instructions for serial execution (bit 39=0, bit 19=1), the two 20-bit sections are control instructions that are executed serially. In the case of 20-bit DSP instructions for serial execution (bit 39=1, bit 19=1), the two 20-bit sections are DSP instructions that are executed serially. In the case of 40-bit DSP instructions (bit 39=1, bit 19=0), the two 20 bit sections form one extended DSP instruction which are executed simultaneously.

The ISA of the ASSP 150 is fully predicated providing for execution prediction. Within the 20-bit RISC control instruction word and the 40-bit extended DSP instruction word there are 2 bits of each instruction specifying one of four predicate registers within the RISC control unit 302. Depending upon the condition of the predicate register, instruction execution can conditionally change base on its contents.

In order to access operands within the data memory 202 or registers within the accumulator 512 or register file 413, a 6-bit specifier is used in the DSP extended instructions to access operands in memory and registers. Of the six bit specifier used in the extended DSP instructions, the MSB (Bit 5) indicates whether the access is a memory access or register access. In the preferred embodiment, if Bit 5 is set to logical one, it denotes a memory access for an operand. If Bit 5 is set to a logical zero, it denotes a register access for an operand. If Bit 5 is set to 1, the contents of a specified register (rX where X: 0–7) are used to obtain the effective memory address and post-modify the pointer field by one of two possible offsets specified in one of the specified rX registers. If Bit 5 is set to 0, Bit 4 determines what register set has the contents of the desired operand. If Bit-4 is set to 0, then the remaining specified bits 3:0 control access to the registers within the register file 413 or to registers within the signal processing units 300.

DSP Instructions

There are four major classes of DSP instructions for the ASSP 150 these are:

1) Multiply (MULT): Controls the execution of the main multiplier connected to data buses from memory.
Controls: Rounding, sign of multiply
Operates on vector data specified through type field in address register
Second operation: Add, Sub, Min, Max in vector or scalar mode
2) Add (ADD): Controls the execution of the main-adder
Controls: absolute value control of the inputs, limiting the result
Second operation: Add, add-sub, mult, mac, min, max
3) Extremum (MIN/MAX): Controls the execution of the main-adder
Controls: absolute value control of the inputs, Global or running max/min with T register, TR register recording control
Second operation: add, sub, mult, mac, min, max
4) Misc: type-match and permute operations.

The ASSP 150 can execute these DSP arithmetic operations in vector or scalar fashion. In scalar execution, a reduction or combining operation is performed on the vector results to yield a scalar result. It is common in DSP applications to perform scalar operations, which are efficiently performed by the ASSP 150.

The 20-bit DSP instruction words have 4-bit operand specifiers that can directly access data memory using 8 address registers (r0–r7) within the register file 413 of the RISC control unit 302. The method of addressing by the 20 bit DSP instruction word is regular indirect with the address register specifying the pointer into memory, post-modification value, type of data accessed and permutation of the data needed to execute the algorithm efficiently. All of the DSP instructions control the multipliers 504A–504B, adders 510A–510C, compressor 506 and the accumulator 512, the functional units of each signal processing unit 300A–300D.

In the 40 bit instruction word, the type of extension from the 20 bit instruction word falls into five categories:

1) Control and Specifier extensions that override the control bits in mode registers
2) Type extensions that override the type specifier in address registers
3) Permute extensions that override the permute specifier for vector data in address registers
4) Offset extensions that can replace or extend the offsets specified in the address registers
5) DSP extensions that control the lower rows of functional units within a signal processing unit 300 to accelerate block processing.

The 40-bit control instructions with the 20 bit extensions further allow a large immediate value (16 to 20 bits) to be specified in the instruction and powerful bit manipulation instructions.

Efficient DSP execution is provided with 2×20-bit DSP instructions with the first 20-bits controlling the top functional units (adders 501A and 510B, multiplier 504A, compressor 506) that interface to data buses from memory and the second 20 bits controlling the bottom functional units (adder 510C and multiplier 504B) that use internal or local data as operands. The top functional units, also referred to as main units, reduce the inner loop cycles in the inner loop 602 by parallelizing across consecutive taps or sections. The bottom functional units cut the outer loop cycles in the outer loop 601 in half by parallelizing block DSP algorithms across consecutive samples.

Efficient DSP execution is also improved by the hardware architecture of the invention. In this case, efficiency is improved in the manner that data is supplied to and from data memory 202 to feed the four signal processing units 300 and the DSP functional units therein. The data highway is comprised of two buses, X bus 531 and Y bus 533, for X and Y source operands, and one Z bus 532 for a result write. All buses, including X bus 531, Y bus 533, and Z bus 532, are preferably 64 bits wide. The buses are uni-directional to simplify the physical design and reduce transit times of data. In the preferred embodiment when in a 20 bit DSP mode, if the X and Y buses are both carrying operands read from memory for parallel execution in a signal processing unit 300, the parallel load field can only access registers within the register file 413 of the RISC control unit 302. Additionally, the four signal processing units 300A–300D in parallel provide four parallel MAC units (multiplier 504A, adder 510A, and accumulator 512) that can make simultaneous computations. This reduces the cycle count from 4 cycles ordinarily required to perform four MACs to only one cycle.

Dyadic DSP Instructions

All DSP instructions of the instruction set architecture of the ASSP 150 are dyadic DSP instructions within the 20 bit or 40 bit instruction word. A dyadic DSP instruction informs the ASSP in one instruction and one cycle to perform two operations. Referring now to FIG. 6B is a chart illustrating the permutations of the dyadic DSP instructions. The dyadic DSP instruction 610 includes a main DSP operation 611 (MAIN OP) and a sub DSP operation 612 (SUB OP), a combination of two DSP instructions or operations in one dyadic instruction. Generally, the instruction set architecture of the invention can be generalized to combining any pair of basic DSP operations to provide very powerful dyadic instruction combinations. Compound DSP operational instructions can provide uniform acceleration for a wide variety of DSP algorithms not just multiply-accumulate intensive filters. The DSP instructions or operations in the preferred embodiment include a multiply instruction (MULT), an addition instruction (ADD), a minimize/maximize instruction (MIN/MAX) also referred to as an extrema instruction, and a no operation instruction (NOP) each having an associated operation code ("opcode"). Any two DSP instructions can be combined together to form a dyadic DSP instruction. The NOP instruction is used for the MAIN OP or SUB OP when a single DSP operation is desired to be executed by the dyadic DSP instruction. There are variations of the general DSP instructions such as vector and scalar operations of multiplication or addition, positive or negative multiplication, and positive or negative addition (i.e. subtraction).

Referring now to FIG. 6C and FIG. 6D, bitmap syntax for an exemplary dyadic DSP instruction is illustrated. FIG. 6C illustrates bitmap syntax for a control extended dyadic DSP instruction while FIG. 6D illustrates bitmap syntax for a non-extended dyadic DSP instruction. In the non-extended bitmap syntax the instruction word is the twenty most significant bits of a forty bit word while the extended bitmap syntax has an instruction word of forty bits. The three most significant bits (MSBs), bits numbered 37 through 39, in each indicate the MAIN OP instruction type while the SUB OP is located near the middle or end of the instruction bits at bits numbered 20 through 22. In the preferred embodiment, the MAIN OP instruction codes are 000 for NOP, 101 for ADD, 110 for MIN/MAX, and 100 for MULT. The SUB OP code for the given DSP instruction varies according to what MAIN OP code is selected. In the case of MULT as the MAIN OP, the SUB OPs are 000 for NOP, 001 or 010 for ADD, 100 or 011 for a negative ADD or subtraction, 101 or 110 for MIN, and 111 for MAX. In the preferred embodiment, the MAIN OP and the SUB OP are not the same DSP instruction although alterations to the hardware functional blocks could accommodate it. The lower twenty bits of the control extended dyadic DSP instruction, the extended bits, control the signal processing unit to perform rounding, limiting, absolute value of inputs for SUB OP, or a global MIN/MAX operation with a register value.

The bitmap syntax of the dyadic DSP instruction can be converted into text syntax for program coding. Using the multiplication or MULT non-extended instruction as an example, its text syntax for multiplication or MULT is (vmul|vmuln).(vadd|vsub|vmax|sadd|ssub|smax) da, sx, sa, sy [, (ps0|ps1)]

The "vmul|vmuln" field refers to either positive vector multiplication or negative vector multiplication being selected as the MAIN OP. The next field, "vadd|vsub|vmax|sadd|ssub|smax", refers to either vector add, vector subtract, vector maximum, scalar add, scalar subtraction, or scalar maximum being selected as the SUB OP. The next field, "da", refers to selecting one of the registers within the accumulator for storage of results. The field "sx" refers to selecting a register within the RISC register file 413 which points to a memory location in memory as one of the sources of operands. The field "sa" refers to selecting the contents of a register within the accumulator as one of the sources of operands. The field "sy" refers to selecting a register within the RISC register file 413 which points to a memory location in memory as another one of the sources of operands. The field of "[, (ps0|ps1)]" refers to pair selection of keyword PS0 or PS1 specifying which are the source-destination pairs of a parallel-store control register. Referring now to FIG. 6E and 6F, lists of the set of 20-bit DSP and control instructions for the ISA of the invention is illustrated. FIG. 6G lists the set of extended control instructions for the ISA of the invention. FIG. 6H lists the set of 40-bit DSP instructions for the ISA of the invention. FIG. 6I lists the set of addressing instructions for the ISA of the invention.

Referring now to FIG. 7, a block diagram illustrates the instruction decoding for configuring the blocks of the signal processing unit 300. The signal processor 300 includes the final decoders 704A through 704N, and multiplexers 720A through 720N. The multiplexers 720A through 720N are representative of the multiplexers 514, 516, 520, and 522 in FIG. 5B. The predecoding 702 is provided by the RISC control unit 302 and the pipe control 304. An instruction is provided to the predecoding 702 such as a dyadic DSP instruction 600. The predecoding 702 provides preliminary signals to the appropriate final decoders 704A through 704N on how the multiplexers 720A through 720N are to be selected for the given instruction. Referring back to FIG. 5B, in a dyadic DSP instruction the MAIN OP generally, if not a NOP, is performed by the blocks of the multiplier M1 504A, compressor 506, adder A1 510A, and adder A2 510B. The result is stored in one of the registers within the accumulator register AR 512. In the dyadic DSP instruction the SUB OP generally, if not a NOP, is performed by the blocks of the adder A3 510C and the multiplier M2 504B. For example, if the dyadic DSP instruction is to perform is an ADD and MULT, then the ADD operation of the MAIN OP is performed by the adder A1 510A and the SUB OP is performed by the multiplier M1 504A. The predecoding 720 and the final decoders 704A through 704N appropriately select the respective multiplexers 720A through 720B to select the MAIN OP to be performed by the adder Al 510A and the SUB OP to be performed by the multiplier M2 504B. In the exemplary case, multiplexer 520A selects inputs from the data typer and aligner 502 in order for adder Al 510A to perform the ADD operation, multiplexer 522 selects the output from adder 510A for accumulation in the accumulator 512, and multiplexer 514B selects outputs from the accumulator 512 as its inputs to perform the MULT SUB OP. The MAIN OP and SUB OP can be either executed sequentially (i.e. serial execution on parallel words) or in parallel (i.e. parallel execution on parallel words). If implemented sequentially, the result of the MAIN OP may be an operand of the SUB OP. The final decoders 704A through 704N have their own control logic to properly time the sequence of multiplexer selection for each element of the signal processor 300 to match the pipeline execution of how the MAIN OP and SUB OP are executed, including sequential or parallel execution. The RISC control unit 302 and the pipe control 304 in conjunction with the final decoders 704A through 704N pipelines instruction execution by pipelining the instruction itself and by providing pipelined control signals. This allows for the data path to be reconfigured by the software instructions each cycle.

Telecommunications Processing

Referring now to FIG. 10, a detailed system block diagram of the packetized telecommunication communication network 100' is illustrated. In the packetized telecommunications network 100' an end system 108A is at a near end while an end system 108B is at a far end. The end systems 108A and/or 108B can be a telephone, a fax machine, a modem, wireless pager, wireless cellular telephone or other electronic device that operates over a telephone communication system. The end system 108A couples to switch 106A which couples into gateway 104A. The end system 108B couples to switch 106B which couples into gateway 104B. Gateway 104A and gateway 104B couple to the packet network 101 to communicate voice and other telecommunication data between each other using packets. Each of the gateways 104A and 104B include network interface cards (NIC) 130A–130N, a system controller board 1010, a framer card 1012, and an Ethernet interface card 1014. The network interface cards (NIC) 130A–130N in the gateways provide telecommunication processing for multiple communication channels over the packet network 101. On one side, the NICs 130 couple packet data into and out of the system controller board 1010. The packet data is packetized and depacketized by the system controller board 1010. The system controller board 1010 couples the packets of packet data into and out of the Ethernet interface card 1014. The Ethernet interface card 1014 of the gateways transmits and receives the packets of telecommunication data over the packet network 101. On an opposite side, the NICs 130 couple time division multiplexed (TDM) data into and out of the framer card 1012. The framer card 1012 frames the data from multiple switches 106 as time division multiplexed data for coupling into the network interface cards 130. The framer card 1012 pulls data out of the framed TDM data from the network interface cards 130 for coupling into the switches 106.

Each of the network interface cards 130 includes a micro controller (cPCI controller) 140 and one or more of integrated telecommunications processors 150A–150N. Each of the integrated telecommunications processors 150N includes one or more RISC/DSP core processor 200, one or more data memory (DRAM) 202, one or more program memory (PRAM) 204, one or more serial TDM interface ports 206 to support multiple TDM channels, a bus controller or memory movement engine 208, a global or buffer memory 210, a host or host bus interface 214, and a microcontroller (MIPS) 223. Firmware flexibly controls the functionality of the blocks in the integrated telecommunications processor 150 which can vary for each individual channel of communication.

Referring now to FIG. 11, a block diagram of the firmware telecommunications processing modules of the application specific signal processor 150, forming the "integrated telecommunications processor" 150, for one of multiple full duplex channels is illustrated. One full duplex channel consists of two time-division multiplexed (TDM) time slots on the TDM or near side and two packet data channels on the packet network or far side, one for each direction of communication. The telecommunication processing provided by the firmware can provide telephony processing for each given channel including one or more of network echo cancellation 1103, dial tone detection 1104, voice activity detection 1105, dual-tone multi-frequency (DTMF) signal detection 1106; dual-tone multi-frequency (DTMF) signal generation 1107; dial tone generation 1108; G.7xxx voice encoding (i.e. compression) 1109; G.7xxx voice decoding (i.e. decompression) 1110, and comfort noise generation (CNG) 1111. The firmware for each channel is flexible and can also provide GSM decoding/encoding, CDMA decoding/encoding, digital subscriber line (DSL), modem services including modulation/demodulation, fax services including modulation/demodulation and/or other functions associated with telecommunications services for one or more communication channels. While $\mu$-Law/A-Law decoding 1101 and $\mu$-Law/A-Law encoding 1102 can be performed using firmware, in one embodiment it is implemented in hardware circuitry in order to speed the encoding and decoding of multiple communication channels. The integrated telecommunications processor 150 couples to the host processor 140 and a packet processor 1120. The host processor 140 loads the firmware into the integrated telecommunications processor to perform the processing in a voice over packet (VoP) network system or packetized network system.

The $\mu$-Law/A-Law decoding 1101 decodes encoded speech into linear speech data. The $\mu$-Law/A-Law encoding 1102 encodes linear speech data into $\mu$-Law/A-Law encoded speech. The integrated telecommunications processor 150 includes hardware G.711 $\mu$-Law/A-Law decoders and $\mu$-Law/A-Law encoders. The hardware conversion of A-law/$\mu$-law encoded signals into linear PCM samples and vice versa is optional depending upon the type of signals received. Using hardware for this conversion is preferable in order to speed the conversion process and handle additional communication channels. The TDM signals at the near end are encoded speech signals. The integrated telecommunications processor 150 receives TDM signals from the near end and decodes them into pulse-code modulated (PCM) linear data samples $S_{in}$. These PCM linear data samples $S_{in}$ are coupled into the network echo-cancellation module 1103. The network echo-cancellation module 1103 removes an echo estimated signal from the PCM linear data samples $S_{in}$ to generate PCM linear data samples $S_{out}$. The PCM linear data samples $S_{out}$ are provided to the DTMF detection module 1106 and the voice-activity detection and comfort-noise generator module 1105. The output of the Network Echo Canceller (Sout) is coupled into the Tone Detection module 1104, the DTMF Detection module 1106, and the Voice Activity Detection module 1105. Control signals from the Tone Detection module 1104 are coupled back into the Network Echo Cancellation module 1103. The decoded speech samples from the far end are PCM linear data samples Rin and are coupled into the network echo cancellation module 1103. The network echo cancellation module 1103 copies $R_{in}$ for echo cancellation purposes and passes it out as PCM linear data samples $R_{out}$. The PCM linear data samples $R_{out}$ are coupled into the mu-law and A-law encoding module 1102. The PCM linear data samples $R_{out}$ are encoded into mu-law and A-law encoded speech and interleaved into the TDM output signals of the TDM channel Output to the near end. The interleaving for framing of the data is performed after the linear to A-law/mu-law conversion by a Framer (not shown in FIG. 11) which puts the individual channel data into different time slots. For example, for T1 signaling there are 24 such time slots for each T1 frame.

The Network Echo Cancellation module 1103 has two inputs and two outputs because it has full duplex interfaces with both the TDM channels and the packet network via the VX-Bus. The network echo cancellation module 1103 cancels echoes from linear as well as non-linear sources in the communication channel. The network echo cancellation module 1103 is specifically tailored to cancel non-linear echoes associated with the packet delays/latency generated in the packetized network.

The tone detection module 1104 receives both tone and voice signals from the network cancellation module 1103. The tone detection module 1104 discriminates the tones from the voice signals in order to determine what the tones are signaling. The tone detection module determines whether or not the tones from the near end are call progress tones (dial tone, busy tone, fast busy tone, etc.) signaling on-hook, ringing, off-hook or busy, or a fax/modem call. If a far end is dialing the near end, the call progress tones of on-hook, ringing, or off-hook or busy signal is translated into packet signals by the tone detection module for transmission over the packet network to the far end. If the tone detection module determines that fax/modem tones are present indicating that the near end is initiating a fax/modem call, further voice processing is bypassed and the echo cancellation by the network echo cancellation module 1103 is disabled.

To detect tones, the tone detection module 1104 uses infinite impulse-response (IIR) filters and accompanying logic. When a FAX or modem tone signaling tone is detected, the signaling tones help control the respective signaling event. The tone detection module 1104 detects the presence of several in-band tones at specific frequencies, checks their cadences, signals their presence to the echo cancellation module 1103, and prompts other modules to take appropriate actions. The tone detection module 1104 and the DTMF detection module operate in parallel with the network echo canceller 1103.

The tone detection module can detect true tones with signal amplitude levels from 0 dB to −40 dB in the presence of a reasonable amount of noise. The tone detection module can detect tones within a reasonable neighborhood of center frequency with detection delays within a prescribed limit. The tone detection module matches the tone cadences, as required by the tone-cadence rules defined by the ITU/TIA standards. To achieve the above properties, certain trade-offs are necessary in that the tone detection module must adjust several energy thresholds, the filter roll-off rate, and the filter stopband attenuation. Furthermore, the tone detection module is easily upgradeable to allow detection of additional tones simply by updating the firmware. The current telephony-related tones that the tone-detection module 1104 can detect are listed in the following table:

| Tones the Tone-Detection Module Detects | | | |
|---|---|---|---|
| Tone Name | Tone Description | 'On' Time | 'Off' Time |
| FAX CED | 2100 Hz | 2.6 to 4 seconds | — |
| Echo Cancellation Disable/ Modem Tones | 2100 Hz, with phase reversal every 450 ms | 2.6 to 4 seconds | — |
| FAX CNG | 1100 Hz | 0.5 seconds | 3 seconds |
| FAX V.21 | 7E flags frequency-shift keying at 1750-Hz carrier. | At least three 7E flags signal the onset of a FAX signal being sent. | |
| 2400 Hz | In-band signaling tones and continuity check tones | G.168 Test 8 describes the performance of echo cancellation in the presence of these tones. | |
| 2600 Hz | | | |

When a 2100-Hz tone with phase reversal is detected indicating a V-series modem operation the echo canceller is shut off temporarily. When the tone detection module detects facsimile tones, the echo canceller is shut off temporarily. The tone detection module can also detect the presence of narrowband signals, which can be control signals to control the actions of the echo cancellation module 1103. The tone detection modules function both during call set up and while the call progress through termination of the communication channel for the call. Any tone which is sent, generated, or detected before the actual call or communication channel is established, is referred to as an out-of-band tone. Tones which are detected during a call, after the call has been set-up, are referred to as in-band tones. The Tone Detector, in it's most general form, is capable of detecting many signaling tones. The tones that are detected include the call progress tones such as a Ringing Tone, a Busy Tone, a Fast Busy Tone, a Caller ID Tone, a Dial Tone, and other signaling tones which vary from country to country. The, call progress tones control the handshaking required to set up a call. Once a call is established, all the tones which are generated and detected are referred to as in-band tones. The same Tone Detectors and Generators Blocks are used both for in-band and out-of band tone detection and generation.

In most conversations, speakers only voice speech about 35% of the time. During the remaining 65% of the time in most conversations, a speaker is relatively silent due to natural pauses for emphasis, clarity, breathing, thought processes, and so forth. When there are more than two speakers, as in conference calls, there is even more periods of silence. It is an inefficient use of a communication channel to transmit silence from one end to another. Thus, statistical multiplexing techniques are used to allocate to other calls this 65% of 'quiet' time (also known as 'dead time' or 'silence'). Even though quiet time is allocated to other calls, the channel quality during the time that end users use the communication channel is preserved. However, silence at one end which is not transmitted to an opposite end needs to be simulated and inserted into the call at the opposite end.

Sometimes when we speak over a telephone, we hear the echo of our own speech which we usually ignore. The important point is that we do hear the echo. However, many digital telephone connections are so noise-free there is no background noise or residual echo at all. As a result a far-end user, hearing absolute silence, may think the connection is broken and hang up. To convince users there is a connection, the background or Comfort-Noise Generation (CNG) module 1105 simulates silence or quite time at an end by adding background noise such as a comforting 'hiss'. The CNG module 1105 can simulate ambient background noise of varying levels. An echo-cancellation setup message can be used to control the CNG module as an external parameter. The comfort noise generation module alleviates the effects of switching in and out as heard by far-end talkers when they stop talking. The near-end noise level is used to determine an appropriate level of background noise to be simulated and inserted at the $S_{out}$ (Send Out) Port. However before silence can be simulated by the CNG module 1105, it first must be detected.

The Voice-Activity Detection (VAD) module 1105 is used to detect the presence or absence of silence in a speech segment. When the VAD module 1105 detects silence, background noise energy is estimated and an encoder therein generates a Silence-Insertion Description (SID) frame. The SID frame is transmitted to an opposite end to indicate that silence is to be simulated at the estimated background noise energy level. In response to receiving an SID frame at the opposite end (i.e., the Far End), the CNG module 1111 generates a corresponding comfort noise or simulated silence for a period of time. Using the received level of the ambient background noise from the SID frame, the CNG produces a level of comfort noise (also called 'white noise' or 'pink noise' or simulated silence) that replaces the typical background noises that have been removed, thereby assuring the far-end person that the connection has not been broken. The VAD module 1105 determines when the comfort noise is to be turned on (i.e. a quiet period is detected) and when comfort noise is to be turned off (i.e. the end user is talking again). The VAD 1105 (in the Send Path) and CNG module 1111 (in the Receive Path) work effectively together at two different ends so that speech is not clipped during the quiet period and comfort noise is appropriately generated.

The VAD module 1105 includes an Adaptive Level Controller (ALC) that ensures a constant output level for varying levels of near-end inputs. The adaptive level controller includes a variable gain amplifier to maintain the constant output level. The adaptive level controller includes a near-end energy detector to detect noise in the near-end signal. When the near end energy detector detects noise in the near-end signal the ALC is disabled so that undesirable noise is not amplified.

The DTMF detection module 1106 performs dual-tone multiple frequency detection necessary to detect DTMF tones as telephone signals. The DTMF detection module receives signals on Sout from the echo cancellation module 1103. The DTMF detection module 1106 is always active, even during normal conversation in case DTMF signals are transmitted during a conversation. The DTMF detection module does not disable echo cancellation when DTMF tones are detected. The DTMF detection module includes narrow-band filters to detect special tones and DTMF dialing tones. Furthermore because the G.7xxx speech encoding module 1109 and decoding module 1110 are used to compress/decompress speech signals and are not used for control signaling or dialing tones, the DTMF detection module may be used as appropriate to control sequencing, loading, and the execution of CODEC firmware.

The DTMF detection module 1106 detects the DTMF tones and includes a decoder to decode the tones to determine which telephone keypad button was pressed. The DTMF detection module 1106 is based on a Goertzel algorithm and meets all conditions of the Bellcore DTMF decoder tests as well as Mitel decoder tests.

The DTMF detection module 1106 indicates which dialpad key a sender has pressed after processing a few frames of data. The DTMF detection module can be adapted to receive user-defined parameters. The user defined parameters can be varied to optimize the DTMF detector for specific receiving conditions such as the thresholds for both of the frequencies made up by the 'rows' and 'columns' of the DTMF keypad, thresholds for acceptable twist ratios (the ratio of powers between the higher and lower frequencies), silence level, signal-to-noise ratios, and harmonic ratios.

The DTMF generation module 1107 provides dual-tone multiple frequency (DTMF) generation necessary to generate DTMF tones for telephone signals. The encoding process in the DTMF generation module 1107 generates one of the various pairs of DTMF tones. The DTMF generation module 1107 generates digitized dual-tone multi-frequency samples for a dialpad key depression at the far end. The DTMF generation module 1107 is also always active, even during normal conversation. The DTMF generation module 1107 includes narrow-band filters to generate special tones and DTMF dialing tones. The DTMF generation module 1107 receives a DTMF packet from the far end over the packet network. The DTMF generation module 1107 includes a DTMF decoder to decode the DTMF packet and properly generate tones. The DTMF packet payload includes such information as the key or digit that was pressed that is to be played (i.e. dialpad key coordinates), duration to be played (Number of successive 125 microsecond samples during which the tone is enabled and Number of successive 125 microsecond samples during which the tone is shut off disabled), amplitude level (Lower-frequency amplitude level in dB and Upper-frequency amplitude level in dB) and other information. By specifying these parameters, the DTMF generation module 1107 can generate DTMF signaling tones having the required signal amplitude levels and timing for the appropriate digit/tone. The DTMF tones generated by the DTMF generation module 1107 are coupled into the echo canceller on $R_{in}$.

The tone generation module 1108 operates similar to the DTMF generation module 1107 but generates the specific tones that provide telephony signals. The tones generated by the tone generation module include tones to signal On-hook/off-hook, Ringing, Busy, and special tones to signal FAX/modem calls. A tone packet is received from the far end over the packet network and is decoded and the parameters of the tone are determined. The tone generation module 1108 generates tone similar to the DTMF generation module 1107 previously described using narrowband filters.

The G.7xx encoding module 1109 provides speech compression before being packetized. The G.7xx encoding module 1109 receives speech in a linear 64-Kbps pulse-code modulation (PCM) format from the network echo cancellation module 1103. The speech is compressed by the G.7xx encoding module 1109 using one of the compression standards specified for low bit-rate voice (LBRV) CODECs, including the ITU-T internationally standardized G.7xx series. Many speech CODECs can be chosen. However, the selected speech CODEC determines the block size of speech samples and the algorithmic delay. Of several industry-standard speech CODECs in use, each implements a different combination of Coding rate, Frame length (the size of the speech sample block), and Algorithmic delay (or detection delay) caused by how long it takes all samples to be gathered for processing.

The G.7xx decoding module 1110 provides speech decompression of signals received from the far end over the packet network. The decompressed speech is coupled into the network echo cancellation module 1103. The decompression algorithm of the G.7xx decoding module 1110 needs to match the compression algorithm of the G.7xx encoding module 1109. The G.7xx decoding module 1110 and the G.7xx encoding module 1109 are referred to as a CODEC (coder-decoder). Currently, there are several industry-standard speech CODECs from which to pick. The parameters for selection of a CODEC are previously described. The ITU CODECs include G.711, G.722, G.723.1, G.726, G.727, G.728, G.729, G.729A, and G.728E. Each of these can easily be selected by choice of firmware.

Data enters and leaves the processor 150 through the TDM serial I/O ports and a 32-bit parallel VX-Bus 1112. Data processing in the processor 150 is performed using 16-bits of precision. The companded 8-bit PCM data on the TDM channel input is converted into 16-bit linear PCM for processing in the processor 150 and is re-converted back into 8-bit PCM for outputting on the TDM channel output.

Referring now to FIG. 12, a flow chart diagram of the telephony processing of linear data ($S_{in}$) from a near end to packet data on the network side at a far end is illustrated. Near in data $S_{in}$ is provided to the integrated telecommunications processor 150. At step 1201, a determination is made whether the echo cancellation module 1103 is enabled or not. If the echo cancellation module 1103 is not enabled, the integrated telecommunications processor 150 jumps to the tone detection module 1205 which detects the presence or absence of in-band tones in the Sin signal. If the echo cancellation module 1103 is enabled at step 1201, the near in data $S_{in}$ (NearIn TDM 1202 in FIG. 12) is coupled into the echo cancellation module 1003 at step 1203 and data from the far end (FarIn Decoded PCM 1204 from FIG. 13) is utilized by the echo cancellation module 1003 to cancel out echoes. After echo cancellation is performed at step 1203 and/or if the echo cancellation module 1103 is enabled, the integrated telecommunications processor 150 jumps to the tone detection step 1205 where the data is coupled into tone detection module 1104. The processor 150 goes to step 1207.

At step 1207, a determination is made whether a fax tone is present. If the fax tone is present at step 1207, the integrated telecommunications processor 150 jumps to step 1209 to provide fax processing. If no fax tone is present at step 1207, further interpretation of the result by the tone detection module occurs at step 1211.

At step 1211, a determination is made whether there is an echo cancellation control tone to indicate the Enabling and Disabling of the Echo Canceller. If an Echo cancellation control tone is present, integrated telecommunications processor jumps to step 1215. If no echo cancellation control tone is detected at step 1211, the incoming data signal Sin may be a voice or speech signal and the integrated telecommunications processor jumps to the VAD module at step 1219.

At step 1215 the energy of the Tone is compared to a predetermined threshold. A determination is made whether or not the energy level in the signal $S_{in}$ is less than a threshold level. If the energy of the Tone on $S_{in}$ is greater than or equal to this predetermined threshold, the processor jumps to step 1213. If the energy of the Tone on $S_{in}$ is less than the threshold level, the integrated telecommunications processor 150 jumps to step 1217.

At step 1213, the echo cancellation disable tone has been detected and the energy of the tone is greater than a given predetermined threshold which causes the echo cancellation module to be disabled to cancel newly arriving Sin signals. After the Echo Canceller Disable Tone has been detected, the Echo Canceller block is given an indication through a control signal to disable Echo Cancellation.

At step 1217, the echo cancellation disable tone was not detected and the energy of the tone is less than the given predetermined threshold. The echo cancellation module is enabled or remains enabled if already in such state. The Echo Canceller block is given an indication through a control signal to enable Echo Cancellation. This may indicate the end of Echo Canceller Disable Tone.

The predetermined threshold level is a cutoff level to determine whether or not an Echo Canceller Disable Flag should be turned OFF. If the Tone Energy drops below a predetermined threshold, the Echo Cancellation disable flag is turned OFF. This flag is coupled into the Echo Canceller module. The Echo Canceller module is enabled or disabled in response to the echo cancellation disable flag. If the Tone energy is greater than the pre-determined threshold, then the processor jumps to step 1213 as described above. In either case, whether or not the echo cancellation disable flag is set true or false or at steps 1213 or 1217, the next step in processing is the VAD module at step 1219.

At step 1219, the data signal Sin is coupled into the voice activity detector module 1105 which is used to detect periods of voice/DTMF/tone signals and periods of silence that may be present in the data signal Sin. The processor 150 jumps to step 1221.

At step 1221, a determination is made whether silence had been detected. If silence has been detected, the integrated telecommunications processor 150 jumps to step 1223 where an SID packet is prepared for transmission out as a packet on the packet network at the far end. If no silence is detected at step 1221, the processor couples the signal Sin into the ambient level control (ALC) module (not shown in FIG. 11). At step 1225, the ALC amplifies or de-amplifies the signal $S_{in}$ to a constant level. Integrated telecommunications processor 150 then jumps to step 1227 where DTMF/Generalized Tone detection is performed by the DTMF/Generalized Tone detection module 1106. The processor goes to step 1229.

At step 1229 a determination is made whether DTMF or tone signals have been detected. If DTMF or tone signals have been detected, integrated telecommunications processor 150 generates DTMF or tone packets at step 1231 for transmission out the packet network at the far end. If no DTMF or tone signals are detected at step 1229, the signal N is a voice/speech signal and the G.7XX encoding module 1109 encodes the speech into a speech packet at step 1233. A speech packet 1235 is then transmitted out the packet network side to the far end.

Referring now to FIG. 13, a flow chart diagram of the telephony processing of packet data from the network side at the far end by the integrated telecommunications processor 150 into Rout signals at the near end is illustrated. The integrated telecommunications processor 150 receives packet data from the far end over the packet network 101. At step 1301, a determination is made as to what type of packet has been received. The integrated telecommunications processor 150 is expecting one of five types of packets. The five packet types that are expected are a fax packet 1303, a DTMF packet 1304, a Tone packet 1305, a speech or SID packet 1306.

If at step 1301 a determination has been made that a fax packet 1303 has been received, data from the packet is coupled into a fax demodulation module by the integrated telecommunications processor at step 1308. At step 1308, the fax demodulation module demodulates the data from the packet using fax demodulation into Rout signals at the near end. If at step 1301 a determination has been made that a DTMF packet 1304 has been received, the data from the packet is coupled into the DTMF generation module 1107 at step 1310. At step 1310, the DTMF generation module 1107 generates DTMF tones from the data in the packet Rout signals at the near end. If at step 1301 the packet received is determined to be a tone packet 1305, the data from the packet is coupled into the tone generation module 1108 at step 1312. At step 1312, the tone generation module 1108 generates tones as Rout signals at the near end. If at step 1301 a determination has been made that speech or SID packets 1306 have been received, the data from the packet is coupled into the G.7xx decoding module 1110 at step 1314. At step 1314, the G.7xx decoding module 1110 decompresses the speech or SID data from the packet into Rout signals at the near end.

If at step 1301 a determination has been made that the packet is either a DTMF packet 1304, a tone packet 1305, a speech packet or an SID packet 1306, the integrated telecommunications processor 150 jumps to step 1318. If at step 1318, the echo canceller flag is enabled, the $R_{out}$ signals from the respective module is coupled into the echo cancellation module. These $R_{out}$ signals are the Far End Input to the Echo Canceller whose echo, if not cancelled, rides on the Near End Signal when it gets transmitted to the other end. At step 1318, the respective $R_{out}$ signal (FarIn Decoded PCM 1204 in FIG. 13) from a module in conjunction with the $S_{in}$ signal (NearIn TDM 1202 from FIG. 12) and the Echo Canceller Enable Flag from the nearend are used to perform echo canceling. The Echo Canceller Enable Flag is a binary flag which turns ON and OFF the Echo Canceling operation in step 1318. When this flag is ON, the NearEndIn signals are processed to cancel the potential echo of the FarEnd. When this flag is OFF, the NearEndIn signal by-passes the Echo Canceling as is.

Referring now to FIG. 14, a block diagram of the data flows and interaction between exemplary functional blocks of the integrated telecommunications processor 150 for telephony processing is illustrated. There are two data flows in the voice over packet (VOP) system provided by the integrated telecommunications processor 150. The two data flows are TDM-to-Packet and Packet-to-TDM which are both executed in tandem to form a full duplex system.

The functional blocks in the TDM-to-Packet data flow includes the Echo Canceller 1403, the tone detector 1404, the voice activity detector (VAD) 1405, the automatic level controller (ALC) 1401, DTMF detector 1405, and packetizer 1409. The Echo Canceller 1403 substantially removes a potential echo signal from the near end of gateway. The Tone Detector 1404 controls the echo canceller and other modules of the integrated telecommunications processor 150. The tone detector is for detecting the EC Disable Tone, the FAXCED tone, the FAXCNG tone and V21 '7E' flags. The tone detector 1404 can also be programmed to detect a given number of signaling tones also. The VAD 1405 generates Silence Information Descriptor (SID) when speech is absent in the signal from the near end. The ALC 1401 optimizes volume (amplitude) of speech. The DTMF detector 1405 looks for tones representing DTMF digits. The Packetizer 1409 packetizes the appropriate payloads in order to send packets.

The functional blocks in the Packet to TDM Flow include: the Depacketizer 1410, the Comfort Noise Generator (CNG) 1420, the DTMF Generator 1407, the PCM to linear converter 1421, and the optional Narrowband signal detector 1422. The Decoder 1410 depackets the packet type and routes it appropriately to the CNG 1420, the PCM to linear converter 1421 or the DTMF generator 1407. The CNG 1420 generates comfort noise based on an SID packet. The DTMF generator 1407 generates DTMF signals of a given amplitude and duration. The optional Narrowband signal detector 1422 detects when it is undesirable for the echo canceller to cancel the echo of certain tones on the Rin side. The PCM to Linear converter 1421 converts A-law/mu-law encoded speech into 16-bit linear PCM samples. However, this block can easily be replaced by a general speech decoder (e.g. G.7xx speech decoder) for a given communications channel by swapping out the appropriate firmware code. The TDM IN/OUT block 1424 is a A-law/mu-law to linear conversion block (i.e. 1101, 1102) which occurs at the TDM interface. The functionality of the A-law/mu-law to linear conversion block (i.e. 1101, 1102) can be performed by dedicated hardware or can be programmed and performed by firmware utilizing signal processing units.

The integrated telecommunications processor is a modular system. It is easy to open new communication channels and support numerous channels simultaneously as a result. These functional modules or blocks of the integrated telecommunications processor 150 interact with each other to achieve complete functionality.

Communication between blocks or modules, that is inter functional-block communication, is carried out by using shared memory resources with certain access rules. The location of the shared area in memory is called Inter functional-block data (InterFB data). All functional blocks of the integrated telecommunications processor 150 have permission to read this shared area in memory but only a few blocks or modules of the integrated telecommunications processor 150 have permission to write into this shared area of memory. The InterFB data is a fixed (reserved) area in memory starting at a memory address such as 0x0050H for example. All the functional blocks or modules of the integrated telecommunications processor 150 communicate with each other if need using this shared memory or InterFB data. The same shared memory area may be used for both TDM-Packet and Packet-TDM data flows or they may be split into different shared memory areas.

The table below indicates a sample set of parameters that may be communicated between functional blocks in the integrated telecommunications processor 150. The column "Parameter Name" indicates the parameter while the "Function" column indicates the function the parameters assist in performing. The "Write/Read Access" column indicates what functional blocks can read or write the parameter.

| Parameter Name | Write/Read Access | Function |
| --- | --- | --- |
| td_initialize | Script (w), tone_detect (w/r) | Initializes state for TD |

-continued

| Parameter Name | Write/Read Access | Function |
| --- | --- | --- |
| Ecdisable_detect, faxced_detect, faxcng_detect, faxv21_detect, | Td (w), ec (r,w) | Switching ALC, EC ON/OFF |
| Key, dtmf_detect | Dtmf (w), packetizer (r) | Indicates dtmf digit presence |
| Vad_decision, noise_level | Vad (w), cng (r), script/alc (r) | Voice decision, SID for CNG |
| Tone_flag, frequency1, frequency2 | Narrowband (w), ec/script (r) | Indicates narrowband signal on Rin |

The interaction between the functional blocks or modules and the respective signals are now described. The echo canceller 1403 receives both the Sin signal and Rin signal in order to generate the Sout signal as the echo cancelled signal. The echo canceller 1403 also generates the Rout signal which is normally the same as Rin. That is, no further processing is performed to the Rin signal in order to generate the Rout signal in most cases. The echo canceller 1403 operates over both data flows in that it receives from the TDM end as well as data from the packet side. The echo canceller 1403 properly functions only when data is fully available in both the flows. When a TDM frame (Sin) is ready to be processed, a packet is grabbed from the packet buffer and decoded (Rin) and put into memory. The TDM frame is the Sin signal data from which the echo needs to be removed. The decoded packet is the Rin data signal.

The tone detector 1404 receives the output Sout from the echo canceller 1403. The tone detector 1404 looks for the EC Disable Tone, the FAXCED tone, the FAXCNG tone and the tones representing V21 '7E' flags. The tone detector functions on Sout data after the echo canceller 1403 has completed its data processing. The tone detector's main purpose is to control other modules of the integrated telecommunications processor 150 by turning them ON or OFF. The tone detector 1404 is basically a switching mechanism for the modules such as the Echo Canceller 1403 and the ALC 1401. The tone detector can write the ecdisable flag in the shared memory while the echo canceller 1402 reads it. The tone detector or Echo Canceller writes an ALCdisable flag in the shared memory while the ALC 1401 reads it. Most events detected by the tone detector are used by the echo canceller in one way or another. For example, the Echo Canceller 1403 is to turn OFF when an ecdisable tone is detected by the tone detector 1404. Modems usually send the /ANS signal (or ecdisable tone) to disable the echo cancellers in a network. When the tone detector 1404 of the integrated telecommunications processor 150 detects the ecdisable tone, it writes a TRUE state into the memory location representing ecdisable flag. On the next TDM data packet flow, the echo canceller 1403 reads the ecdisable flag to determine it is to perform echo cancellation or not. In the case its disabled, the echo canceller 1403 generates Sout as Sin with no echo canceling signal added. The ecdisable flag is updated to a FALSE state by the echo canceller 1403 when the root mean squared energy of Sin (RMS) falls below −36 dbm indicating no tone signals.

In certain cases it is undesirable for the ALC 1401 to modify the amplitude of a signal such as when sending FAX data. In this case it is desirable for the ALC 1041 to be turned ON and OFF. In most cases an ANS tone is required to turn the ALC 1401 OFF. When the tone detector 1404 detects an ANS tone, it writes a TRUE state into the memory location for the ALC disable flag. The ALC 1401 reads the shared memory location for the ALC disable flag and turns itself ON or OFF in response to its state. Another condition that ALC disable flag may be turned ON could be a signal from the Echo Canceller saying there was no detected Near End signal. This may be the case when the Sout signal is below a given threshold level.

When the tone detector detects an EC disable tone, it turns OFF the echo canceller 1403 (G.168). When the tone detector detects a FAXCED tone(ANS), it turns OFF the ALC 1401 (G.169) and provides a data by-pass for FAX processing. When the tone detector detects a FAXCNG tone, it provides a data by pass for FAX processing. When the tone detector simultaneously detects three V21 '7E' Flags in a row, it provides a data by pass for FAX processing.

The VAD 1405 is used to reduce the effective bit rate and optimize the bandwidth utilization. The VAD 1405 is used to detect silence from speech. The VAD encodes periods of silence by using a Silence Information Descriptor rather than sending PCM samples that represent silence. In order to do so, the VAD functions over frames of data samples of Sout. The frame size can vary depending on situations and needs of different implementations with a typical frame representing 80 data samples of Sout. If the VAD 1405 detects silence, it writes a voice_activity flag in the shared memory to indicate silence. It also measures the noise power level and writes a valid noise_power level into a shared memory location.

The ALC 1401 reads the voice_activity flag and applies gain control if voice is detected. Otherwise if the voice_activity flag indicates silence, the ALC 1401 does not apply gain and passes Sout through without amplitude change as its output.

The packetizer/encoder 1409 reads the voice activity flag to determine if a current frame of data contains a valid voice signal or not. If the current frame is voice, then the output from the ALC needs to be added into the PCM payload. If the current frame is silence and an SID has been generated by the VAD 1405, the packetizer/encoder 1049 reads the SID information stored in the shared memory in order for it to be packetized.

The ALC 1401 functions in response to the VAD 1405. The VAD 1405 may look over the last one or more frames of data to determine whether or not the ALC information should be added to a frame or not. The ALC 1401 applies gain control if voice is detected else Sout is passed through without any change. The tone detector 1404 disables and enables the ALC 1401 as described above to comply with the G.169 specification. Additionally, the ALC 1401 is disabled when Sout signal level goes below certain threshold (−40 dBm for example) after Echo Cancellation by the echo canceller 1403. If current frame contains valid voice data, then the output gain information from the ALC 1401 is added to the PCM payload by the packetizer. Otherwise if silence is detected, the packetizer uses the SID information to generate packets to be sent as the send_packets.

The DTMF detector 1406 functions in response to the output from the ALC 1401. The DTMF detector 1406 uses an internal frame size of 102 data samples but it adapts to any frame size of data samples. DTMF signaling events for a current frame are recorded in an InterFB area of shared memory. High level programs use DTMF signaling events stored in the InterFB area. Typically the high level program reads all the necessary info and then clears the contents for future use.

The DTMF detector 1406 may read the VAD_activity flag to determine if voice signals are detected. If so, the DTMF detector may not execute until other signal types, such as tones, are detected. If the DTMF detector detects that a current frame of data contains valid DTMF digits, then a special DTMF payload is generated for the packetizer. The special DTMF payload contains relevant information needed to faithfully regenerate DTMF digits at the other end. The packetizer/encoder generates DTMF packets for transmission over the send_packet output.

The Packetizer/Encoder 1409 includes a packet header of 1 byte to indicate which data type is being carried in the payload. The payload format depends on the data being transported. For example, if the payload contains PCM data then the packet will be quite larger than an SID packet for generating comfort noise. The packetizing may be implemented as part of the integrated telecommunications processor or it may be performed by an external network processor.

The Depacketizer/Decoder 1410 receives a stream of packets over rx_packet and first determines what type of packet it is by looking at the packet header. After making a determination as to the type of packet received, the appropriate decoding algorithm can be executed by the integrated telecommunications processor. The type of packets and their possible decoding functions include Comfort Noise Generation (CNG), DTMF Generation, and PCM/Voice decoding. The Depacketizer/Decoder 1410 generates frames of data which are used as Rin. In many cases, a single frame of data is generated by one packet of data.

The comfort noise generator (CNG) 1420 receives commands from the depacketizer/decoder 1410 to generates a "comfortable" pink noise in response receiving an SID frame as a payload in a packet on the rx_packet. The comfort noise generator (CNG) 1420 generates the "comfortable" pink noise at a level corresponding to the noise power indicated in the SID frame. In general, the comfort noise generated can have any spectral characteristics and is not limited to pink noise.

The DTMF Generator 1407 receives commands from the depacketizer and generates DTMF tones in response to the depacketizer receiving a DTMF payload in a packet on rx_packet. The DTMF tones generated by the DTMF Generator 1407 correspond to amplitude levels, key, and possibly duration of the corresponding DTMF digit described in the DTMF payload.

Referring now to FIG. 15, exemplary memory maps of the memories of the integrated telecommunications processor 150 and their inter-relationship are illustrated. FIG. 15 illustrates an exemplary memory map for the global buffer memory 210 to which each of the core processors 200 have access. The program memory 204 and the data memory 202 for each of four core processors 200A–200D (Core 0 to Core 3) is also illustrated in FIG. 15 as being stacked upon each other. The program memory 204C and the data memory 202C for the core processor 200C (Core 2) is expanded in FIG. 15 to show an exemplary memory map. FIG. 15 also illustrates the file registers 413 for one of the core processors, core processor 200C (Core 2).

The memory of the integrated telecommunications processor 150 provides for flexibility in how each communication channel is processed. Firmware and data can be swapped in and out of the core processors 200 when processing a different job. Each job can vary by channel, by frame, by data blocks or otherwise with changes to the firmware. In one embodiment, each job is described for a given frame and a given channel. By providing the functionality in firmware and swapping the code into and out of program memory of the core processors 200, the functionality of the integrated telecommunications processor 150 can be easily modified and upgraded.

FIG. 15 also illustrates the interrelationship between the global buffer memory 210, data memory 202 for the core processors 200, and the register files 413 in the signal processing units 300 of each core processor 200. The multichannel memory movement engine 208 flexibly and efficiently manages the memory mapping so as to extract the maximum efficiency out of each of the algorithm signal processors 300 for a scalable number of channels. That is, the integrated telecommunications processor 150 can support a varying number of communication channels which is scalable by adding additional core processors because the signal processing algorithms and data are stored in memory are easily swapped into and out of many core processors. Furthermore, the memory movement engine 208 can sequence through different signal processing algorithms to provide differing module functionality for each channel.

All algorithm data and code segments are completely relocatable in any memory space in which they are stored. This allows processing of each frame of data to be completely independent from the processing of any other frame of data for the same channel. In fact, any frame of data may be processed on any available signal processor 300. This allows maximum utilization of the processor resources at all times.

Frame processing can be partitioned into several pieces corresponding to algorithm specific functional blocks such as those for the integrated telecommunications processor illustrated in FIGS. 11–14. The "fixed" (non-changing) code and data segments associated with each of these functional blocks can be independently located in a memory space which is not fixed and only one copy of these segments need be kept regardless of the number of channels which are to be supported. This data can be downloaded and/or upgraded at any time prior to it's use. A table of pointers, for example, can be used to specify where each of these blocks currently resides in a memory space. In addition, dynamic data spaces required by the algorithms, which are modifiable, can be allocated at run-time and de-allocated when no longer needed.

When a frame(s) for a particular channel is ready for processing, only the code and data for the functional blocks required for the specified processing of the frame need be referenced. A "script" specifying which of these functional blocks is required can be constructed in real time on a frame by frame basis. Alternately, pre-existing scripts which contain functional block references identified by an identifier for example can be called and executed without addresses. In this case the locations of the functional blocks in any memory space are "looked" up from a table of pointers, for example.

Furthermore, DMA can be utilized if the code and/or data segments for a functional block must be transferred from one memory space to another memory space in order to reduce the overhead associated with processor intervention in such transfer. Since the code and data blocks required by any functional block are completely independent of each other, "chains" of DMA transfers can be defined and executed to transfer multiple blocks from one memory space to another without processor intervention. These "chains" can be created or updated when needed based on the current processing requirements for a particular channel using the "catalog" of functional blocks currently available. A DMA module creating a description of DMA transfers can optimize the use of the destination memory space by locating the segments wherever necessary to minimize wasted space.

In FIG. 15, functional blocks and channel specific segments are arranged in the memory spaces of the global buffer memory 210 and called into the data memory 202 and program memory 204 of a core processor 200. In the exemplary illustration of FIG. 15, the Global buffer memory 210 includes an Algorithm Processing (AP) Catalog 1500, Dynamic Data Blocks 1515, Frame Data Buffers 1520, Functional-Block (FB) & Script Header Tables 1525, Channel Control Structures 1530, DMA Descriptors List 1535, and a Channel Execution Queue 1540.

FIG. 16 is a block diagram illustrating another exemplary memory map for the global buffer memory 210 of the integrated telecommunications processor 150 and the interrelationship of the blocks contained therein.

Referring to FIGS. 15 and 16, the Algorithm Processing (AP) Catalog 1500 includes channel independent, algorithm specific constant data segments, code data segments and parameter data segments for any algorithm which may be required in the integrated telecommunications processor system. These algorithms include telecommunication modules for Echo cancellation (EC), tone detection and generation (TD), DTMF detection and generation (DTMF), G.7xx CODECs, and other functional modules. Examples of the code data segments include DTMF code 1501, TD code 1502, and EC code 1503 for the DTMF, TD and EC algorithms respectively. Examples of the algorithm specific constant data segments include DTMF constants 1504, TD constants 1505, and EC constants 1506 for the DTMF, TD and EC algorithms respectively. Examples of the parameter data segments include DTMF parameters 1507, TD parameters 1508, and EC parameters 1509 for the DTMF, TD and EC algorithms respectively.

The Algorithm Processing (AP) Catalog 1500 also includes a set of scripts (each containing a script data, script code, and a script DMA template) for each kind of frame processing required by the system. The same script may be used for multiple channels, if these channels all require the same processing. The scripts do not contain any channel specific information. FIG. 15 illustrates script 1 data 1511A, script 1 code 1512A, and a script 1 DMA template 1513A through script N data 1511N, script N code 1512N, and script N DMA template 1513N.

The script 1 blocks (script 1 data 1511A, script 1 code 1512A, script 1 DMA template 1513A) in the AP catalog 1500 define the functional blocks required to accomplish specific processing of a frame of data of a any channel which requires the processing defined by this script and the addresses into the program memory 204 where the functional block code should be transferred and the data memory 202 where the data segments should be transferred. Alternately, these addresses into the program memory 204 and data memory 202 where the data segments should be transferred could be determined at run time by a core memory management function. The script 1 blocks also specify the order of execution of the functional blocks by one of the core processors 200. The script 1 code 1512A for example may define the functional blocks and order of execution required to accomplish echo cancellation and DTMF detection. Alternately, it could describe the functional blocks and execution required to perform G.7xx coding and decoding. Note also that the script 1 blocks can specify "conditional" data transfer and execution such as a data transfer or an execution which depends on the result of another functional blocks results. For example these conditional data transfers may include those surrounding the functional blocks such as whether or not call progress tones are detected. The script 1 DMA template 1513A associated with the script 1 blocks specifies the sequence in which the data should be transferred into and out of the data memory and program memory of one of the core processors 200. Additionally, the script DMA templates associated with each script block is used to construct the one or more channel specific DMA descriptors in the DMA descriptors list 1535 in the global memory buffer 210.

The global buffer memory 210 also includes a table of Functional Block and Script Headers referred to as the FB and Script Header tables 1525. The FB and Script Headers tables 1525 includes the size and the global buffer memory starting addresses for each of the functional blocks segments and script segments contained in the AP Catalog 1500. For example referring to FIG. 16, the DTMF header table includes the size and starting addresses for the DTMF code 1501, the DTMF constants 1504 and the DTMF parameters 1507. A script 1 header table includes the size and starting addresses for the script 1 data 1511A, the script 1 code 1512A, and the script 1 DMA template 1513A. FB and Script Headers table 1525 in essence points to these blocks in the AP catalog 1500 including others such as the EC Code 1503, the EC constants 1506 and the EC Parameters 1509. The contents of FB and Script Header tables 1525 is updated whenever a new AP catalog 1500 is loaded or an existing AP catalog 1500 is updated in the global buffer memory 210.

The global buffer memory also has channel specific data segments consisting of dynamic data blocks 1515 and frame data buffers 1520. The dynamic data blocks 1515 illustrated in the exemplary map of FIG. 15 includes the dynamic data blocks for channels n (CHn) through channel p (CHp). The type of dynamic data blocks for each channel corresponds to the functional modules used in each channel. For example as illustrated in FIG. 15, channel n has EC dynamic data blocks, TD dynamic data blocks, DTMF dynamic data blocks, and G.7xxx codec dynamic data blocks. In FIG. 16, the dynamic data blocks required for channel 10 are ch10-DTMF, ch10-EC and ch10-TD, required for channel 102 are Ch102-EC and ch102-G.7xx, and required for channel 86 is Ch86-EC.

The frame data buffers 1520 include channel specific data segments for each channel for the far in data, far out data, near in data and near out data. The near in data and near out data are for the PSTN network side while the far in data and the far out data are for the packet network side. Note that n channels may be supported such that there may be n sets of channel specific dynamic data segments and n sets of channel specific frame buffer data segments. In FIG. 16, the channel specific frame data segments include ch10-Near In data, ch10-Near Out data, ch10-Far In data, ch10-Far Out data, ch102-Near In, ch102-Far In, ch102-Near Out and ch102-Far Out in the frame data buffers 1520. The channel specific data segments and the channel specific frame data segments allows the integrated telecommunications processor 150 to process a wide variety of communication channels having differing parameters at the same time.

The set of channel control structures 1530 in the global buffer memory 210 includes all information required to process the data for a particular channel. This information includes the channel endpoints (e.g. source and destination of TDM data, source and destination of packet data), a description of the processing required (e.g. Echo cancellation, VAD, DTMF, Tone detection, coding, decoding, etc, to use). It also contains pointers to locate the data resources required for processing (e.g. the script, the dynamic data blocks, the DMA descriptor list, the TDM (near in and near out) buffers, and the packet data (far in and far out) buffers). Statistics regarding the channel are also maintained in the channel control structure. This includes such things as the # of frames processed, the channel state (e.g. Call setup, fax/voice/data mode, etc), bad frames received, etc). In FIG. 16, the channel control structures include channel control structures for channel 10 and channel 102 each of which point to respective dynamic data blocks 1515 and frame data buffers 1520.

The DMA Descriptor lists 1535 in the global buffer memory 210 defines the source address, destination address, and size for every data transfer required between the Global buffer memory 210 and the program memory 204 and data memory 202 for processing the data of a specific channel. Thus, n sets of DMA descriptor lists exist for processing n channels. FIG. 15 illustrates the DMA descriptors list 1535 as including CHm DMA descriptors list through CHn DMA descriptors list. In FIG. 16, the DMA Descriptor Lists 1535 includes CH 10—DMA descriptors and CH 102—DMA descriptors.

The global buffer memory 210 further has a Channel Execution Queue 1540. The Channel Execution Queue 1540 schedules and monitors processing jobs for all the core processors 200 of the integrated telecommunications processor 150. For example, when a frame of data for a particular channel is ready to be processed, a "management function" creates or updates the DMA descriptor list for that channel based on the Script and block addresses found in the FB headers of the FBH table 1525 and/or channel control structure found in the script block 1530. The job is then scheduled for processing by the Channel Execution Queue 1540. The DMA descriptor list 1535 includes the transfer of the script itself from the global buffer memory 210 to the data memory 202 and program memory 204 of the core processor 200 that will process that job. Note that the core addresses are specified in such a way that they are applicable to ANY core which may process the job. The same DMA descriptor list may be used to transfer data to any one of the cores in the system. In this way, all necessary information to process a frame of data can be constructed ahead of time, and any core which may then become available can perform the processing.

Consider the scheduled job 1 in the session execution queue 1540 of FIG. 16, for example. Scheduled job 1 points to the Ch 10—DMA descriptors in the DMA Descriptor list 1535 for frame 40 of channel 10. The scheduled job n points to the Ch 102—DMA descriptors in the DMA Descriptor list 1535 to process frame 106 of channel 102.

The upper portion of the program memory 204C and data memory 202C illustrates an example of the program memory 204C including script code 1550, DTMF code 1551 for the DTMF generation and detection, and EC code 1552 for the echo cancellation module. The code stored in the program memory 204 varies depending upon the needs of a given communication channel. In one embodiment, the code stored in the program memory 204 is swapped each time a new communication channel is processed by each core processor 200. In another embodiment, only the code that needs to be swapped out, removed or added in the program memory 204 each time a new communication channel is processed by each core processor 200.

The lower portion of the program memory 204C and data memory 202C illustrates the data memory 202C which includes script data 1560, interfunctional block data area 1561, DTMF constants 1504, DTMF Parameters 1507, CHn DTMF dynamic data 1562, EC constants 1506, EC Parameters 1509, CHn EC dynamic data 1563, CHn Near In Frame Data 1564, CHn Near Out Frame Data 1566, CHn Far In Frame Data 1568, and CHn Far Out Frame Data 1570, and other information for additional functionality or additional functional telecommunications modules. These constants, variables, and parameters (i.e. data) stored in the data memory 202 varies depending upon the needs of a given communication channel. In one embodiment, the data stored in the data memory 202 is swapped each time a new communication channel is processed by each core processor 200. In another embodiment, only the data that needs to be swapped out, removed or added into the data memory 202 each time a new communication channel is processed by each core processor 200.

FIG. 15 illustrates the Register File 413 for the core processor 200A (core 0). The register file 413 includes a serial port address map for the serial port 206 of the integrated telecommunications processor 150, a host port address map for the host port 214 of the integrated telecommunications processor 150, core processor 200A interrupt registers including DMA pointer address, DMA starting address, DMA stop address, DMA suspend address, DMA resume address, DMA status register, and a software interrupt register, and a semaphore address register. Jobs in the channel execution queue 1540 load the DMA pointer in the file registers 412 of the core processor.

FIG. 17 is an exemplary time line diagram of processing frames of data. The integrated telecommunications processor processes multiple frames of multiple channels. The time required to process a frame of data for any particular channel is in most cases much shorter than the time interval to receive the next complete frame of data. The time line diagram of FIG. 17 illustrates two frames of data for a given channel, Frame X and Frame X+1, each requiring about twelve units of time to receive. The frame processing time is typically shorter and is illustrated in FIG. 17 for example as requiring two units each to process Frame X and Frame X+1. For the same channel it can be expected that the processing time for each frame is similar. Note that there is about ten units of delay time between the completion of processing of Frame X and the start of processing of Frame X+1. It would be an inefficient use of resources for a processor to sit idle during this delay time between received frames waiting for a new frame of data to be received in order to start processing.

To avoid inefficiencies, the integrated telecommunications processor 150 processes jobs for other channels and their respective frames of data instead of sitting idle between frames for one given channel. The integrated telecommunications processor 150 processes jobs which are completely channel and frame independent as opposed to processing one or more dedicated channels and their respective frames. Each frame of data for any given channel can be processed on any available core processor 200.

Referring now to FIG. 18, an exemplary time line diagram of how one or more core processors 200A–200N of the integrated telecommunications processor 150 processes jobs on frames of data for multiple communication channels. The arrows 1801A–1801E in FIG. 18 represent jobs or idle time for the core processor 1 200A. The arrows 1802A–1802D represent jobs or idle time for the core processor 2 200B. The arrows 1803A–1803E represent jobs or idle time for the core processor N 200N. Arrows 1801D and 1803C illustrated idle time for core processor 1 and core processor N respectively. Idle times occur for a core processor only when there is no data available for processing on any currently active channel. The Ch### nomenclature above the arrows refers to the channel identifier of the job that is being processed over that time period by a given core processor 200. The Fr### nomenclature above the arrows refers to the frame identifier for the respective channel of the job that is being processed over that time period by the given core processor 200.

The jobs, including a job description, are stored in the channel execution queue 1540 in the global buffer memory 210. In one embodiment of the invention, all channel specific information is stored in the Channel Control Structure, and all required information for processing the job is contained in the (channel independent) script code and script data, and the (channel dependent) DMA descriptor list which is constructed prior to scheduling the job. The job description stored in the channel execution queue, therefore, need only contain a pointer to the DMA descriptor list.

Core processor 200A, for example, processes job 1801A, job 1801B, job 1801C, waits during idle 1801D, and processes job 1801E. The arrow or job 1801A is a job which is performed by core processor 1 200A on the data of frame 10 of channel 5. The arrow or job 1801B is a job on the data of frame 2 of channel 40 by the core processor 1 200A. The arrow or job 1801C is a job on the data of frame 102 of channel 0 by the core processor 1 200A. The arrow or job 1801E is a job on the data of frame 11 of channel 87 by the core processor 1 200A. Note that core processor 1 200A is idle for a short period of time during arrow or idle 1801D and otherwise use to process multiple jobs.

Thus, FIG. 18 illustrates an example of how job processing of frames of multiple telecommunication channels can be distributed across multiple core processors 200 over time in one embodiment of the integrated telecommunications processor 150.

Because jobs are processed in this manner, the number of channels supportable by the integrated telecommunications processor 150 is scalable. The greater the number of core processors 200 available in the integrated telecommunications processor 150 the more channels that can be supported. The greater the processing power (speed) of each core processor 150, the greater the number of channels that can be supported. The processing power in each core processor 200 may be increased for example such as by faster hardware (faster transistors such as by narrower channel lengths) or improved software algorithms.

Network Echo Canceller

With the growing demands of next generation wireline, wireless and packet based networks, there is a compelling need of devices which could be placed in networks to remove echoes encountered in end to end telephone calls. The sources of echoes are the impedance mis-matches in the two wire to four wire conversions at the network hybrid and the multitude of delays which are encountered from end-to-end. In packet based networks these delays are a combination of hybrid delays, algorithmic delays of the codecs used in paths, packetization delays and transmission or the network delays. The severity of perceived echo increases as the delays in the echo path increase. Most next generation packet based networks require the support of a robust echo canceller which can support up to 128 milliseconds of echo tail lengths. These network echo cancellers are placed at an aggregation point where lots of different channels terminate. One of the biggest challenges is to provide a scalable architecture which supports the highest density of robust long tail echo canceller channels in the smallest silicon form factor and with the lowest power consumption. In this invention we provide a solution for a high density robust long-tail echo canceller which has attributes of scalability, low power per channel consumption and increased robustness under varying network conditions.

A significant amount of signal processing bandwidth is needed in a telephony processing system to eliminate the effects of potential echo signals. The integrated telecommunications processor architecture is exploited in implementing the MIPs intensive kernels of the echo canceller. The instruction set architecture provides inner loop optimization. The regular and the shadow DSP units of the each signal processing units 300 allows the FIR filter and LMS coefficient update to be implemented in such a way to speed processing on each channel.

The echo canceller algorithm itself provides for normalized LMS coefficient updating, error tracking that is responsive to different tap lengths, double talk control, near end talk control, far end talk control and a state machine for Non-Linear Processing, hangovers and kick-ins. The network echo canceller of the invention has two inputs and two outputs, as it has full duplex interfaces with both the telephone network and the packet network. The input and output signals of the network echo canceller are processed in a predetermined frame of data samples of length N. In one embodiment supporting G.711 channels (with no voice codecs), the frame size is generally 5 msec long or N=40 samples (8000 samples/sec).

Referring now to FIG. 19, a detailed block diagram of an embodiment of an echo canceller module 1103 and 1403 is illustrated. The echo canceller of the invention has the flexibility to deal with a wide variety of hybrids, different network delays and has a wide range of programmable parameters. The Echo Canceller of the invention meets G.168 objective test requirements and is equipped with all the control features necessary for operating under changing network conditions. In order to do so, the echo canceller 1103 and 1403 includes a subtractor 1940, a residual error suppressor 1942, a control block 1946, an N-Tap FIR filter 1947, and an N-Tap input delay line 1948.

As illustrated in FIG. 19, the output of the Voice Activity Detector 1401 and 1405 can be selected by a first switch 1943 as an input into the residual error suppressor (NLP) 1942 and can alternatively be selected by a second switch 1944 as the output Sout 1933. Depending upon the output signal from the Voice Activity Detector 1401 and 1405, the switches 1943–1944 direct the signal path either to the residual echo suppressor (NLP) 1942 or directly to the output Sout 1933. If the switches are set so that the signal couples into the residual echo suppressor (NLP) 1942, there is no significant near end speech energy from a near end talker and the content of the signal is just residual echo. This residual echo is suppressed in the residual echo suppressor (NLP) 1942 before sending it to Sout 1933. If the switches are set so that the residual echo suppressor (NLP) 1942 is bypassed, the Voice Activity Detector 1401 and 1405 determined that a near end talker was active generating near end speech energy and the output on Sout 1933 is unsuppressed speech. The output $S_{out}$ 1933 is coupled into the encoder 1109 to generate a packet payload for the packet network. The output from the subtractor 1940 is the residual echo error ($E_{RE}$) 1941 which is coupled into the Voice Activity Detector 1401 and 1405.

The N-tap FIR filter 1947 is an adaptive digital filter that updates it coefficients using a least means square algorithm. The finite impulse-response (FIR) filter 1947 performs linear echo estimation to predict the echo reflection from the Rin input. The FIR filter 1947 is adaptive in that the multiplier coefficients can be dynamically varied, and it operates as follows: (1) The FIR filter 1947 measures the residual echo coming out of the subtractor attached to the FIR; (2) the FIR filter 1947 rapidly adapts and converges the estimated echo coefficients to values that drive the 'Least-Mean-Square' (LMS) differences towards zero (The LMS is a measure of residual echo energy); and (3) after the FIR filter 1947 converges the coefficient values, the FIR filter continues adaptive filtering as long as the far-end person is speaking. The LMS block may need to do up to 1024 vector-dot products (using 16-bit coefficients and 16 bits of data) on every sample. A 1024-element filter can introduce an algorithmic delay of 1024 samples (about 125 ms). In this case, the computational delay is very low because this computationally extensive process takes advantage of each of the core processors 200 Single-Instruction Multiple-Data (SIMD) ability to perform up to 8 multiplies at a time.

FIR filter coefficients dynamically adapt properly when the near-end person is not speaking. That is, typically far-end speech and its hybrid echo are the signals present in the system. The echo from the 2-wire/4-wire hybrid, as well as any electrical and acoustical echoes from the handset, arrives at Sin some time after Rin. This time period is referred to as the tail length. This is a vital parameter in setting up an echo canceller that should be carefully measured. In addition, the tail length can vary over time, particularly when newer digital wireless telephones are used.

The N-tap Input Delay Line 1948 attempts to model the delay due to the hybrid 804 and possibly other delays in the network. The number of taps selected in the delay line 1948 varies the amount of delay being modeled. The delay line keeps a history of what is being sent to better match the delayed potential echo signal. Additionally, the N-tap Delay line 1948 samples the input Rin 1937 and allows samples to be variably selected for the dot product of the N-tap FIR filter 1947. The N-tap delay line 1948 provides a sliding window over the series of data samples on Rin 1937.

The N-tap FIR filtering and the coefficient updating by the N-tap FIR filter 1947 requires many calculations of the following output equation and coefficient equation:

$$\text{Output }[i] = \sum_{j=0}^{N-1} Coef\,[j] * \text{Input}[j]$$

Coef[i]=Input[i]*(u*Error)+Coef[i]

These calculations are particularly instruction intensive because where they are located in the software code, inside a nested double loop which is executed in the double loop over the number of data samples in a frame and the tap size "N" of the filter tap. The computation of the FIR output equation with N-taps requires N MAC instructions. The computation of the coefficient equation requires N MAC instructions for them to be updated as well. The number of MAC instructions required to run an N-tap adaptive filter with updated coefficients for every new sample is (N+N). The coefficients are updated based on the residual echo error 1941 and also the biasing constant u.

In the architecture of the integrated telecommunications processor 150, each core processor 200 processes a communication channel. Within each core processor 200 are four signal processors 300A–300D in one embodiment. Each of the four signal processors 300A–300D has (in addition to the regular DSP units) a shadow signal processor such that eight MAC instructions can be performed in the same processor cycle by each core processor 200. The echo canceller of the integrated telecommunications process fully utilizes the four signal processors with their respective four regular and four shadow signal processing units in the implementation of the N-tap FIR filter with LMS coefficient update. In this manner, each of the core processors 200 in the integrated telecommunications processor can achieve a MIPS performance of eight times that of a signal processor containing only one DSP unit 300.

The integrated telecommunications processor 150 can perform the LMS & FIR equations for output and coefficient updates using fewer instruction cycles. In one embodiment there are four signal processors 300 which require $$\frac{N}{4}$$

N instruction cycles because the coefficients updates are done four at a time in the main DSP (MAC using multiplier 504A, adder 510A and accumulator 512) and the FIR filtering using the output equation is done four at a time in the shadow DSP (MAC using the output from accumulator 512, the multiplier 504B, adder 510C), all in parallel. Thus in one instruction cycle the following equations can be completed in parallel:

For i=1 to Tap Size in steps of 4

Coef[i]=Input[i]*(u* Error)+Coef[i]

Coef[i+1]=Input[i+1]*(u*Error)+Coef[i+1]

Coef[i+2]=Input[i+2]*(u*Error)+Coef[i+2]

Coef[i+3]=Input[i+3]*(u*Error)+Coef[i+3]

Output[i]+=Coef[i]*Input[i]

Output[i+1]+=Coef[i+1]*Input[i+1]

Output[i+2]+=Coef[i+2]*Input[i+2]

Output[i+3]+=Coef[i+3]*Input[i+3]

The += indicates a multiply and accumulation of values to form a dot product of the input samples and the filter coefficients. As the updated coefficients are being calculated, they are also used in the parallel FIR calculations of the Output equations above.

The Error value, "Error", used in the Echo Canceller's LMS update is scaled by the factor "u" or "Mu" that is based on the power level of the Far End In signal on Rin 1937. Since the power level between a speech signal and silence fluctuates during normal conversation, it is vital that this error-scaling factor, u or Mu, does not increase too rapidly causing the coefficients to divert.

The value of the error-scaling factor, u or Mu, has an inverse relation with the input signal. When a signal changes abruptly, such as when speech ends and silence begins, the error-scaling factor, u or Mu, normally jumps up. This sudden increase in the error-scaling factor can easily cause the adaptive filter coefficients to diverge. The invention provides an algorithm so that the value of the error-scaling factor is kept at the past scaling value until a hang over timer expires. After the hang-over time expires, then the value of the error-scaling factor is only allowed to increase by a fixed amount. This keeps the value of the error-scaling factor from spiking up when speech ends and silence begins. It also keeps the scaling factor from changing during short silence periods in normal speech. In the opposite case when speech begins after a period of silence, the error-scaling factor is immediately updated based on the new speech signal without any hang over time. This also ensures that the error-scaling factor, which is high during the silence, does not boost up the error too much when a speech signal appears.

Referring now to FIG. 20, a flow chart of the method of determining the error-scaling factor, u or Mu, is illustrated. At step 2050, the error scaling factor is calculated based upon the current signal level. This is determined by computing the RMS value of the signal on Rin 1937 and using its value as an index into a lookup table of values for the error-scaling factor. After determining a current error scaling factor based on the current level on Rin 1937, the control logic then jumps to step 2052. At step 2052, a determination is made as to whether the current error-scaling factor is greater than the prior error-scaling factor. If the current error-scaling factor is not greater than the prior scaling factor the control logic jumps to step 2054. At step 2054, the prior error-scaling factor is updated to the current error-scaling factor and the current error-scaling factor is used to update the coefficients and perform the finite impulse response filtering. If at step 2052 the current calculated scaling factor is greater than the prior scaling factor, the control logic jumps to step 2056. At step 2056, a determination is made whether the hangover timer has expired. The hangover timer is a running count which is set to a given threshold when the current scaling factor was less than the prior error scaling factor. Each time the current error scaling factor is greater than the prior error scaling factor, this hangover timer is decremented. Once this timer goes to zero, only then do we update the error scaling factor to a new value. If at step 2056 it has been determined that the hang over timer has expired, the control logic jumps to step 2054 which was previously described. If at step 2056 it is determined that the hangover timer has not expired, the control logic jumps to step 2058. At step 2058, the hangover timer is decremented and the control logic jumps to step 2059. At step 2059, the prior scaling factor is used again in calculating the updated coefficients for the FIR filter.

Referring back to FIG. 19, if a person on the far side is not talking, then any input signal $R_{in}$ could very likely be an echo of the voice signal from a person talking on the near side. However, the Echo cancellation must work in the presence of various levels of near-end and far-end background noise. The widespread use of mobile telephony has greatly increased the possibility of high levels of background noise. The echo canceller must not be confused into interpreting background noise as either near-end speech or as the echo that it is trying to cancel. Thus, control of the echo cancellation module 1103 and 1403 is important.

The echo cancellation module 1103 and 1403 includes a control block 1946 to control the echo cancellation process. The control block 1946 includes a far energy detector, a near end energy detector, a double talk detector, a non-linear process (NLP) detector, an automatic level control/comfort noise generator (ALC/CNG) detector, and coefficient update control.

The double-talk detector senses background-noise levels while looking for the presence of near-end speech. The NLP detector senses far-end background noise level while trying to eliminate residual echo. For these reasons, both a Far-End Energy Detector and a Near-End Energy Detector are needed in the control loop. The dynamic range between Near-End and Far-End energy levels is determined by the far-end energy detector and the near end energy level detector.

The control block 1946 of the echo canceller 1103 and 1403 receives Sin 1931, Rin 1937 and the residual echo error ($E_{RE}$) 1941 to generate the control signals to control the echo canceller. The control block generates the selective coefficient update control signal 1950 to control the updating of coefficients as well as the scaling of the residual echo error ($E_{RE}$) 1941, enablement of the residual error suppressor (NLP) 1942 and the switch 1944.

The far end energy detector of the control block 1946 computes the Far End Energy on a continuous basis. This is used in the further control of Echo Canceller. There is a programmable threshold and a programmable hangover related to the far-end energy detector. The far-end energy detector continually computes far-end energy to improve the echo canceller performance. The echo canceller uses the measurements of near-end energy and far-end energy to react to variations and differences in speech and background noise levels between the send and receive paths.

The Near End Energy Detector of the control block 1946 computes the Near End Energy on a continuous basis. This is also further used to control the Echo Canceller. There is a programmable threshold and a programmable Hang Over related to the near end energy detector. The near-end energy detector continually computes near-end energy to improve the echo canceller performance. Built-in Automatic Level Control (ALC) algorithms use this information. The presence and variation of background-noise energy affects the generation of comfort noise at the far end through SID signaling mechanisms.

The threshold Near-End energy at which a 'double-talk' condition is declared is programmable. It is currently at −3 dB ('double talk' is presumed if NearEnd Signal is 3 dB below FarEnd Signal Level) but may be changed using messaging. FIGS. 27–40 illustrate the messages used to setup, configure, obtain status, and perform other control or obtain other information about the echo canceller module. Similar to the far-end energy detector, the near-end energy detector has a programmable threshold and a programmable hangover. The echo canceller uses the near-end and far-end energy detectors to react to variations and differences in speech and background noise levels between the send and receive paths of the near end.

The Double Talk Detector of the control block 1946 detects the presence of Double Talk in the Echo Canceller circuit. A 'double-talk' condition occurs whenever a near-end person talks at the same time as a far-end person. When double-talk occurs, the $S_{in}$ signal (whose peak value is also available via VSMP messages in 16b format) will have the echo from the hybrid riding on top of the near-end person's speech. If nothing is done to combat double talk, the FIR filter 1947 will be given an erroneous estimate of residual error Ere 1941 and will thus start to diverge. In order to prevent this from happening, a double-talk detector is used to detect near-end signals. The double talk detector determines whether the near-end person is speaking to generate double talk.

Whenever a double-talk condition is detected, the FIR filter is inhibited from adapting its coefficients and just maintains the current values. In presence of double talk, the double talk detector suppresses the updating of LMS coefficients within the FIR filter 1947. That is, the Coefficient update is shut off. The double talk logic operates based on several thresholds and ensures a good performance in presence of noise and changing Far End and Near End levels. To correct for this condition, the control block 1946 of the echo canceller 1103 and 1403 has a double-talk detector (also referred to as a near-end speech detector).

Correction for a double-talk condition works as follows:
1. The Sin signal (whose peak value is also available through VSMP messages in 16-bit format) has an echo from the hybrid riding on top of the near-end person's speech.
2. The FIR filter is given an erroneous estimate of residual error and starts to diverge.
3. To prevent this divergence, the double-talk detector is used to detect near-end signals.
4. If a double-talk condition detected, the following occurs:
    a. The FIR filter is inhibited from adapting its coefficients and just maintains the current values.
    b. If the double-talk detector determines the near-end person is speaking, the double-talk detector suppresses the updating of LMS coefficients within the FIR filter.

The double-talk logic operates based on several thresholds and ensures good performance in the presence of background noise and changing far-end and near-end levels. The presence of double-talk also suppresses the adaptation of the thresholds used by the NLP. The FIR filter contains control circuitry to send double-talk detection information on to both the Non-Linear Processor Threshold Detector and the comfort noise generator (CNG). This comfort noise generator is included within the Non-Linear Processor Unit (not shown if FIG. 19). Whenever Non-Linear Processing is in its active stage, the comfort noise generator generates a signal to regenerate the background noise level. The idea here is not to suddenly go to total silence mode once Non-Linear Processing is active (that is, when the send path is suppressed). The presence of such Comfort Noise Generation in conjunction with the Non-Linear Processing gives an overall perceptually pleasing effect.

Ideally, the result of the subtraction (of computed echo from actual echo) removes all echoes. However, there are a number of limitations. The most serious limitations are the non-linear echoes, which come from a number of sources including acoustical echoes from the near-end handset, voice compression, the use of adaptive differential pulse code modulation (PCM), clipping of speech, and variations in the tail length caused by digital telephone-switching equipment. In addition, the maximum amount of linear echo cancellation is limited to 35 dB or less because of the non-linear companding done during A-law or $\mu$-Law PCM compression. Therefore, there is often significant echo left after the linear portion of the echo calculated by the FIR is removed by the subtractor 1940.

The invention provides a residual error suppressor 1942, which is a Non-Linear Processor (NLP), located in the send path between the output of the subtractor 1940 and the send-out port, Sout' 1943 of the echo canceller 1103 and 1403. The residual error suppressor (NLP) 1942 acts as a 'center clipper' in that it removes all signal energy below a given threshold. The residual error suppressor (NLP) 1942 blocks low-level signals and passes high-level signals. Its function is to reduce the residual echo level that remains after imperfect cancellation of the circuit echo to achieve the necessary low returned echo level. While it can effectively remove all remaining echo, it cannot do so blindly. The residual error suppressor (NLP) 1942 uses a complex algorithm that can adapt to numerous circumstances. The algorithm is described below with reference to FIG. 24A and 24B. The control block 1946 has built in decision logic which controls the operation of residual error suppressor (NLP) 1942 under changing Far End and Near End Signal Levels. The output of the residual error suppressor (NLP) 1942 is Sout' 1943 (whose peak value is also available through VSMP messages in 16-bit format). The residual error suppressor (NLP) 1942 operates closely with the Comfort Noise Generator to mitigate the effects of transitions between active and inactive states of Non-Linear Processing. NLP functionality can be controlled externally.

As illustrated in FIG. 19, the Control Block 1946 couples to the residual error suppressor (NLP) 1942. The Control Block 1946 has built-in decision logic to control the operation of the residual error suppressor (NLP) 1942 under changing far-end signal levels on Rin 1930 and near-end signal levels on Sin 1931. The control output coupled into the residual error suppressor (NLP) 1942 has information about both the residual echo error Ere 1941 as well as whether or not the double-talk detector has determined the condition that the near-end person is also speaking to generate a signal on Sin 1931. If a near-end person is also speaking to generate a signal on Sin 1931, the residual error suppressor (NLP) 1942 must immediately lower the clipping threshold or otherwise the first part of the near-end speaker's first syllable can be clipped. The residual error suppressor (NLP) 1942 is itself an adaptive filter, changing the clipping threshold according to the amount of residual echo 1941. In one embodiment, the state machine control of the residual error suppressor (NLP) 1942 follows the recommendation of G.168 2000 spec. In this embodiment the residual error suppressor (NLP) 1942 is switched off within 2 milliseconds of onset of double talk. All the hangovers in NLP on-off transitions are programmable. Transition from NLP OFF to ON is done within 50 milliseconds (when Near End Signal is dying off).

To alleviate the effects of the residual error suppressor (NLP) 1942 switching in and out as heard by the far end talkers when they stop talking, its desirable to have a comfort noise generator at the Send Port of the Echo Canceller. The invention's implementation utilizes the Near End Noise level to insert an appropriate level of Noise at the Send Out Port when residual error suppressor (NLP) 1942 is ON. The Comfort Noise Generation (CNG) can be controlled externally by a user.

The updating of coefficients for the N-tap FIR filter is selective by the selective coefficient update control 1950 from the control block 1946. The echo canceller 1103 and 1403 allows external control of this signal by a user in order to selectively disable and enable the training of echo-canceller through the updates in the coefficients. This control is useful for diagnostics and to test the echo canceller 1103 and 1403. A user need only set or clear a coefficient update flag to control whether or not coefficients are updated.

The invention also allows selective muting of the near-end output Rout 1935 and the far-end output Sout' 1943 by external control. Referring to FIG. 19I, the parameters MuteRin and MuteSout can be respectively set or cleared. If Rin is muted the Rout signal is muted as well after a slight delay through the N-tap input delay line 1948.

The invention also provides optional gain control at the Far End Signal Sout' 1943 which is selectively turned on or off to increase the overall cancellation and convergence performance for a varied range of Input Levels on Sin 1931.

The invention also provides an automatic level control (ALC) 1405 on the send out port Sout 1933 when signals other than voice or speech are being processed. The switch 1944 is used to select between voice with echoes cancellation on Sout' 1943 and the output from the VAD and ALC 1401 and 1405. The ALC 1405 is provided to maintain signals on Sout 1933 at constant levels or minimum levels. Care is taken to turn OFF automatic level control in the presence of voice. Separate programmable decay and gain factors are provided to maintain perceptually pleasing overall output speech quality. The ALC 1405 functions in conjunction with the voice activity detector (VAD) 1401 in order to turn OFF in the presence of voice or speech and turn ON when signals other than voice or speech are being processed.

The subtractor 1940 is a digital adder which performs subtraction of the estimated echo Fout 1949 computed by the N-tap FIR filter 1947 from the Sin signal 1931. The output of the subtractor, Ere 1941, is coupled back to the FIR 1947 through the control block 1946 as a measure of the residual echo so the LMS coefficients can be recalculated and is then coupled into the residual error suppressor (NLP) 1942.

The Echo Canceller modules 1103 and 1403 function in parallel with the in-band Tone Detector 1404. As described herein, the Tone Detector 1404 detects the presence of several tones, including the 2100 Hz tone with phase reversal which is necessary for correct operation of a V-series modem. Once the 2100 Hz tone is detected, the Echo Canceller is temporarily disabled. Similar action is taken when Facsimile tones are detected. The presence of a narrowband signal can also detected and control action taken within the Echo Canceller.

Referring now to FIG. 21, a flowchart of the processing steps of the echo canceller 1103 and 1403 is illustrated. At step 2102, the energy of the signals input into the echo canceller on $S_{in}$ 1931 and $R_{in}$ 1937 is calculated. At step 2104 the determination is made on the echo canceller disable tone state whether it is encompassed in the $S_{in}$ 1931. At step 2106, determination whether the echo cancel disable flag has been set or cleared. If the echo cancel disable flag has been set, the echo cancellation process is bypassed and the process jumps to step 2103 and exits. If the echo canceled disable flag is cleared the process jumps to 2108. At step 2108 signals on the $R_{in}$ 1937 are processed. Next at step 2110, signals on $S_{in}$ 1931 are processed. After processing signals $S_{in}$ and $R_{in}$, double talk processing can begin at step 2112. Double talk is where both sides are trying to talk at the same time. After the double talk processing, a decision is made whether or not the coefficient update flag will be set for this particular frame or not. This is done in the Coefficient Update Logic Block 2114. After the coefficient Update Logic Block generates the state of the coefficient update flag, the least means squared (LMS)/finite impulse response filtering of the signals occurs at step 2116. At step 2116, the coefficients of the FIR are updated depending upon whether or not the Coefficient Update Flag was set at step 2114. After a determination of the coefficients, the Finite Impulse Response filter at Step 2116 filters the FarEnd Signal with the Filter to generate a Filtered Output. At step 2118, the LMS Mu State is determined. Step 2118 determines the step size (Mu or u) Parameter which would be used in the next frame coefficient update in LMS to scale the residual error 1941. In addition to determining the actual Mu value, this step also determines one of the three states that a Mu State parameter can take. After determining the mu state, step 2120 is executed where the double talk decision state (DTDS) logic makes a determination whether double talk is present in the given frame. Jumping to step 2122, energy calculation is performed on the $S_{out}$ prime ($S_{out}'$) 1943. Next at step 2124, a determination is made whether nonlinear processing (NLP) is needed or not for various conditions of data within the given frame. At step 2124, a complex state machine uses various parameters and state information from different portions of the overall Echo Canceller Algorithm to determine the NLP state for the frame that is being processed. After determining the nonlinear processing state at step 2124, a determination is made at step 2126 to determine if the NLP flag has been set or cleared. If the NLP flag is cleared the process jumps to step 2130 and exits. If at step 2126 it has been determined that the NLP flag has been set, residual error suppression takes place and a comfort noise is generated at step 2128 by the residual error suppressor 1942. After completing the NLP suppression 2128 the process jumps to step 2130 and exits for this given frame. The steps 2102 through 2130 are repeated on a frame-by-frame basis even though data samples maybe processed on a continual basis.

Referring now to FIG. 22A, a block diagram of the LMS mu state processing algorithm of step 2118 in the echo canceller processing is illustrated. The mu state logic 2200 generates the coefficient convergence information in block 2202, receives the double talk hangover information 2206 from the double talk processing step 2112 and information concerning loss of the echo path from loss of echo path logic 2208.

Referring now to FIG. 22B, a detail block diagram of the LMS mu state processing algorithm of step 2118 is illustrated. The double talk hangover logic 2206 generates a double talk hangover value DTHO. The loss of echo path logic 2208 generates a $NoS_{in}$ Counter value. The coefficient convergence logic 2202 generates an initial convergence counter value for the given frame which is loaded into the convergence counter 2210 of the mu state logic 2200.

The loss of echo path logic 2208 includes the $NoS_{in}$ counter 2211. In order for it to generate the count value within the $NoS_{in}$ counter 2211, the loss of echo path logic 2208 proceeds through steps 2212 though 2219 illustrated in FIG. 22B. In step 2212, a determination is made whether the energy $S_{in}$, the root means squared of $S_{in}$, is less than a threshold energy value. If it is determined that it is not, then at step 2214 the $NoS_{in}$ counter is reset typically to a zero value. If the RMS energy of $S_{in}$ is greater than the threshold energy, then at step 2216 a determination is made on the values of the root means squared $R_{in}$ 1937 and the root means squared value of $S_{out}$ prime 1943. In step 2216, if the RMS value of $R_{in}$ is greater than the threshold energy value and the root means squared value of $S_{out}$ is less than −40 dBm, than step 2219 is performed. At step 2219, the $NoS_{in}$ counter is incremented. If at step 2216, either the root means squared values of $R_{in}$ is less than the threshold energy or the root means squared value of $S_{out}$ is greater than −40 dBm, then step 2218 is executed and no change to the $NoS_{in}$ counter value is made in this case.

The coefficient convergence logic 2202 performs steps 2220 through 2229. At step 2220 the adaptive FIR coefficients are calculated. Then at step 2222, the means squared value of the adaptive FIR coefficients is taken to generate a normalized value 2223. At step 2224, a determination is made if the coefficient update flag is set or cleared. The coefficient update flag is generated by the coefficient update logic in step 2114 of FIG. 21. At step 2224, if it is determined that the coefficient update flag is set, step 2225 is executed. If the coefficient flag is not set but cleared, step 2229 is executed. At step 2229, the calculated normalization value 2223 is stored into a normalization value prime for future use. At step 2225, a determination is made as to whether the absolute value of the stored normalization prime value minus the calculated normalization value 2223 is less than a threshold value. If so, step 2227 is executed where the convergence counter 2210 is incremented. If not, step 2228 is executed and the convergence counter 2210 is decremented and then step 2229 is executed. In this manner, the convergence counter value is obtained for processing by the mu state logic 2200. By incrementing the convergence counter in this way, it is ensured that there is a steady state condition where the Norm of the Coefficients from frame to frame is not changing much. The Convergence Counter serves to act as a hangover for such a transition thus eliminating some spurious transitions where the Norm of coefficients may have remained constant just for one or two frames and we may have declared a condition that we have reached a steady state. Once the Convergence Counter is above a certain threshold, we would want to make the Mu (the step size) value small since we would be anticipating small changes in external conditions. A smaller step size means we would not be changing the Coefficients by a lot in the LMS step 2116. The steps 2234–2242 performed using the convergence counter value from the convergence counter 2210 implement the smaller step size.

With values from the double talk hangover logic 2206, loss of echo path logic 2208 and from the coefficient convergence logic 2202, the mu state logic 2200 can be evaluated. At step 2230, a determination is made whether the double talk hangover value DTHO is greater than a threshold. If so, step 2231 is executed where the LmsMuFactor is set to a high value. If not, step 2232 is executed where a determination is made as to if the $NoS_{in}$ counter value is greater than a threshold value. If the $NoS_{in}$ counter value is greater than a threshold value, then step 2233 is executed. At step 2233, the $NoS_{in}$ counter value is set to zero, mu state is set to zero, convergence counter is set to zero, $S_{in}$ hangover is set to zero and the LmsMu factor is set to a higher value. If the $NoS_{in}$ counter value is not greater than a threshold value, then the convergence counter value generated by the coefficient convergence logic 2202 is processed over steps 2234–2242 by the mu-state logic 2200. If either of the decisions made in steps 2230 or 2232 is "YES", the steps 2234–2242 are overridden and the results 2238, 2239, 2241, and 2242 do not occur. If the decision is "NO" at step 2232, this is an indication that now we start processing the mu-state decision based on the Convergence Counter value generated by the coefficient convergence logic 2202. At step 2234, the value of the convergence counter is limited to a range of values. At step 2236, a determination is made whether the limited range of the counter value of the convergence counter is greater than a first Mu state threshold value. If so, step 2240 is executed. If not, step 2237 is executed. At step 2237 determination is made whether the convergence count value is less than a divergence threshold. If the convergence counter value is less than the divergence threshold, step 2239 is executed where the mu state value is set to zero and the LMS mu factor is set to a higher value. If not step 2238 is executed and no change in state occurs for the mu state. At step 2240 with the convergence counter value greater than first mu state threshold, a determination is made whether the same convergence value is greater than a second mu state threshold. If so step 2241 is executed where the mu state value is set to two and the LMS mu factor is set to a low value. If the convergence counter value is less than or equal to second mu state threshold, step 2241 is executed where the mu state is set to one.

Referring now to FIG. 23, a flow chart of the steps of the DoubleTalk decision state logic 2120 is illustrated. The DoubleTalk decision state logic 2120 operates over a frame of data (typically a length of 40 samples to 80 samples or approximately 5 milliseconds to 10 milliseconds of speech). In order to determine if DoubleTalk is present, the DoubleTalk decision state logic receives far end speech $R_{in}$ 1937, a frame of the estimated echo $F_{out}$ 1949, and a frame of the near end speech plus the echo $S_{in}$ 1931. At step 2301, the difference between $S_{in}$ 1931 and $F_{out}$ 1949 is determined in order to generate the error output $E_{RE}$ 1941. At step 2302 the mean square of $R_{in}$ 1937 is determined. At step 2303, the means squared of the estimated echo $F_{out}$ 1949 is determined. At step 2304 the means squared of the error $S_{out}$ 1943 is determined. At step 2305 the means squared of $R_{in}$ and the means squared of $F_{out}$ are added together and squared to determine the value for D. At step 2306, the mean squared of $R_{in}$ and the means squared of the error signal $S_{out}$ are multiplied together to generate the value for C. At step 2308, a determination is made as to whether the value of C divided by D is greater than one-fourth and if the mu state is set to two. If the determination in 2308 is yes (mu state is set to two and C/D is greater than one-fourth), then the given frame being processed has DoubleTalk. If not, the given frame does not have DoubleTalk.

Referring now to FIGS. 24A and 24B, a flowchart for the nonlinear processing state 2124 is illustrated. The nonlinear processing (NLP) state logic 2124 executes steps 2401 through 2438. At step 2401, a determination is made as to whether the NLP flag is cleared or set (i.e., NLP state set to zero or one). If the NLP flag is cleared (i.e., NLP state set to zero), step 2402 is executed, otherwise the process jumps to step 2426. FIG. 24A illustrates the flowchart of steps 2402–2424 for the NLP state logic with the NLP state set to zero. FIG. 24B illustrates the flowchart of steps 2426–2438 for the NLP state logic when the NLP state is equal to one.

Referring to FIG. 24A, if the NLP flag is cleared then step 2402 is executed where a determination is made on the far end previous flag. Far end previous flag is the Far end flag for the previous frame that was processed by the Far End Processing (Rin) 2108. As the processing changes from one frame to the next, the Far end previous flag is updated. If it is determined that the far end previous flag is cleared at step 2402, the process jumps to step 2404. If it is determined that the far end previous flag is set at step 2402, the process jumps to step 2416. At step 2404 a determination is made if the far end flag is cleared or not. If the far end flag is cleared, the process steps of the nonlinear programming state logic 2124 are completed for this frame and it returns to process the next frame. If it is determined that the far end flag is set at step 2404, then the process jumps to step 2406. At step 2406, a determination is made if the DoubleTalk flag is set indicating DoubleTalk occurred during the given frame. If so, step 2408 is executed where the HangoverNLP_1 is set to the constant HNG_OVER_NLP_1 constant and the process returns in order to process the next frame. If the DoubleTalk flag is not set, then step 2410 is executed where a determination is made on whether the HangoverNLP_1 flag is greater than zero. If not, step 2412 is executed where the HangOver_NLP_1 value is set to the HNG_OVER NLP_1 constant, the far end previous flag is set to one and the NLP state flag is set to one and the process returns to process the next frame. If it is determined that the HangOver NLP_1 is greater than zero at step 2410, then step 2414 is executed where HangOver NLP_1 value is set equal to the prior HangOver NLP_1 value less a frame length. After step 2414, the process returns to start processing the next frame.

If at step 2402 it is determined that the far end previous flag is not cleared, then step 2416 is executed where a determination is made whether double talk has occurred by checking the double talk flag or state. If the double talk flag is set at step 2416, then step 2418 is executed where the HangOver NLP_4 value is set equal to the HNG_OVER NLP_4 constant and the process returns to process the next frame. If no double talk is present at step 2416, then step 2420 is executed where a determination is made whether or not the HangOver_NLP_4 value is greater than zero. If the HangOver NLP_4 value is greater than zero, then step 2422 is executed where the HangOver_NLP_4 value is set equal to the present HangOver NLP_4 value minus the frame length and then processing returns to process the next frame. If the HangOver NLP_4 value is less than or equal to zero, step 2424 is executed where the HangOver_NLP_4 value is set equal to the HNG OVER_NLP_4 constant; and if the far end flag is set to one, then the far end Previous flag is set equal to one; the NLP state is set to one and finally the process returns to start processing the next frame. The HangOver NLP_1 value, HangOver NLP_2 value and HangOver NLP_4 value are the respective HangOver for the states of the NLP logic which are modified from frame to frame. HNG_OVERNLP_1, HNG_OVERNLP_2 and HNG_OVERNLP_4 are constants. Double talk, FarEnd previous, NLP state, FarEnd, NearEnd and residual are state variables which change from frame to frame.

Referring now to FIG. 24B, if the NLP flag is set then step 2426 is executed where a determination is made whether there is DoubleTalk or not by analyzing the DoubleTalk flag. If the double talk flag is set, then step 2438 is executed. If the DoubleTalk flag is not set, then step 2428 is executed. At Step 2428, a logical determination is made as to whether the NearEnd flag and not the FarEnd flag and not the residual flag is a logical one. That is, if the NearEnd flag is set and the FarEnd flag and the residual flag are both cleared, then step 2432 is executed. If not, then step 2430 is executed. At step 2430, the HangOver NLP_2 value is set to the HNG_OVER NLP_2 constant and the process returns to process the next frame. At step 2432, a determination is made as to whether the HangOver NLP_2 value is greater than zero. If the HangOver NLP_2 value is less than or equal to zero, then step 2434 is executed where the HangOver NLP_2 value is set to the HNG_OVER NLP_2 constant, the Far End previous flag is cleared, and the NLP state is cleared and the process returns to the beginning to process the next frame of data. If the HangOver NLP_2 is greater than zero, step 2436 is executed where the HangOver NLP_2 value is set to be the HangOver NLP_2 value minus the frame length, and the process returns to process the next frame. When it is determined that DoubleTalk is present at step 2426, then step 2438 is performed where the Far End previous flag is set to one and the NLP state is set to one and the process returns to the beginning to process the next frame of data.

Referring now to FIG. 25, a flowchart of the FarEnd processing for the echo canceller is illustrated. Steps 2501 through 2520 are executed for the far end $R_{in}$ 2108 processing of every frame. At step 2501, a determination is made where the ShortFarEnd Flag is cleared or not. If ShortFarEnd Flag is not cleared, i.e. it is set, step 2502 is executed. If ShortFarEnd Flag is cleared, i.e. it is not set, step 2504 is executed. At step 2504, the FarEnd flag is cleared and FarEnd processing is completed and the echo canceller jumps to start the NearEnd processing 2110.

At step 2502, a variable maxFarEndinRMS is determined by selecting the maximum, out of all frame values, of the RMS value of the FarEnd in signal 1937. Step 2506 is executed after step 2502 where a determination is made as to whether the FarEnd RMS value is greater than a FarEnd threshold. If the FarEnd RMS value is not greater than a FarEnd threshold step 2508 is executed. If the FarEnd RMS value is greater than a FarEnd threshold, then step 2510 is executed.

At step 2508 a determination is made as to whether or not the FarEnd flag is cleared. If the FarEnd flag is cleared, then processing is completed and the echo canceller goes on to the steps for the NearEnd processing 2110.

If it is determined that the FarEnd flag is not clear (i.e. it is set) in step 2508, then step 2512 is executed where the value for the FarEnd HangOver is set equal to the prior FarEnd HangOver value minus the frame length. Then step 2514 is executed where a determination is made whether the FarEnd HangOver value is less than or equal to zero. If the FarEnd HangOver value is greater than zero, then step 2518 is executed. If the FarEnd HangOver value is less than or equal to zero, then step 2516 is executed where the FarEnd flag is cleared, the FarEnd HangOver value is cleared, and the process goes to the NearEnd processing 2110.

If at step 2506 it was determined that the maxFarEnd RMS is greater than the FarEnd threshold, step 2510 is executed wherein the FarEnd flag is set and the FarEnd HangOver value is set to the HangOver time constant. After step 2510, the process then jumps to step 2518.

At step 2518 a determination is made as to whether or not the maximum FarEnd RMS value is greater than the FarEnd peak value. If the maximum FarEnd RMS value is greater than the FarEnd peak value, then step 2520 is executed. At step 2520, the FarEnd peak value is set equal to the maximum FarEndinRMS value and the process jumps to the NearEnd processing 2110.

If it is determined that the maximum FarEnd RMS value is not greater than the FarEnd peak value in step 2518, then the process of FarEnd echo canceling is completed and the process jumps to the NearEnd processing 2110.

Referring now to FIG. 26, a flowchart of the steps of the NearEnd processing 2110 of the echo canceller is illustrated. Steps 2601 through 2616 are executed on every frame of the NearEnd signal Sin 1931. At step 2601, a calculation of the maximum NearEnd input RMS value (i.e., maxNearEndinRMS value) is determined. The maxNearEndinRMS value is determined by selecting the maximum RMS value, out of all frame values of the RMS value of the NearEndin signal Sin 1931. After determining the maxNearEndinRMS value in step 2601, then step 2602 is processed.

At step 2602, a determination is made as to whether or not the maximum NearEnd input RMS (i.e., maxNearEndinRMS value) is greater than a NearEnd threshold value. If maxNearEndinRMS value is not greater than a NearEnd threshold value, step 2604 is executed. If the maxNearEndinRMS value is greater than a NearEnd threshold value, step 2606 is executed.

At step 2604 a determination is made whether the NearEnd flag is cleared or not. If the NearEnd flag is cleared, then the NearEnd processing is completed and the echo canceller process goes to the DoubleTalk processing 2112. If the NearEnd flag is not set, then step 2608 is executed.

At step 2608, the NearEnd HangOver value is set equal to the prior NearEnd HangOver value minus the frame length. After step 2608 is performed, step 2610 is executed. At step 2610 a determination is made whether the NearEnd HangOver value just computed is less than or equal to zero. If the NearEnd HangOver value is greater than zero, the process jumps to process step 2614. If the NearEnd HangOver value is less than or equal to zero, then the process jumps to step 2612. At step 2612, the NearEnd flag is cleared, the NearEnd HangOver value is set to zero, the NearEnd processing is completed, and the process jumps to the DoubleTalk processing 2112.

At step 2602, if it is determined that the maximum NearEnd RMS value is greater than the NearEnd threshold, step 2606 is executed. At step 2606, the NearEnd flag is set and the NearEnd HangOver value is set equal to the HangOver time constant. After step 2606,, the process jumps to step 2614.

At step 2614, a determination is made as to whether or not the maximum NearEnd RMS value is greater than a NearEnd peak value. If the maximum NearEnd RMS value is greater than the NearEnd peak value, step 2616 is executed. At step 2616, the NearEnd peak value is set equal to the maximum NearEnd RMS value and the process jumps to the DoubleTalk processing 2112. If the maximum NearEnd RMS value is not greater than the NearEnd peak value, the NearEnd processing is completed and the process jumps to the DoubleTalk processing step 2112.

Referring now to FIGS. 27–38, the messages and parameters passed to control and obtain information about the echo canceller 1103 and 1403 are illustrated. The echo canceller 1103 and 1403 is programmed into the integrated telecommunications processor 150 as each session for a given channel is processed. As one channel session ends and another begins, the echo canceller 1103 and 1403 can have its parameters including its coefficients change. During a session of a channel, the echo canceller control can also change. The microcontroller 223 or the host processor 140 can control the echo cancellation processing of a channel by communicating messages to and from the echo canceller 1103 and 1403. A messaging protocol illustrated in FIGS. 27–38 is used to communicate the messages. A session set up message and a echo canceller parameter message can control the echo canceller 1103 and 1403. An echo canceller parameter status message is used to report the status of echo cancellation parameters around the echo canceller 1103 and 1403.

Referring to FIG. 27, a session setup message 2700 for a channel is illustrated. The session setup message 2700 includes a session ID, a service setup (coder/decoder), a telephony processing setup 2704, near end channels 2705, and far end channels 2706. The near end channels 2705 and the far end channels 2706 provide one or more channel addresses that utilize this session identifier and this telecommunication configuration within the integrated telecommunications processor 250. The telephony processing setup 2704 includes echo cancellation frame size setting (ECFS) 2710, echo cancellation settings (ECS) 2711, and voice activity detection settings (VAD) 2712 which are of interest regarding the echo cancellation process.

FIG. 28 illustrates the possible settings for the echo cancellation settings (ECS) 2711 including no echo cancellation and desired tail length values for echo cancellation. The value of tail lengths selectable by the ECS 2711 is the value of tail length which the echo canceller will model.

FIG. 29 illustrates the possible settings for echo cancellation frame size setting (ECFS) 2710 including the sample size for a frame. The sample size selected for a frame is the value "N" of the N-tap filter that the echo canceller will use to perform the echo cancellation process.

The settings for VAD 2712 enables or disables the Voice activity detector 1401 or the comfort noise generator functions of the echo canceller.

Referring now to FIG. 30 a diagram of a request for EC parameters (REQ_EC_PARMS) message structure is illustrated. The session ID (Session ID (high) and Session ID (low)) for a particular channel and echo canceller is passed using the request for EC parameters message structure.

FIG. 31 is a diagram of an request for EC parameters response (REQ_EC_PARMS_RSP) message structure. In this message structure, the status of the most significant (MS) byte and the status of the least significant (LS) byte is provided as well as the session ID and the status of various echo canceller flags or variable settings including ADPT, CNG, NLP, EC, ERL, MuteRin, and MuteSout.

FIG. 32 is a diagram of an EC status request (EC_STAT_REQ) message structure. In this message structure, the status of session ID (Session ID (high) and Session ID (low)) for a particular channel and echo canceller is requested.

FIGS. 33 and 34 are diagrams describing the EC parameters in EC status messages and EC parameter messages.

FIG. 35 is a diagram of an EC parameter (SET_EC_PARMS) message structure used to set parameters for a give session ID.

FIG. 36 is a diagram of an EC parameter response (SET_EC_PARMS_RSP) message structure including the status of the most significant (MS) byte and the status of the least significant (LS) byte as well as the session ID.

FIG. 37 is a diagram of an EC status request response (EC_STAT_REQ_RSP) message structure. The EC status request response (EC_STAT_REQ_RSP) message structure includes the status of the most significant (MS) byte, the status of the least significant (LS) byte, the session ID (high) and (low), the status of Rin and its various values, the status of Sin and its various values, the status of Sout and its various values, and the status of DoubleTalk and its values.

FIG. 38 is an illustration of an echo canceller configuration message. This message structure passes the session ID (high) and (low) and various EC parameters to configure the echo canceller for a give session.

FIGS. 39A and 39B is a description of echo cancellation (EC_PARMS VSMP) message parameters.

FIG. 40 lists and describes the message parameters of the echo canceller status message (EC_PARMS_STATUS VSMP).

As those of ordinary skill will recognize, the invention has a number of advantages. One advantage of the invention is that telephony processing is integrated into one processor including echo cancellation.

The preferred embodiments of the invention are thus described. While the invention has been described in particular embodiments, it may be implemented in hardware, software, firmware or a combination thereof and utilized in systems, subsystems, components or sub-components thereof. When implemented in software, the elements of the invention are essentially the code segments to perform the necessary tasks. The program or code segments can be stored in a processor readable medium or transmitted by a computer data signal embodied in a carrier wave over a transmission medium or communication link. The "processor readable medium" may include any medium that can store or transfer information. Examples of the processor readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. In any case, the invention should not be construed as limited by such embodiments, but rather construed according to the claims.

What is claimed is:

1. A digital echo canceller comprising:
   a plurality of digital signal processing units each having a multiplier; and
   a processor readable medium including code to
      delay digital data samples in a frame received from a digital network,
      tap digital data samples in the frame received from the digital network in response to a tail delay,
      filter the tapped digital data samples using coefficients modeling a communication channel,
      subtract the tapped digital data samples from digital data samples to be sent over the digital network, and
      transmit the result of the subtraction over the digital network.

2. The digital echo canceller of claim 1, wherein the processor readable medium further includes code to update coefficients of the filter modeling the communication channel.

3. The digital echo canceller of claim 1, wherein the processor readable medium is
an electronic circuit, a semiconductor memory device, a read only memory (ROM), a flash memory, an erasable read only memory (EROM), a floppy diskette, a CD-ROM, an optical disk, a hard disk, a fiber optic medium, or a radio frequency (RF) link.

4. A digital echo canceller comprising:
   an n-tap delay line to receive incoming digital data and to generate a selected delay;
   an n-tap finite impulse response (FIR) filter using a least means squared algorithm to adapt coefficients to a communication channel, the n-tap FIR filter coupled to a selected delayed output of the n-tap delay line to generate an estimated echo digital signal;
   a subtractor to receive send digital data and subtract the estimated echo digital signal therefrom to generate outgoing digital data; and
   a controller to control the n-tap FIR filter, the controller to receive the incoming digital data, the send digital data, and the outgoing digital data to control the n-tap FIR filter.

5. The digital echo canceller of claim 4, wherein
   the incoming digital data is depacketized from packets received over a packet network, and
   the outgoing digital data is packetized for communication over the packet network.

6. The digital echo canceller of claim 4, further comprising:
   a residual error suppressor.

7. The digital echo canceller of claim 6, wherein
   the residual error suppressor is a non-linear processor (NLP).

8. The digital echo canceller of claim 6, wherein
   the residual error suppressor is active if there is little near-end speech energy from a near-end person and signal content is residual echo which is suppressed from the outgoing digital data.

9. A digital echo canceller comprising:
   an n-tap delay line to receive incoming digital data and to generate a selected delay;
   an n-tap finite impulse response (FIR) filter using a least means squared algorithm to adapt coefficients to a communication channel, the n-tap FIR filter coupled to a selected delayed output of the n-tap delay line to generate an estimated echo digital signal;
   a subtractor to receive send digital data and subtract the estimated echo digital signal therefrom to generate outgoing digital data; and
   a controller to control the n-tap FIR filter, the controller to receive the incoming digital data, the send digital data, and the outgoing digital data to control the n-tap FIR filter, wherein the controller includes
      a double talk detector to detect a double talk condition, and
      an energy detector to detect variations in speech and background noise levels.

10. The digital echo canceller of claim 9, wherein the controller further includes
   an automatic level controller to maintain a signal level in the outgoing digital data during the processing of signals other than voice or speech.

11. The digital echo canceller of claim 9, wherein
the controller further includes
a comfort noise detector to generate a comfort noise signal in the outgoing digital data.

12. The digital echo canceller of claim 9, wherein
the double talk condition occurs when a near-end person talks at the same time as a far-end person.

13. The digital echo canceller of claim 9, further comprising:
a residual error suppressor.

14. The digital echo canceller of claim 13, wherein
the residual error suppressor is a non-linear processor (NLP).

15. The digital echo canceller of claim 13, wherein
the residual error suppressor is active if there is little near-end speech energy from a near-end person and signal content is residual echo which is suppressed from the outgoing digital data.

16. The digital echo canceller of claim 9, wherein
the incoming digital data is depacketized from packets received over a packet network, and
the outgoing digital data is packetized for communication over the packet network.

17. A computer program product, comprising:
a computer readable medium having computer program code embodied therein for echo cancellation over a packet network, the computer program code including code to
delay digital data samples in a frame received from a packet network,
tap digital data samples in the frame received from the packet network in response to a tail delay,
filter the tapped digital data samples using coefficients modeling a communication channel,
subtract the tapped digital data samples from digital data samples to be sent over the packet network, and
transmit the result of the subtraction over the packet network.

18. The computer program product of claim 17, wherein the computer readable medium further has computer program code to
update the coefficients modeling the communication channel.

19. The computer program product of claim 17, wherein
the computer readable medium is
an electronic circuit, a semiconductor memory device, a read only memory (ROM), a flash memory, an erasable read only memory (EROM), a floppy diskette, a CD-ROM, an optical disk, a hard disk, a fiber optic medium, or a radio frequency (RF) link.

20. A network echo canceller for integrated telecommunications processing comprising:
a semiconductor integrated circuit including
at least one signal processing unit to perform echo cancellation processing; and
a processor readable storage means to store signal processing instructions for execution by the at least one signal processing unit to
delay data samples in a frame received from a packet network,
tap data samples in the frame received from the packet network in response to a tail delay,
finite impulse response filter the tapped data samples using coefficients modeling a communication channel over the packet network,
subtract the filtered tapped data samples from data samples to be sent over the packet network, and
transmit the result of the subtraction over the packet network.

21. The network echo canceller of claim 20, wherein the processor readable storage means further to store signal processing instructions to
update the coefficients modeling the communication channel over the packet network.

22. The network echo canceller of claim 20, wherein
the processor readable storage means is
an electronic circuit, a semiconductor memory device, a read only memory (ROM), a flash memory, an erasable read only memory (EROM), a floppy diskette, a CD-ROM, an optical disk, a hard disk, a fiber optic medium, or a radio frequency (RF) link.

23. A method of digital echo cancellation for multiple channels, comprising:
calculating the energy in the send input signals and the received input signals for each channel;
processing send input signals for each channel;
processing received input signals for each channel;
detecting double talk between the send input signals and the received input signals for each channel and if detected then inhibiting adaptation of filter coefficients during a double talk condition;
least means squared finite impulse response filtering of the received input signals of each channel to generate an echo estimation for each channel;
subtracting the echo estimation from the send input signals to generate send output signals for each channel;
updating filter coefficients to adapt the least means squared finite impulse response filtering to each channel; and
sending the send output signals over each channel.

24. The method of claim 23, further comprising:
prior to sending the send output signals over each channel,
determining if nonlinear processing of the send output signals is desirable, and if so,
then suppressing the residual error for each channel.

25. The method of claim 23, further comprising:
prior to sending the send output signals over each channel,
calculating the energy in the send output for each channel.

* * * * *

UNITED STATES PATENT AND TRADEMARK OFFICE
CERTIFICATE OF CORRECTION

PATENT NO. : 6,738,358 B2 Page 1 of 1
DATED : May 18, 2004
INVENTOR(S) : Bist et al.

It is certified that error appears in the above-identified patent and that said Letters Patent is hereby corrected as shown below:

Column 10,
Line 9, delete "DSO" and insert -- DS0 --.

Column 39,
Line 9, delete "N" before the word "instruction".

Column 47,
Line 40, delete "HangOver_NLP_1" and insert -- HangOver NLP_1 --.
Lines 57, 59 and 63, delete "HangOver_NLP_4" and insert -- HangOver NLP_4 --.

Signed and Sealed this

Thirty-first Day of August, 2004

JON W. DUDAS
*Director of the United States Patent and Trademark Office*